US007109985B2

(12) United States Patent
Spencer et al.

(10) Patent No.: US 7,109,985 B2
(45) Date of Patent: Sep. 19, 2006

(54) SYSTEM AND METHOD FOR DYNAMICALLY GENERATING ON-DEMAND DIGITAL IMAGES

(75) Inventors: Marc D. Spencer, Bedford, MA (US); Stephen H. Kristy, Fairport, NY (US)

(73) Assignee: Liquidpixels, Inc., Fairport, NY (US)

( * ) Notice: Subject to any disclaimer, the term of this patent is extended or adjusted under 35 U.S.C. 154(b) by 787 days.

(21) Appl. No.: 10/017,271

(22) Filed: Dec. 14, 2001

(65) Prior Publication Data

US 2003/0113038 A1 Jun. 19, 2003

(51) Int. Cl.
*G06F 1/00* (2006.01)
*G06F 9/46* (2006.01)

(52) U.S. Cl. ........................ 345/418; 718/100

(58) Field of Classification Search .............. 718/1, 718/100–108; 709/200–253; 345/418
See application file for complete search history.

(56) References Cited

U.S. PATENT DOCUMENTS 6,144,797 A * 11/2000 MacCormack et al. ....... 386/46

6,754,785 B1 * 6/2004 Chow et al. ............... 711/147
2002/0078093 A1 6/2002 Samaniego et al.

OTHER PUBLICATIONS

"Internet Imaging Protocol," Version 1.0, Mar. 27, 1997, Hewlett Packard Company, Live Picture, Inc. and Eastman Kodak Company, pp. i-vi and 7-74.

* cited by examiner

*Primary Examiner*—Meng-Ai T. An
*Assistant Examiner*—Kenneth Tang
(74) *Attorney, Agent, or Firm*—Rossi, Kimms & McDowell, LLP

(57) ABSTRACT

A system and method is provided that dynamically creates, manipulates and transfers digital images over a communication network on a per request basis in an efficient manner, wherein the composition, format, presentation, and content of the digital images are determined by directives presented at the time of the request. The system includes a parser that takes a request and interprets it into a set of individualized operation commands that will, in sequence, be performed to create or alter an image. The commands derived from the parser are defined as a "job. One or more image processing engines may be called upon as the job is processed to perform requested image transformations. An output formatter takes the resulting processed image and converts it to the desired format stated in the request.

11 Claims, 7 Drawing Sheets

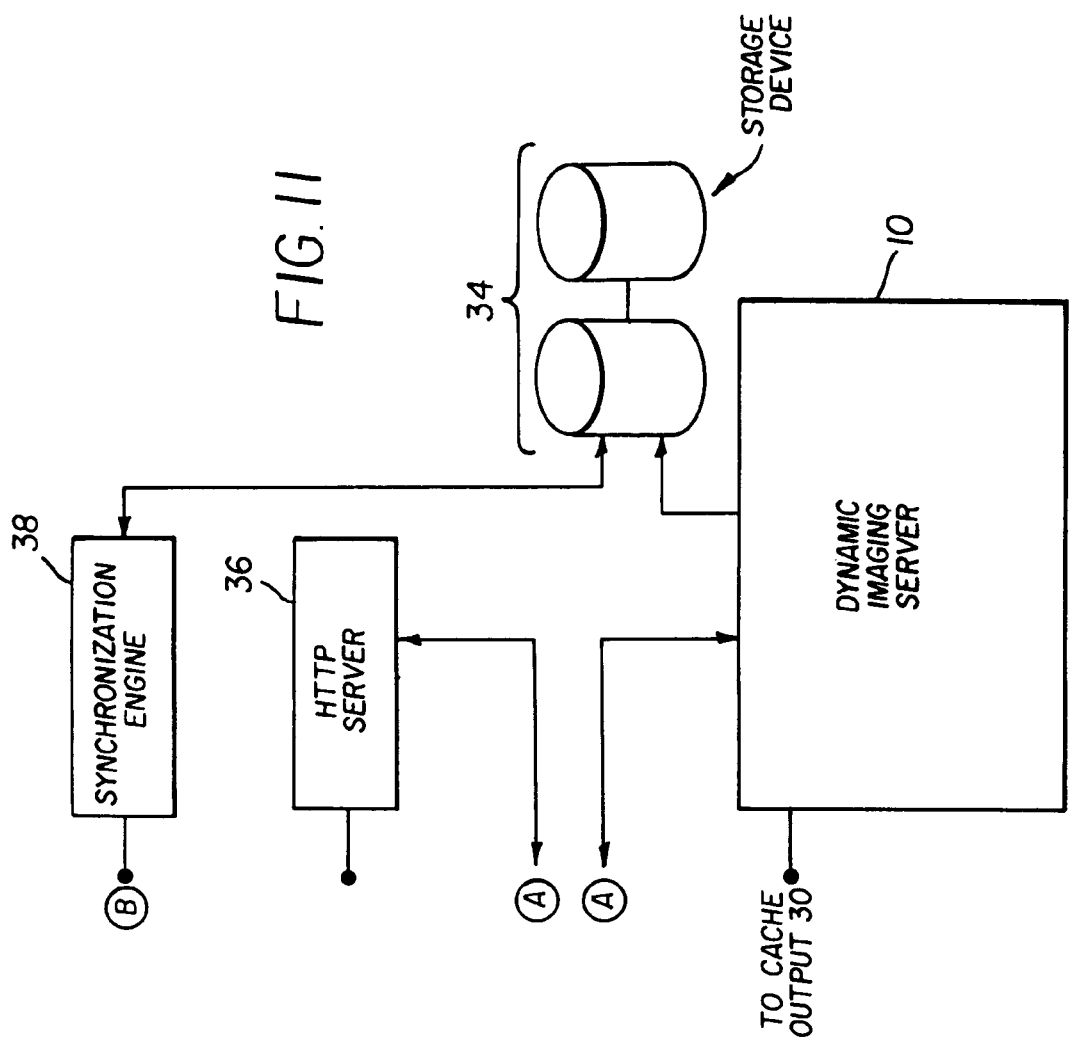

SYSTEM AND METHOD FOR DYNAMICALLY GENERATING ON-DEMAND DIGITAL IMAGES

FIELD OF THE INVENTION

The invention relates in general to a system and method for dynamically generating on-demand digital images. More specifically, the invention relates to a system and method for dynamically creating, manipulating and transferring digital images over a communication network on a per request basis, wherein the composition, format, presentation, and content of the digital images are determined by directives presented at the time of the request.

BACKGROUND OF THE INVENTION

The establishment of the Internet has enabled the average individual to retrieve and manipulate vast amounts of information from sources throughout the world. At first, the Internet was primarily used to transfer information in the form of text data. The technology associated with the capture, storage, manipulation and transfer of images over the Internet suffered from a number of limitations including, for example, the expense of electronic imaging equipment and memory, limited computer processing speeds, and the limited data transfer rates associated with available networks.

As technology has progressed, however, many of the limitations described above have been overcome. The average home computer, for example, is now equipped with sufficient processing speed and memory to easily store and manipulate large numbers of images. Data transfer rates have dramatically improved through the use of high speed DSL, cable modems and satellite links. Advances in image capture technologies have also lowered the price of digital cameras and scanners to be competitive with silver halide imaging. The overall result has been an explosion in the use of images to convey information over the Internet.

The use of images to display products in electronic commerce applications is just one example of how image information has become an important factor in communicating information. Early electronic commerce sites included text descriptions of the products being offered for sale. An electronic commerce site selling a book, for example, would provide a written description of the book and might include a link to a review of the book. While the use of text might be sufficient for items such as books, it became apparent that many consumers will not purchase certain items—such as clothing—unless they can see what they are buying. Accordingly, electronic commerce sites began to include an image of the product that could be viewed by the user prior to purchase.

It became further apparent, however, that sales could be increased if consumers could make requests to change the image. For example, the consumer may wish to change the size of the image being displayed, change the color of the item being displayed or may wish to display two items together as a combination. Alternatively, the consumer may wish to add something to the image in order to customize the item being purchased. A typical example of such customization would be allowing the consumer to add a name on the back of a sports jersey.

While it is currently possible to accomplish some of the features recited above using existing technologies, the basic infrastructure of the Internet was not developed to allow for dynamically creating, manipulating and transferring digital images on a per request basis in an efficient manner, wherein the composition, format, presentation, and content of the digital images can be determined by directives presented at the time of the request. Instead, conventional technologies and protocols required that each potentially desired image must be separately created and stored. As a result, a great deal of resources, both in human development time and storage capability, are currently required to create and maintain images for display on Web pages.

As just one further example, many sites are now available to provide current news and information. Such sites will often utilize headlines to emphasis a particular story. The headlines, however, are not supplied in the form of text data for display, but instead, are actually supplied as an image file that has been created by a computer graphic designer. The designer chooses a particular font and style for the headline and creates an image file representative thereof. It is this image file that is displayed on the web page. However, each headline must be independently created and stored. Each time a headline is changed, a designer must revise the image files. As will be appreciated, the constant necessity for file revision is a time consuming and expensive process that is required in order to maintain the site.

In view of the above, it would be desirable to provide a system and method that dynamically creates, manipulates and transfers digital images over a communication network on a per request basis in an efficient manner, wherein the composition, format, presentation, and content of the digital images are determined by directives presented at the time of the request.

SUMMARY OF THE INVENTION

The present invention provides a system and method that dynamically creates, manipulates and transfers digital images over a communication network on a per request basis in an efficient manner, wherein the composition, format, presentation, and content of the digital images are determined by directives presented at the time of the request. The system and method provide a flexible approach that allows for customization and extension to a number of different applications.

In one preferred embodiment of the invention, the system includes a parser that takes a request and interprets it into a set of individualized operation commands that will, in sequence, be performed to create or alter an image. For example, each command may indicate a source for image data to be acquired, perform an image manipulation on a previously acquired image (including such operations as composition, text, drawing, filtering, etc.), modify the state of the request to provide information which may be used by commands later in the request (by performing calculations, database queries, time decisions, if decisions, etc), perform mathematical or positional calculations, create a new image based on data, or indicate disposition of the image. The commands derived from the parser are defined as a "job", namely, a job is composed of a list of commands that will be performed in sequence, and represents the sequential collection of commands that were parsed from the data presented in the request. One or more image processing engines may be called upon as the job is processed to perform requested image transformations. These engines may be added to over time to allow for extension and customization. An output formatter takes the resulting processed image and converts it to the desired format stated in the request.

The requests can be presented in any desired form including, for example, in the form of a URL, via XML, or from an external file. Upon presentation, the request is converted through an extensible look-up-table into a job of commands as described above, where each element in the request is mapped into one or more commands. Each command is then executed by performing the following steps: general metadata expansion; image metadata expansion; arithmetic evaluation; escaped-character expansion; and argument translation. Commands which are macros are expanded, replacing zero or more commands in the job with new commands Each command is then executed, in turn, performing any manipulations that the command is designed to perform. This may include (but not limited to) operations such as image processing, database access, data retrieval, computation, decision making, metadata manipulations, etc.

As each command is processed, images in a stack called the image pool are manipulated by the commands, ultimately resulting in a single result image which is then format converted as requested and sent back to the requesting connection.

The system and method can be utilized in a number of different applications. For example, the system and method can be utilized to create advertisements (visual or audible) targeted for a specific recipient, utilizing information about that recipient to drive the creation or modification of the advertisement in such areas as: Internet radio advertising and building on-the-fly audio streams; Interactive TV and building on-the-fly commercials on a per viewer basis; direct marketing print advertising; and direct marketing HTML email advertising wherein an e-mail sent to a recipient includes images related to product advertisements and allows the customer to dynamically alter the images in order to customize the product being purchased. The type of information known about the recipient can be specific (such as favorite ice cream, current salary, etc.), but may also be as simple as what time zone the recipient is in or what time are they viewing the advertisement.

The system and method can also be utilized to insert data into a pre-existing or an on-the-fly generated image or graphic templates for the purpose of enticing a viewer into pursuing additional information about a product or service. Examples include: inserting up-to-the-second stock quotes into an ad that is advertising a financial services company; inserting up-to-the-second sports scores into an ad which is advertising sporting goods (note that the specific sports selected to display could be driven by information about the viewer); inserting up-to-the-second pricing information regarding an on-going sale or auction; combining images or graphics in order to create a new image for the purpose of enticing a viewer into pursuing additional information about a product or products. Examples of combining images include: combining any viewer selected necktie on to any viewer selected shirt; creating an image of a piece of furniture upholstered in any viewer selected fabric/pattern; creating an image of a house by combining photos of siding, shutters, doors and viewer selected color schemes. While similar capabilities are available in CAD-CAM or desktop software applications, the ability of providing this as a service to many users in an Internet environment has not been possible until now.

Still further, the system and method have applicability to protecting images by the insertion of copyright notices and digital watermarks. Inserting copyright notices or other so called digital watermarks into images is commonplace. Making the watermark (visible or invisible) to a specific recipient, however, has not been possible. The advantage of doing so is to permit the owner of the content (e.g. a digital photo) to determine what recipient has abused his licensing rights if/when the owner discovers the content is being misused.

As will be appreciated by those skilled in the art from the following detailed description, the system and method can also be applied to: generating animated or non-animated imagery where the images are used as banner advertisements; generating animated or non-animated imagery where the images are used as padding or formatting elements within an HTML page; generating animated or non-animated imagery where the images are used as padding or formatting elements within an XML page; generating animated or non-animated imagery where the images are used as content in printed materials; generating animated or non-animated imagery where the images are used to present formatting of text of characteristics not possible in HTML; generating animated or non-animated imagery where the images are specifically formatted to take optimal advantage of the display characteristics available on the device; generating animated or non-animated imagery for the web with any of the above characteristics; and generating animated or non-animated imagery for inclusion in email with any of the above characteristics.

In all cases, since the request may be generated on an individualized basis, and that the request may contain commands which determine and use elements like time and location of the recipient, the resulting image is individually personalized. HyperText References (HREF) within tags contain the location and parameters for a resource to be retrieved. The system and method utilizes the parameters of the HREF within an image tag to convey manipulation instructions which, when performed, will manipulate an existing image or create a new image. The new 'result' image is then transmitted to the calling party (browser, email client, etc) as per usual HTTP activity. There is no limit to the processing capabilities that can be expressed in this manner, nor limitations to the functionality of the system and method In one preferred embodiment of the invention to be described below, a dynamic imaging server is provided that includes a parser, a job processor that receives parsed commands from the parser and executes the commands in the form of a job to perform a plurality of operations, at least one image processing engine that performs an operation in response to a command received by the job processor from the parser to process image data, and a formatter that receives the processed image data and formats the processed image data into a desired format. The dynamic imaging server is also preferably provided with a script execution engine capable of executing code during execution of the job by the job processor.

In a further embodiment of the invention, dynamic imaging system is provided that includes a storage device, a dynamic imaging server of the type described above coupled to a storage device, a database accessible by the dynamic imaging server, and network server. The dynamic imaging system is also preferably provided with a request cache that receives image requests and determines whether the image request should be forwarded to the dynamic imaging server for processing.

In a still further embodiment, a dynamic imaging system is provided that includes at least one cluster, wherein each cluster includes at least one cluster master device, and at least one cluster slave device. The cluster master device includes a storage device, a dynamic imaging server coupled to a storage device, a database accessible by the dynamic imaging server, a network server, and a cluster engine. The cluster slave device includes a storage device, a dynamic imaging server coupled to a storage device, and a network server. The cluster engine manages a flow of image requests between the cluster master and the cluster slave. A plurality of clusters can be linked together to provide flexibility to handle any desired application.

Operationally, a method of providing dynamic imaging is provided that includes parsing an image request into a job comprising a plurality of commands, processing the commands to perform a plurality of operations, wherein the operations generate image data that is responsive to the request; and formatting the image data.

Further, a method of providing dynamic imaging is disclosed that includes providing at least one dynamic imaging cluster including at least one cluster master and at least one cluster slave, analyzing an image request with a cluster engine to select either the cluster master or the cluster slave to process the image request, and processing the image request with either the selected cluster master or the selected cluster slave.

Still further, a method of providing dynamic imaging is disclosed that includes providing a plurality of dynamic imaging clusters, wherein each dynamic image processing cluster includes at least one cluster master and at least one cluster slave, analyzing an image request with a cluster engine to select which of the plurality of dynamic image processing clusters will process the request, forwarding the request to the selected dynamic image processing cluster; and processing the image request with the selected dynamic imaging processing cluster.

In one preferred embodiment, at last one of the dynamic imaging clusters comprises a user cluster and at least one of the dynamic imaging clusters comprises a third party cluster, and the third party cluster is utilized to provide overflow capacity processing for the user cluster.

Further features, advantages and applications of the invention will become apparent to those skilled in the art from the following detailed description of the preferred embodiments of the invention.

BRIEF DESCRIPTION OF THE DRAWINGS

The invention will be described in detail with reference to certain preferred embodiments thereof along with the accompanying drawings, wherein:

FIG. 11 illustrates a cluster slave for a dynamic imaging system in accordance with the invention.

DETAILED DESCRIPTION OF THE PREFERRED EMBODIMENTS

Figure 1:
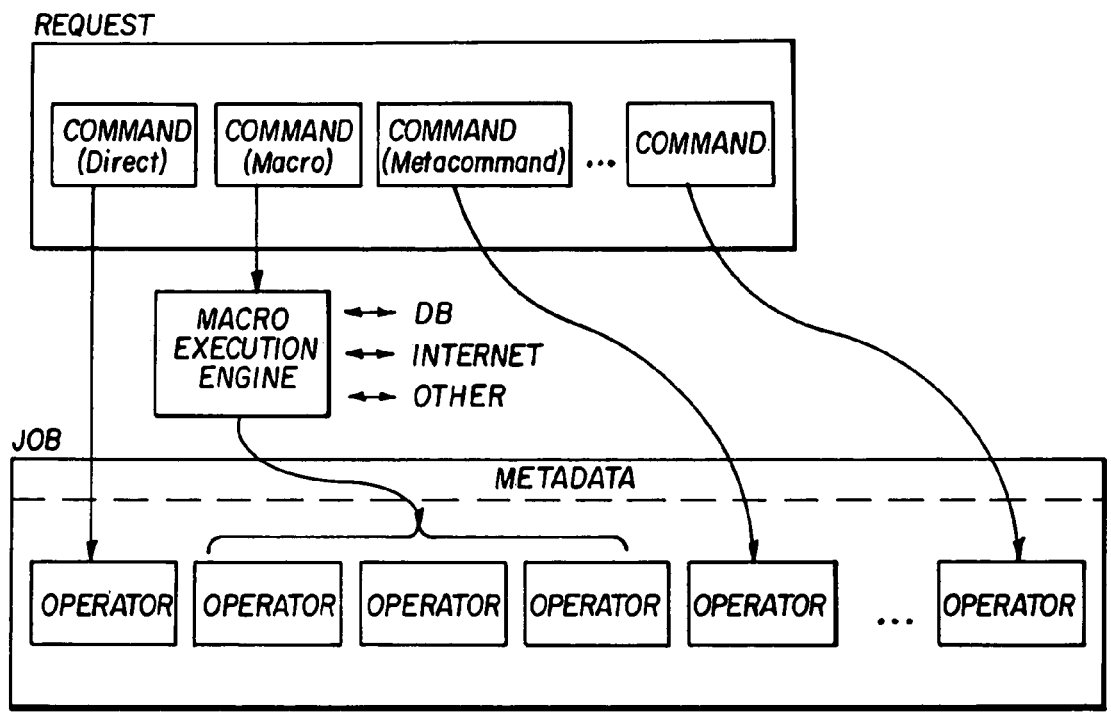
FIG. 1 is a schematic block diagram illustrating command processing in accordance with the present invention.

A system and method is provided that allows users to dynamically create and manipulate images on-demand and in real time. Images are created or altered by sending commands to a dynamic imaging server that performs the necessary command operations and returns a processed image. The system presents many capabilities to the web designer, such as support for all popular image file formats, ability to render and manipulate vector images such as Encapsulated PostScript (eps) and Scalable Vector Graphics (svg), full International Color Consortium (icc) color management, international (Unicode) typographic support, and manipulation of Exchangeable Image File (exif) and International Press Telecomminications Council (iptc) metadata. Metadata is data carried along with an image to convey additional details or characteristics beyond the picture itself. The system assets such as images, image chains, color profiles, and fonts, can be acquired from many sources, for example, over http, ftp, or from an image repository on a server. The assets are processed by requests sent to a dynamic imaging server, wherein the requests are a series of commands that will be described in greater detail below.

Digital images are a primary asset to be utilized by a preferred embodiment of the system, a few basic points regarding digital imaging will be reviewed. A digital image is generally comprised of one or more frames—a series of sub-images contained within one main image—which when rendered represent an array of pixels that can be displayed or printed. In addition to being comprised of frames, images may: be described as pixels or as instructions; contain image-specific metadata; contain esoteric metadata; and have transparent regions known as alpha channels. Metadata is information carried along with an image that may be used for informational purposes. For example, the width of an image, its format, original source, etc., are examples of metadata.

The system may need to acquire and/or create images in order to process a request. As images are introduced by a command in a request, these images reside in an image pool—a temporary collection of images maintained during each request. A separate image pool is created for each request, and is drained when the request is complete. Images in the pool are named so they can be identified and manipulated. Certain commands add images to the image pool, and will accept an optional name argument by which the image in the pool will be known. If two images are named identically, the latter replaces the former in the pool.

Images in the system may have multiple frames. If the file from which an image is retrieved supports multiple frames, it will be added to the pool just as any other image via the source command. Frames may be also added to images already in the pool. Once a multiple-frame image is in the pool, individual frames may be selected with the select command and subsequently manipulated as an independent image.

The system and method employs an image chain to create a desired image. The image chain is a representation of a sequence of steps necessary to create the desired result image. Image chains are built within the system by sending a series of commands referred to as a request. As the request is processed, each command is interpreted, in sequence, resulting in the creation of an image chain. The image chain, along with its associated metadata is contained within a job.

In the preferred embodiment of the system, three types of commands are utilized: direct, macro, and metacommands.

Direct commands are the most common, resulting in the addition of an operator to the image chain. Macro commands, may perform additional computation or processing, such as database queries, calculations, etc., before optionally adding zero or more operators to the image chain. Finally, metacommands allow manipulation of non-image data (metadata) associated with the request.

FIG. 1 is a basic block diagram illustrating the command processing structure used to execute commands by a dynamic imaging server in accordance with the present invention. As one simple example, consider the display of an image in a web page within a space two hundred pixels wide and two hundred pixels tall. There are three steps required to process the image: 1) acquire the source image; 2) scale it to the desired size, and 3) send it to the requesting browser in a format the browser understands. These steps are graphically illustrated in FIG. 2, and will result in the creation of a single operator in the image chain as illustrated in FIG. 3.

Image chains themselves are not directly created. Rather, they are represented as a sequence of commands, each with a list of optional arguments. Each command represents one or more operators, macros or metacommands. These commands, in turn, are interpreted to create the image chain. Image chains can be represented in many different ways including, but not limited to, http or xml.

Figure 3:
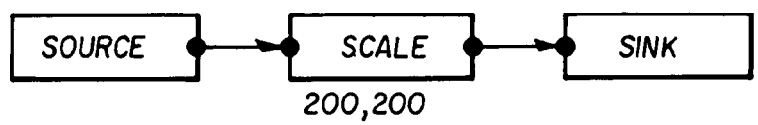
FIG. 3 is a schematic block diagram illustrating an image chain that results from the request illustrated in FIG. 2.

The example depicted in FIG. 3 contains three operators, with the second having two arguments, width and height. This example can be represented with three corresponding commands in an http request. The http syntax for the system is designed to be simple to read and develop. For the technically inclined, the Modified Backus-Nauer form (mBNF) of the http request is listed in the attached Appendix, which forms part of this specification, under "HTTP Syntax Definition", at 187.

Commands are identified by name, and may result in one or more (as in the case of a macro) operators being added to the image chain. Optional named arguments begin with an equals sign '=' and are separated by commas ',' with their values surrounded by square brackets ('[' and ']'). Commands may have zero or more arguments.

commandName=argumentName[value],anotherArg[AnotherValue]. . .

The illustrated embodiment will focus solely on the http representation of system requests. It will be understood, however, that other formats are possible. In the http request form, commands are processed in sequentially, and are separated in the request by an ampersand character '&' as per the http standard for get requests:

commandOne=argOne[valueOne],argTwo[valueTwo]
        &commandTwo& . . .

For purposes of clarity, requests within the examples may be separated into several lines in this specification.

Now returning to the simple image-scaling example above, a representation of a real system request could be:

source=url[http://www.liquidpixels.net/images/cat.jpg]&
    scale=geometry[200×200]&
    sink From the above, the three commands, source, scale, and sink, together in a single request can be easily seen.

Many requests will need to perform processing on more than one image. Yet the image chain representation becomes no more complex. In this example, one image is composed with another—the secondary image is blended, or layered, with the first at the location specified in the chain. The chain is graphically shown in FIG. 4. Since requests are represented as a sequence of commands, the system must use references to other commands to describe a bifurcated chain. The image chain above could be created by a request as follows:

source=url[http://www.liquidpixels.net/images/penguin.gif],name[p]&
    source=url[http://www.liquidpixels.net/images/truff.jpg]&
    composite=compose[Over],image[p],x[200],y[100]&
    sink There are two source commands in this example, with the first one additionally specifying a name argument with the value of 'p'. The additional argument tells the dynamic imaging server to take a penguin.gif image and add it to the pool as an image named 'p'. The second source command does not specify a name—the image is added to the pool as the current image, or '_'.

The composite transform operator requires a composition type specified by the compose argument and the name of an image in the pool to compose with the current image, specified by the image argument. The optional x and y arguments define an offset for the composition. Complete details of all preferred commands and their arguments are provided in the Appendix under "Base Command Set", at 73. The resulting composite image is shown in that attached Appendix, at page 6, Appendix FIG. 9, wherein the image of a penguin is placed over the image of a cat.

As a further example, consider now a small change to the previous example and illustrated by the following.

source=url[http://www.liquidpixels.net/images/truff.jpg],name[cat]&
    source=url[http://www.liquidpixels.net/images/penguin.gif],name[p]&
    select=name[cat]&
    composite=compose[Over],image[p],x[200],y[200]&
    sink There are two differences in this modified example. First, the order of the source commands has been reversed, and both source commands specify image names. Second, there is a new command: select, used to make one of the images in the pool the current image. Functionally, this example is no different from the previous, but it can be easier to understand, since the 'current image' is no longer an inferred assignment.

As noted earlier, system assets can be acquired from many sources. The source of an asset is specified as a uri, with the http://, shttp://, ftp://, gopher:, and file: method types supported. The system and method may be readily expanded to include additional types. For the common network based methods, the asset is retrieved from the location specified by the URI to the dynamic imaging server where they are stored and managed by intelligent caching system. If the original image is altered, it will be re-transferred to the dynamic imaging service, otherwise, once the image is managed, it is not re-transferred unnecessarily. Assets may be added to and managed within the asset pool as discussed in the Appendix under "Resident Assets", at 46.

Vector formats allow for limitless scaling and rotation of imagery without the pixel re-sampling and resulting reduction of quality otherwise necessary. Images can be acquired in an ever-growing list of file formats, including formats that do not represent images as pixels, such as PostScript™, Encapsulated PostScript (EPS) or Simple Vector Graphics (SVG).

Certain situations will warrant the introduction of a new (possibly blank or patterned) image into the image chain. Perhaps a transparent spacer image is needed, or a background on to which text will be drawn. The blank command adds a blank image creation operator to the image chain. The blank command is used to add an operator to the image chain that creates a new solid image in the image pool:

blank=color[red],width[100],height[30]&
    sink

The new image can be created in any color desired, with many standard colors available by name. A complete list of named colors and the format for specifying custom colors is in the Appendix, under "Color Definitions", at 173.

It should be noted that there is a difference between a macro command and a stored chain. Macro commands are executable computer code designed to perform complex, and often custom, operations during image chain creation. Stored chains, on the other hand, allow users to store often used request fragments for simple re-use later.

In the present system, image chains can be stored to disk and can be retrieved from disk or any network accessible location. The ability to store image chains—as portions or complete chains—allows users to amass a library of imaging functions which can be assembled later to perform imaging tasks. Coupled with the use of esoteric metadata and the set command, stored chains can behave as functions, allowing simple URLs to achieve powerful results.

Figure 5:
FIG. 5 illustrates a graphic tab to be generated in accordance with the present invention.
Figure 6:
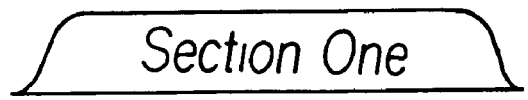
FIG. 6 illustrates the customization of the graphic tab in FIG. 5 with text data.

As one example, suppose one wished to adorn a set of web pages with section tabs similar to the one illustrated in FIG. 5. With a graphic for the image tag created as an eps file, the following image chain could be used to create a section tab with a section name as shown in FIG. 6.

source=url[file:tab.eps]&
    annotate=font[Arial-Roman],pointsize[9],text[Section+
       One],gravity[Center],fill[black]&
    sink=format[GIF]

Accordingly, with this simple image chain, section tab images can be easily created for any area of the web site, without needing to create them ahead of time.

Since stored chains are referenced by uri just as any asset, they may be stored within the resident asset pool or any network-accessible web of ftp server. With stored chains, however, this repetitive process can be made simpler. By replacing the text argument in the annotate command with a reference to global esoteric metadata, a portion of this image chain becomes a reusable function stored on the dynamic imaging server. It should be noted that the sink command was omitted from the request.

source=url[file:tab.eps]&
    annotate=font[Arial-Roman],pointsize[9],   text[global.
       section],gravity[Center],fill[black]

Image chain fragments can be stored on any server in a file, and can be retrieved as part of a request by using a load command. The set command can be used to assign values to global metadata fields within stored fragments. If the image chain fragment above was stored on a web server http://www.domain.com in the file/chains/tab.chain, then the following image commands could be used to create a tab graphic resulting in a customized tab image:

set=key[section],value[Section+One]&
    load=url[http://www.domain.com/chains/tab.chain]&
    sink System assets—images, fonts, stored chains—can be retrieved from any valid url. The system supports the file: method within these urls, indicating that the asset should be retrieved from the system resident asset pool. The manipulation of the assest pool will now be described in greater detail.

The system's asset pool is divided into three distinct sections with each matching a corresponding type of data and therefore also matching a class of commands. The source command looks to the art asset pool; commands like annotate, text, mftext, and textcurve look to the fonts asset pool; and the load command looks to the chains asset pool. Additionally, the addprofile command looks to the art asset pool for icc color profiles.

When several dynamic image servers are installed as a cluster, each slave server accesses a synchronized copy of the master's resident asset pools, providing unified access to assets without any reduction in performance. Synchronization occurs on a regular basis, determined during configuration and can also be performed manually at any time. Additional information regarding the resident asset pools, manipulation capabilities, and cluster synchronization can be found in the attached Appendix under "Resident Assets", at 46.

System commands may contain arbitrary mathematical expressions which will be evaluated when the image chain is created from the request. Expressions are enclosed by parenthesis '(' and ')', and may contain references to image metadata fields. Expressions are an important element of the system's flexibility. They permit image manipulations to be constructed in situations where certain aspects of the source image or the necessary target are not known, or when metacommands are used to make decisions during rendering. Simple expressions are useful to increase clarity within some operation. For example, referring back to the composite example to position the penguin at the center of the underlying cat image, it is necessary to know the size of the cat image, which is information that is not available. However, expressions and image metadata can be used to determine the size.

source=url[http://www.liquidpixels.net/images/pengu-
       in.gif], name[p]&
    source=url[http://www.liquidpixels.net/images/
       truff.jpg]&
    composite=compose[Over],image[p],x[(_.width/2)],y
       [(_.height/2)]&
    sink It should be noted that the image specified in the second source command above, while not explicitly named, can still be identified by the current image name '_'. The identified image metadata width and height are each used within small expressions to determine the center of the current image (named '_').

Certain characters may not be permitted within a request of a specific form. For example, http requests, present a limited character set due to the use of several characters by the protocol to indicate special meaning. In all cases, however, encoding techniques specific to the representation can be used to overcome this limitation Several Metacommands are also preferably available that perform decision making operations such as if-then, string matching, or time and date determination. These Metacommands all perform by manipulating global metadata, and the results of their operation can be used within expressions. For example, in a more complex casee:

blank=width[600],height[60],name[bg]&
    annotate=text[Only],font[Arial-Bold],pointsize[22],fill
       [black],y[35],x[10]&
    annotate=text[days+left+till+Christmas],font[Arial-
       Bold],pointsize[22], fill[black],y[35],x[150]&
    countdown=target[12/25/2001],key[days]&
    annotate-text[global.days],font[Dominican],pointsize
       [36],fill[red],y[40],x[82]&
    optimize&
    sink=format[gif]

In this example, the number of days remaining until Christmas 2001 is determined by the countdown metacommand supplied as party of the system. The resulting number is placed in the global metadata in a field named days, specified by the key argument in the countdown command. Each time this request is processed, the operators that result may contain different values, based on the number of days remaining. This information is used by the annotate command later in the request to draw a custom message on the image.

Sometimes there are situations where a command within a request should only be executed if a certain criteria is met. Perhaps an image should only be reduced if it exceeds a certain size. Or, perhaps, only images in cmyk should only be converted to rgb. The system's conditional execution of commands allows for command processing to occur only if a criteria is valid.

source=url[http://www.liquidpixels.net/images/Spain.
       jpg],name[image]&
    scale=size[500]&
    addprofile=url[file:profiles/sRGB.icm],if
       [('image.colorspace'ne 'RGB')]&
    sink Any system command may contain an additional special argument, 'if'. when the if argument is present for a command, the value of the if argument is evaluated, and the command will be skipped during processing if the value is numerically zero or blank.

As already mentioned, images have two components: a visible component, represented as pixels, vector information, or instructions, and a non-visible component called metadata. Metadata comes in two forms, image-specific metadata, representing physical aspects of an image (height, width, color depth, format, etc.) and logical aspects of an image (cached, name, etc.) and esoteric metadata, representing any additional information associated with an image by the user. Image-specific metadata is inherent to the image, it can not be changed explicitly, while esoteric metadata can be arbitrarily manipulated as needed. Esoteric metadata can be manipulated by the attribute command. Both types of metadata are available to system commands within a request. There is no distinction made between image and esoteric metadata within a request.

Metadata is accessed by image pool name, followed by a dot '.' and the name of the metadata field desired. For example, the string "cat.width" could be used within a command to determine the width of an image named cat. The current image can also be queried for metadata, even when it is not explicitly named by using an underscore '_' as the image name (_.width).

Beyond metadata associated with an image, there is also metadata associated with a request. This metadata, solely esoteric, can be used to pass information between commands in a request, much as variables are used in programming languages. Request-centric metadata is known as Global metadata, and is accessed via a special image name global. Esoteric metadata can be set globally or specifically for an image by using the set metacommand, or by certain other metacommands and macros that may make decisions or calculations earlier in a request.

Two forms of image-specific metadata are detected and extracted by the system for use in image chains: iptc metadata and exif metadata. The International Press Telecommunications Council, or IPTC, defines a format for the exchange of metadata in news content including photographs. Many desktop imaging applications allow you to add iptc metadata to your images, or view any data already in place. The iptc metadata fields are listed in "IPTC Metadata" on page 193. The exif, or Exchangeable Image File, defines a common format for image interchange in use by most digital cameras on the market today. Along with the image capture, devices supporting exif will populate the exif metadata fields with camera- and possibly location-specific information known at the time of capture. The exif metadata fields are listed in the attached Appendix under "EXIF Metadata", at 196. Both exif and iptc metadata can appear in an image together.

Non-Imaging commands are commands which, when executed, result in the addition of zero or more new operators added to the image chain. They differ from basic commands in that they do not perform imaging operations themselves. Rather, they are useful to make decisions, fetch data from an external source, perform repetitive commands, and to reduce complex, yet often-repeated imaging operations into a simple single command. Non-imaging commands can be separated into two categories: metacommands and macros. Metacommands are commands intended to manipulate metadata. Macros appears as any other command within a request, but may be designed to perform complex computations, database access, or other computations as precursor steps to adding zero or more operations to the image chain, or setting esoteric metadata. A macro may, for example, be developed to query a database of product information and set esoteric metadata to the current price. This metadata could then be used later in the request to image sale information on the image, or as the basis for conditional execution of a command.

Certain macros are simple conveniences. For example, the most common use for the system may be to create an image containing styled text rendered in an attractive typeface can be simplified via a macro. Without a macro three steps are required: first, determine the size of the text to be rendered, in pixels; second, create a new blank image of that (or slightly larger) size; and third, render the text onto the new blank image. The text macro does just this: it calculates the bounding box for the text to be rendered, and then adds two new operators to the image chain: a blank operator and an annotate operator.

In most environments, there is no need to restrict access to the dynamic imaging server or a cluster of servers. Some environments, however, will require certain restrictions to be placed on access to the server. There are two mechanisms by which access to a dynamic image server are preferably restricted: referring host, and keyed requests.

The referring host method is most applicable to websites using the system for imaging within their own environments or a limited number of external environments. It is not a desirable mechanism for securing access within the arena of HTML e-mail. When a web browser makes a request to a server, it sends with the request information describing the HTML resource that referred the request. When following a link from one HTML page to another, for example, the browser informs the web server of the URL from which the second page is accessed. When a browser makes a request for an image, the web browser will inform the server the URL of the page containing the image tag. It is this information that the system uses to restrict use of the dynamic imaging server by alien sites. The system is presented with a list of server names (or URLs) for which requests are permitted. Once the list is complete, and host based security is enabled, any attempts to access the server via an image tag served by a server not listed will not be permitted. Operation is transparent when the request is made from a web browser, even under JavaScript control.

When keyed requests are made from a non-browser environment—html e-mail, a Java applet, an application—the referrer information used in host based security is not present. In this case, an additional command must be added to the chain containing a key, unlocking the system for that request. A unique key is created for each request to be made; keys are based on the image chain itself, and a 'secret' known to the system operator.

The system preferably maintains two separate cache systems: an asset cache, for source images, fonts, profiles, and stored chains; and a render cache, for rendered images. Both caches perform the same basic function, to keep recently accessed data near-by such that subsequent accesses are as rapid as possible. When any asset is requested via url in a command such as source or annotate, the asset is retrieved from the location specified and stored within the asset cache. Subsequent requests for the same asset will use this cached copy, saving the overhead of the network retrieval. In clustered environments, the asset cache is automatically synchronized to appear as a single, unified, transparent cache. The render cache is used to accelerate repeat requests for a chain, serving the cached result rather than re-render the image. The decision to return a cached image is based on the request; requests must match exactly to cause a cached The command structure and processing operations for a system in accordance with the present invention have been described in detail, and additional information can be found in the Appendix attached hereto which forms part of this specification. Specific implementation examples will now be discussed.

Figure 7:
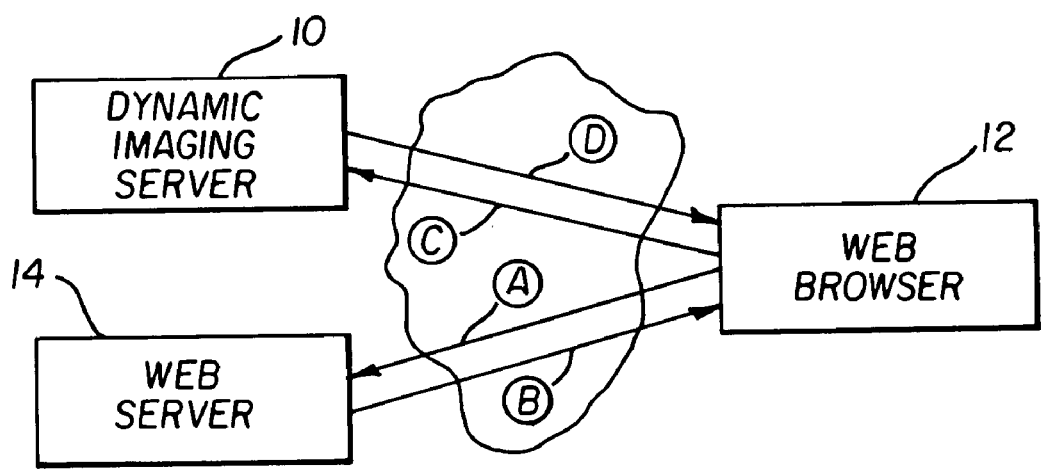
FIG. 7 is a schematic block diagram illustrating the use of a dynamic imaging server in an Internet application.

Referring now to FIG. 7, a schematic block diagram is shown illustrating the use of a dynamic imaging server 10 in an Internet application. In conventional Web operation, a World Wide Web browser 12 contacts a web server 14 via a network 16 such as the Internet, requesting, an HTML resource or page that is available on the web server 14. The request is illustrated in the drawing by arrow A. The page, composed in HTML, includes image tags containing HREFs pointing to the dynamic imaging server 10 and an image chain is returned to the browser 12 as illustrated by arrow B. The browser 12 parses the HTML, and makes subsequent requests back via the network 16 to obtain data for all images referred to by the image tags. When a tag referencing the dynamic imaging server 10 is requested, an HTTP request is sent via the network 16 to the dynamic imaging server 10 where it is parsed into a job as illustrated by arrow C. The job is processed and the newly created custom image is returned via HTTP by the dynamic imaging server 10 via the network 16 to the requesting browser 12 for display.

Figure 8:
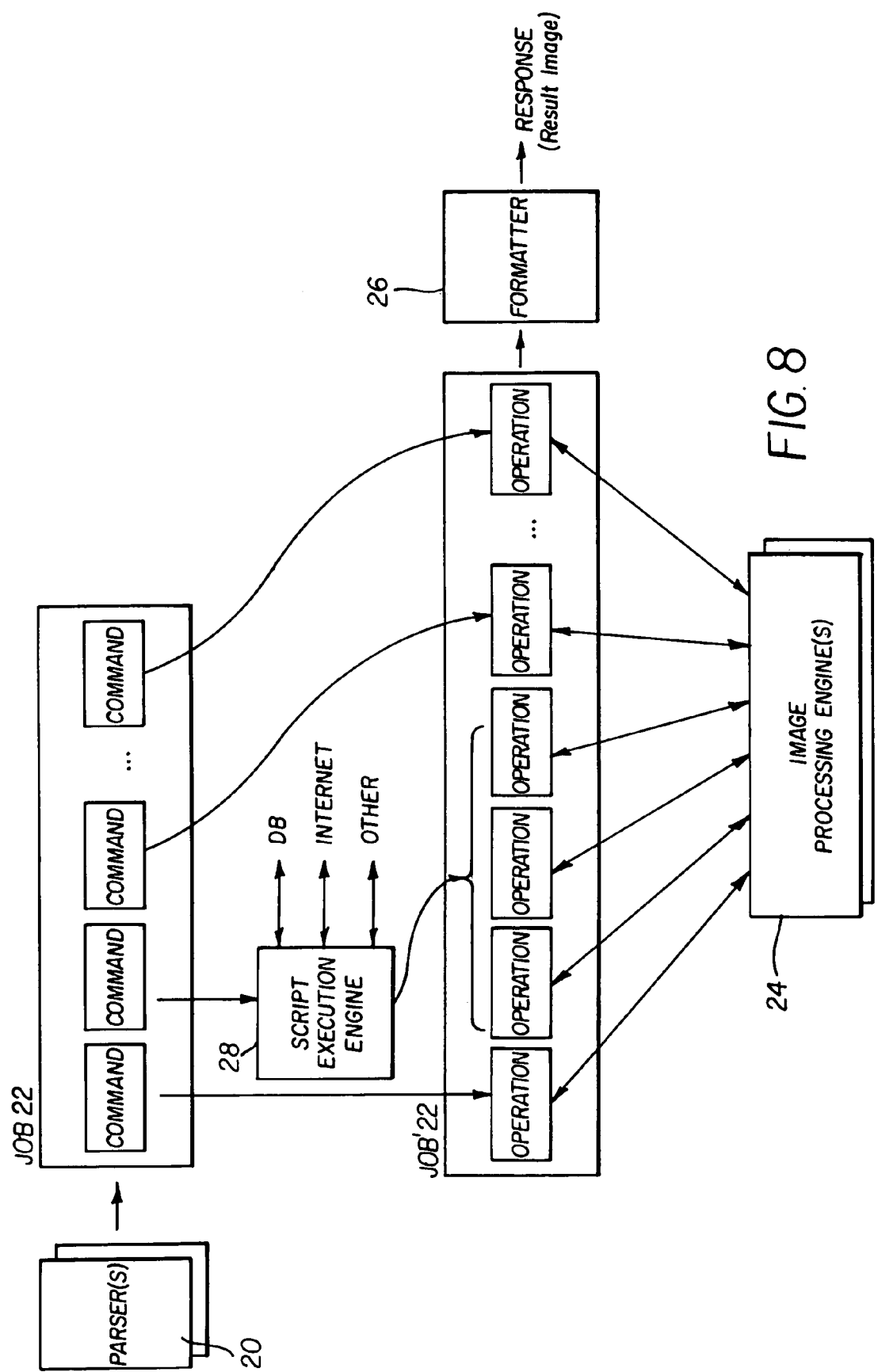
FIG. 8 is a functional block diagram of the dynamic imaging server illustrated in FIG. 7.

FIG. 8 is a functional block diagram illustrating the dynamic image server 10. The dynamic imaging server 10 includes a parser 20 that parses the incoming request into a job 22 having one or more associated commands as previously described above. An existing URI parser can be easily augmented with additional parsers for XML and other types of requests. Accordingly, the parsing and command creation process is extensible such that new functionality can be added to the system over time. The job 22 is then executed one command at a time to perform various operations by a job processor. The performance of the operations is shown for purposes of illustration as job 22'. The operations may require the use of one or more imaging engines 24 contained with the dynamic imaging server 10 in order to manipulate or create the image as described in the request.

As one example, a first command may require the dynamic imaging server to obtain a source image from a tertiary web server at a specified URL. The dynamic imaging server 10 makes this request, and uses the returned image as the starting point for the image processing process. A second command may then require the dynamic imaging server 10 to scale the image to 50% of its original size, which the dynamic imaging server 10 accomplishes by utilizing an appropriate image processing engine. Finally, a further command may require the dynamic imaging server 10 to format the new image into a specific image format, such as a JPEG image, which the dynamic imaging server 10 accomplishes using a formatter 26.

The dynamic imaging server 10 also preferably includes a script execution engine 28 that can execute arbitrary code during a job execution. The command may require, for example, that information be retrieved from a remote site—like a stock quotation—or that another image element—for example a grid pattern—be generated for insertion into the image to be created. The script execution engine 28 executes these types of instructions to obtain the necessary data to be inserted into the image.

As will be readily appreciated, the above-described dynamic imaging server can be utilized in a number of applications, just one of which includes providing customized images for email users. For example, an HTML email is sent to a recipient containing image tags containing HREFs pointing to a dynamic imaging server and an image chain. The mail server at the point of origin forwards the email to one or more mail servers between originator and addressee. Ultimately, the email message sits on the recipient's mail server. Periodically the recipient's email client fetches mail from the server. The server sends requested messages to the email client. The email client, upon discovering HTML email content, parses the HTML. For each image tag discovered, the email client makes additional requests to the specified locations for image data. If the HREF for the image tag refers to the dynamic imaging server, the request is sent to the server and parsed to create a job that is processed to return an image.

Figure 9:
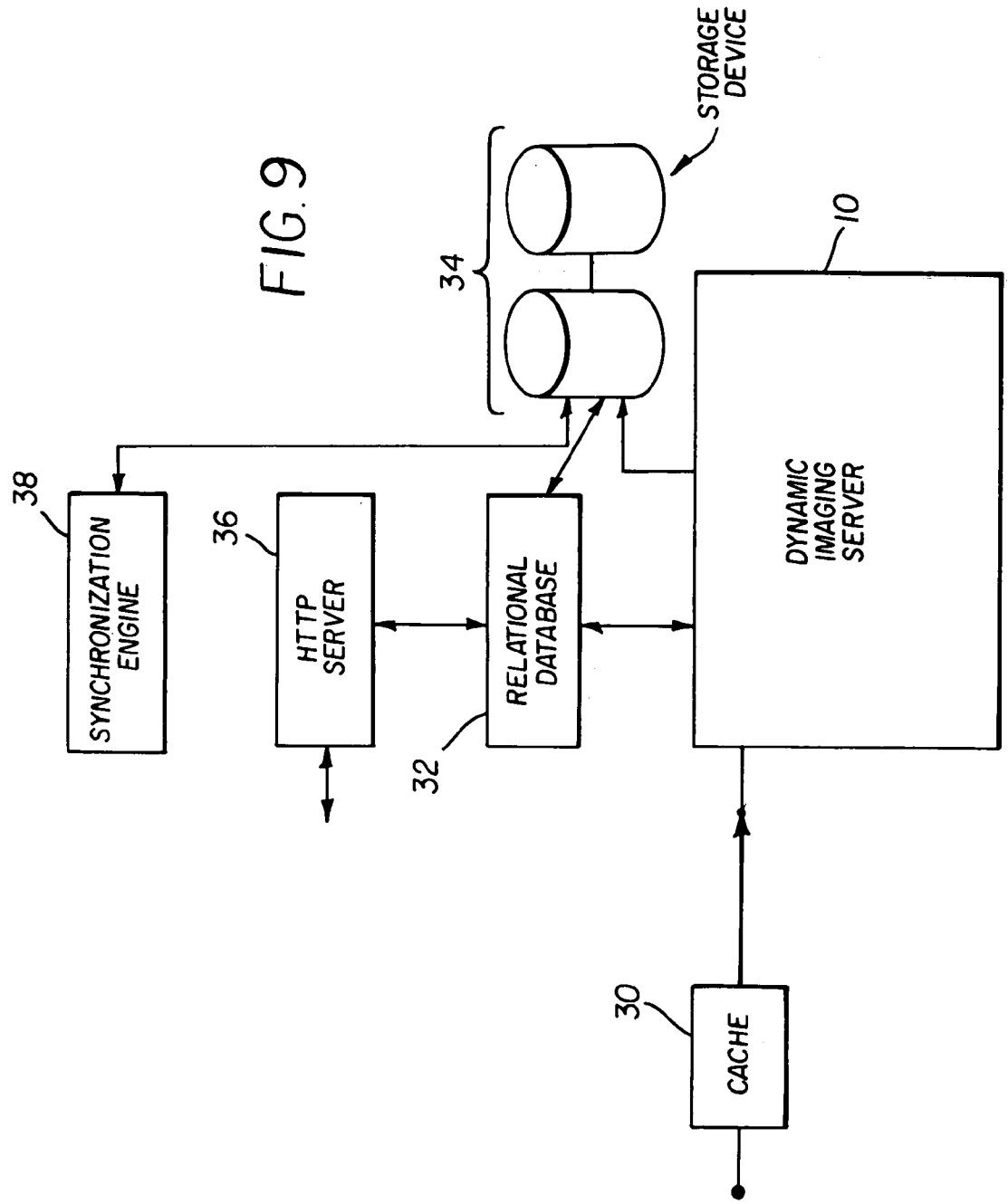
FIG. 9 illustrates a single node of a dynamic imaging system in accordance with the invention.

Referring now to FIG. 9, a system overview illustrating the implementation of the dynamic imaging server 10 into an overall dynamic imaging system in the form of a basic node. The basic node includes the dynamic imaging server 10 coupled to an input request cache 30, a relational database 32, and a storage device 34. The input request cache 30 is used to cache requests, wherein a subsequent request for an image that has already been created need not be processed by the dynamic imaging server 10. Instead, the image can be retrieved directly from the storage. New requests are forwarded to the dynamic imaging server 10 for processing. During the process of the request, the dynamic imaging server 10 may need to acquire a particular asset or other information. The dynamic imaging server 10 can query the relational database 32 to determine the location and availability of the asset. If the asset is not maintained on the local storage device 34, an HTTP server 36 can be utilized to retrieve the asset. The HTTP server 36 can also be utilized to allow for configuring of the dynamic imaging server 10 as explained in the attached Appendix. Finally, a synchronization engine 38 is provided to synchronize transfer of files from other sources to and from the local storage device 34.

Figure 10:
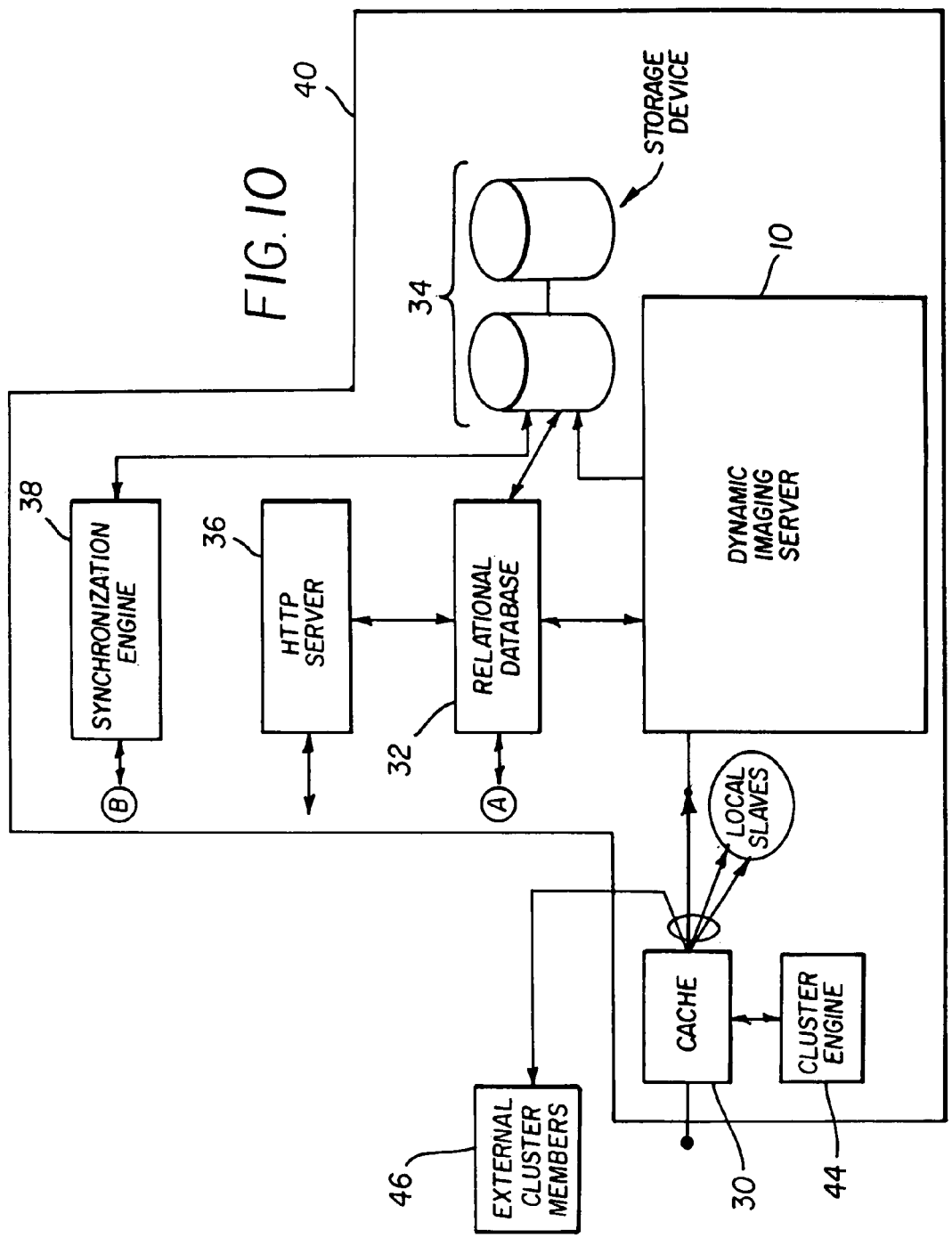
FIG. 10 illustrates a cluster master for a dynamic imaging system in accordance with the invention.

The architecture of the dynamic imaging system provides a great deal of flexibility in coupling multiple dynamic image servers 10 together depending on the requirements of a particular application. Multiple dynamic imaging servers 10, for example, can be linked together to form a cluster. For example, FIG. 10 illustrates a cluster master 40 that includes a cluster engine 44 in addition to the same elements of the basic node discussed above, while FIG. 11 illustrates a cluster slave 42 that is coupled to the cluster master 40. The cluster slave 42 also includes the elements of the basic node set forth above, with the exception of the relational database 34. The cluster engine 44 monitors the requests and determines which dynamic imaging server 10 within the cluster is best suited to handle the particular request. Accordingly, the cluster engine 44 acts to direct the flow of requests to the device most suited to handle that particular request.

As also noted in FIG. 10, the requests may be directed to external cluster members 46. In other words, each individual cluster may have at least one master and one or more slaves, and each individual cluster can be linked to another external cluster. The ability to link clusters together provides a great deal of application flexibility. In an electronic commerce application, for example, a user may have a cluster including several slave devices that are generally sufficient to meet the user's requirements during most periods of the year. In peak periods, however, the user may need additional processing capability. Instead of expanding the number of devices in its own cluster, the user can utilize the resources of other external clusters. The external clusters could be the user's own external cluster located at a different geographic locations or—in a preferred application—may be the cluster of a third party provider that leases or sells excess processing capability to the user. Providing this overflow processing capability permits the user to avoid the expense of purchasing and maintaining equipment that is not need for most of the year, while maintaining sufficient capacity during peak periods.

The factors used by the cluster engine 40 to determine request flow may include a number of parameters and is generally dependent on the particular application. As just one simple example, the cluster engine 40 determines which device in the cluster is currently idle and directs the next request to the idle device. It will be readily appreciated by those skilled in the art that the actual parameters to be utilized will be application specific but could include: geographic location of clusters; cluster processing loads; cluster data transfer capabilities; time variables; and the nature of the request to be processed.

The invention has been described with reference to certain preferred embodiments thereof. It will be understood, however, that modifications and variations are possible with the scope of the appended claims. As just one example, although the description of the detailed embodiments of the invention referred to the manipulation of image data, the invention is also applicable to other types of data including audio data. Accordingly, the principles of the invention are applicable to enabling an dynamic audio server that dynamically creates audio files in response to audio requests.

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyrights rights whatsoever.

APPENDIX

LiquiFire™ User's Guide

LiquidPixels™, Incorporated

LiquiFire™ and the LiquiFire™ User's Guide are
Copyright © 2000-2001 LiquidPixels, Incorporated.
All rights reserved.

LiquidPixels, Incorporated
9 Royale Drive
Suite 103
Fairport, New York 14450
716.223.8473 (voice & fax)

http://www.liquidpixels.net
Sales information: sales@liquidpixels.net

Information in this document is subject to change without notice and does not represent a commitment on the part of the copyright holder. The system described in this document is furnished under a license agreement. This document may not, in whole or in part, be copied, photocopied, reproduced, translated, or reduced to any electronic medium or machine-readable form without prior consent, in writing, from the copyright holder.

Version: 0 9.1

CHAPTER 1: Overview

Images   2
The Image Pool   2

Image Chains   3
Chain Representation   4
Multiple Images   5
Asset Sources   7
Image Creation   8
Stored Chains   8

Resident Assets   10

Expressions   11
Conditional Execution   12

Metadata   13
Image Specific Metadata   13

Non-Imaging commands   15
Metacommands   15
Macros   15

Security   17
Referring Host   17
Keyed Requests   17

Cache   19
Asset Cache   19
Render Cache   19

CHAPTER 2: LiquiFire Configuration

Clustering   22

Orb   23
Starting Orb   23

Configure   25
Administration: Users   26
LiquiFire: Host   28
LiquiFire: Cluster   30
LiquiFire: Client Access   31
LiquiFire: Cache   32
LiquiFire: Database   33
Remote Access: FTP Server   34
Remote Access: Cluster   35

| | |
|---|---:|
| License Key: View | 36 |
| License Key: Upload | 37 |
| Server Control: Start/Stop | 38 |
| Server Control: Update Config | 39 |
| Monitoring | 40 |
| Metering: System Status | 41 |
| Metering: Statistics | 42 |
| Activity: Access Log | 43 |
| Maintain | 45 |
| Resident Assets | 46 |
| Cluster: Synchronize | 48 |
| Render Cache: Flush Individual | 49 |
| Render Cache: Flush All | 50 |
| Asset Cache: Validate | 51 |
| Asset Cache: Flush Individual | 52 |
| Asset Cache: Flush All | 53 |
| Tools | 54 |
| Tools: Explorer | 54 |
| Tools: Font Map | 57 |
| Tools: Chain Cipher | 58 |
| Tools: Preferences | 60 |

CHAPTER 3: *Real World Examples*

| | |
|---|---:|
| Format Conversion | 62 |
| Image Scaling | 64 |
| Complex Scaling | 65 |
| Vector-based Formats | 67 |
| Dynamic Graphic Elements | 68 |
| Complex Calculations | 69 |
| Complex Imaging | 70 |
| Simple Text | 71 |

CHAPTER 4: *Base Command Set*

| | |
|---|---:|
| Source Commands | 73 |
| blank | 73 |
| source | 75 |

| | |
|---|---|
| select | 77 |
| Sink Commands | 79 |
| sink | 79 |
| Imaging Commands | 81 |
| addframe | 81 |
| addprofile | 83 |
| alphafill | 84 |
| annotate | 85 |
| attribute | 88 |
| bevel | 89 |
| blur | 91 |
| border | 93 |
| brightness | 95 |
| colorize | 96 |
| composite | 98 |
| contrast | 105 |
| crop | 106 |
| double | 108 |
| draw | 109 |
| fill | 114 |
| filter | 115 |
| flipx | 117 |
| flipy | 118 |
| frame | 119 |
| grid | 120 |
| gamma | 122 |
| gblur | 123 |
| half | 125 |
| hue | 126 |
| layer | 127 |
| optimize | 128 |
| quantize | 129 |
| removeprofile | 131 |
| resize | 132 |
| roll | 133 |
| rotate | 134 |
| saturation | 136 |
| scale | 137 |
| segment | 139 |
| sharpen | 140 |
| showid | 141 |
| svg | 142 |
| threshold | 143 |
| tile | 144 |
| transparent | 146 |
| usharpmask | 147 |
| unoptimize | 149 |

| | |
|---|---:|
| watermark | 150 |
| Macros | 151 |
| addalpha | 151 |
| bullet | 152 |
| mftext | 154 |
| text | 156 |
| textcurve | 158 |
| dump | 160 |
| Metacommands | 161 |
| auth | 161 |
| countdown | 162 |
| fontmetrics | 164 |
| load | 165 |
| regexcase | 166 |
| set | 168 |
| time | 169 |
| timecase | 171 |

APPENDIX A: Color Definitions — 173

APPENDIX B: HTTP Syntax Definition — 187

| | |
|---|---:|
| LiquiFire Syntax | 187 |
| Basic URI Syntax. | 187 |

APPENDIX C: Filter Control Values — 189

APPENDIX D: Image Metadata Fields — 191

| | |
|---|---:|
| LiquiFire | 191 |
| IPTC Metadata | 193 |
| EXIF Metadata | 196 |

CHAPTER 1  Overview

LiquidPixels' LiquiFire allows users to dynamically create and manipulate images on-demand, in real time. Images are created or altered by sending commands to the LiquiFire server, which will perform the operations and return the processed image.

LiquiFire presents many capabilities to the web designer, such as support for all popular image file formats, ability to render and manipulate vector images such as Encapsulated PostScript (EPS) and Scalable Vector Graphics (SVG), full International Color Consortium (ICC) color management, international (Unicode) typographic support, and manipulation of Exchangeable Image File (EXIF) and International Press Telecomminications Council (IPTC) *metadata*. Metadata – information about information – is data carried along with an image to convey additional details or characteristics beyond the picture itself.

LiquiFire assets such as images, image chains, color profiles, and fonts, can be acquired from many sources – over HTTP, FTP, or from an image repository on a LiquiFire server. They can be processed by *requests* sent to a LiquiFire server. Requests are a series of LiquiFire commands, described in detail in "Base Command Set" on page 73.

While LiquiFire is a very complex and powerful environment empowering the web designer with unmatched capabilities, it doesn't need to be intimidating – simple color, size, or format adjustments are extremely straightforward, and the most complex processing operations can just as easily be expressed. No detailed knowledge of imagery, file-formats, or image processing is necessary to take advantage of LiquiFire's potential.

The LiquiFire environment is managed via LiquiFire Orb™ – a sophisticated web-based environment through which all aspects of LiquiFire operation may be controlled. All configuration, maintainence, and monitoring that is required to operate a single server or LiquiFire cluster environment can be performed from within LiquiFire Orb.

LiquiFire User's Guide: Overview

Images

Digital images are the obvious basis for all LiquiFire processes. Images exist in many forms on the Internet, but in LiquiFire they can all be thought of in a single, unified fashion.

An image is comprised of one or more *frames* – a series of sub-images contained within one main image – which when rendered represent an array of pixels that can be displayed or printed.

In addition to being comprised of frames, images may:

- be described as pixels or as instructions
- contain image-specific metadata
- contain esoteric metadata
- have transparent regions, known as alpha channels Metadata is information carried along with an image that may be used for informational purposes. The width of an image, its format, original source, etc., are all examples of metadata. Images in LiquiFire always maintain their metadata throughout the image chain. Metadata is discussed more fully later, in "Image Specific Metadata" on page 13.

The Image Pool

When working with images in LiquiFire, images may need to be acquired or created. As images are introduced by a command in a request, these images reside in an *image pool* – a temporary collection of images maintained during each request. A separate image pool is created for each request, and is drained when the request is complete. Images in the pool are named so they can be identified and manipulated.

A special image in the pool – the current image, has a special name: '_'. All imaging operations affect the current image.

Certain commands add images to the image pool, and will accept an optional name argument by which the image in the pool will be known. If two images are named identically, the latter replaces the former in the pool.

Images in the LiquiFire environment may have multiple frames. If the file from which an image is retrieved supports multiple frames, it will be added to the pool just as any other image via the `source` command. As well, frames may be also added to images already in the pool. Once a multiple-frame image is in the pool, individual frames may be selected with the `select` command and subsequently manipulated as an independent image.

LiquiFire User's Guide: Overview

Image Chains

The *image chain*, the heart of a LiquiFire command, is a representation of a sequence of steps necessary to create the desired result image.

Image Chains are built within LiquiFire by sending a series of commands, called a request. As the request is processed, each command is interpreted, in sequence, resulting in the creation of an image chain. The image chain, along with its associated metadata is contained within a *job*.

There are three types of commands which may be sent to LiquiFire: *direct*, *macro*, and *metacommands*. Direct commands are the most common, resulting in the addition of an Operator to the image chain. Macro commands, may perform additional computation or processing, such as database queries, calculations, etc., before optionally adding zero or more Operators to the image chain. Finally, metacommands allow manipulation of non-image data (metadata) associated with the request.

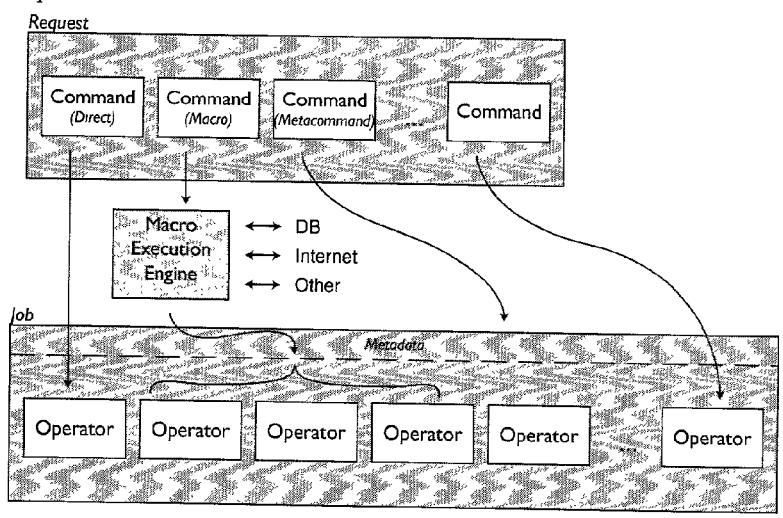

FIGURE 1. Command Processing

Let's look at a simple example:

Suppose you want to display an image in a web page within a space 200 pixels wide and 200 pixels tall. There are three steps required to process this image: Acquire the source image, scale it to the desired size, and send it to the requesting browser in a format the browser understands.

Graphically, the request might look like:

LiquiFire User's Guide: Overview

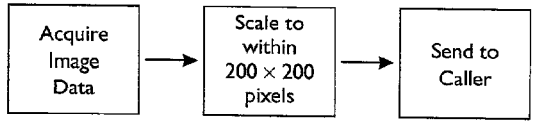

Figure 2:
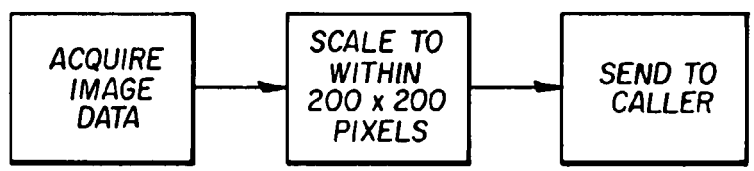
FIG. 2 is a schematic block diagram illustrating a request.

FIGURE 2. Simple Request Representation

The above illustration shows three direct commands within a simple request. These three direct commands will each create a single operator in the image chain.

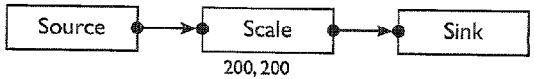

FIGURE 3. An image chain

The resulting image chain is no more complex.

Chain Representation

Image chains themselves are not directly created. Rather, they are represented as a sequence of commands, each with a list of optional arguments. Each command represents one or more operators, macros or metacommands. These commands, in turn, are interpreted to create the image chain.

Image chains can be represented in many different ways. In fact, while LiquiFire understands image chains represented as either HTTP or XML, additional representations can be added to LiquiFire if needed.

The example depicted in Figure 3 contains three operators, with the second having two arguments, width and height. This example can be represented with three corresponding commands in an HTTP request.

The HTTP syntax for LiquiFire is designed to be simple to read and develop. For the technically inclined, the Modified Backus-Nauer form (mBNF) of the HTTP request is listed in the Appendix, "HTTP Syntax Definition" on page 187.

Commands are identified by name, and may result in one or more (as in the case of a macro) operators being added to the image chain. Optional named arguments begin with an equals sign '=' and are separated by commas ',' with their values surrounded by square brackets ('[' and ']'). Commands may have zero or more arguments.

```
commandName=argumentName[value],anotherArg[AnotherValue]...
```

Figure 4:
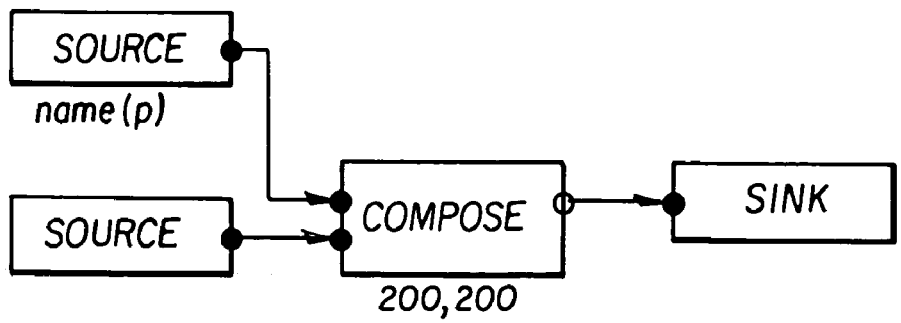
FIG. 4 is a schematic block diagram illustrating a multiple image chain.

FIGURE 4. Example Command Syntax

This User's Guide will focus solely on the http representation of LiquiFire requests. In the http request form, commands are processed in sequentially, and are separated in the request by an ampersand character '&' as per the http standard for get requests:

```
commandOne=argOne[valueOne],argTwo[valueTwo]&commandTwo&...
```

FIGURE 5. Multiple Commands

For legibility in this document, Requests within the examples may be separated into several lines.

Returning to our simple image-scaling example above, represented as a real LiquiFire Request, it might be:

```
source=url[http://www.liquidpixels.net/images/cat.jpg]&
scale=geometry[200x200]&
sink
```

FIGURE 6. Simple LiquiFire Command

Here we can easily see the three commands, source, scale, and sink, together in a single request.

Multiple Images

Many requests will need to perform processing on more than one image. Yet the image chain representation becomes no more complex. In this example, one image is composed with another – the secondary image is blended, or layered, with the first at the location specified in the chain.

Graphically, the chain we would like to create looks like:

LiquiFire User's Guide: Overview

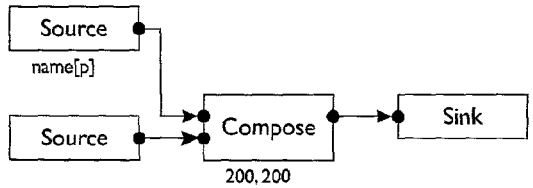

FIGURE 7. Multiple Image Chain

Since requests are represented as a sequence of commands, we must use references to other commands to describe a bifurcated chain. The image chain above could be created by the following LiquiFire request:

```
source=url[http://www.liquidpixels.net/images/penguin.gif],
    name[p]&
source=url[http://www.liquidpixels.net/images/truff.jpg]&
composite=compose[Over],image[p],x[200],y[100]&
sink
```

FIGURE 8. Multiple Image Commands

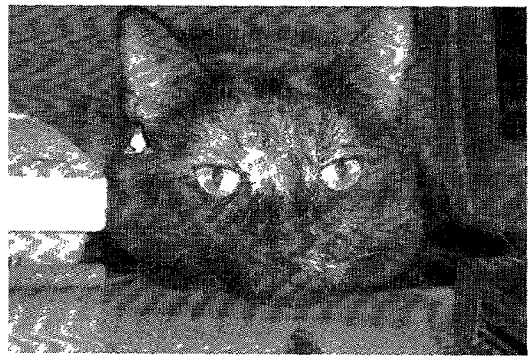

FIGURE 9. Simple Composition

Notice in this example there are two source commands, with the first one additionally specifying a name argument with the value of 'p'. This additional argument tells LiquiFire to take the penguin.gif image and add it to the pool as an image named 'p'. The second source command does not specify a name – the image is added to the pool as the current image, or '_'.

The composite transform operator requires a composition type specified by the compose argument and the name of an image in the pool to compose with the current image, specified by the image argument. The optional x and y arguments define an offset for the composition. Complete details of all the commands and their arguments is in the chapter, "Base Command Set" on page 73.

Now let's look at a small change to the previous example:

```
source=url[http://www.liquidpixels.net/images/truff.jpg],
   name[cat]&
source=url[http://www.liquidpixels.net/images/penguin.gif],
   name[p]&
select=name[cat]&
composite=compose[Over],image[p],x[200],y[200]&
sink
```

FIGURE 10. Alternative Composition Commands

There are two differences here. First, the order of the source commands has been reversed, and both source commands specify image names. Second, there is a new command: select, used to make one of the images in the pool the current image. Functionally, this example is no different from the previous, but it can be easier to understand, since the 'current image' is no longer an inferred assignment.

Asset Sources

As noted earlier, LiquiFire assets can be acquired from many sources. The source of an asset is specified as a URI, with the http://, shttp://, ftp://, gopher:, and file: method types supported. Additional types may be added to LiquiFire.

For the common network based methods, the asset is retrieved from the location specified by the URI to the LiquiFire server where they are stored and managed by LiquiFire's intelligent caching system. If the original image is altered, it will be re-transferred to LiquiFire, otherwise, once the image is managed by LiquiFire, it is not re-transferred unnecessarily.

URIs utilizing the file: method direct LiquiFire to retrieve the specified asset from the local LiquiFire Asset Pool. Assets may be added to and managed within the Asset Pool via LiquiFire Orb, discussed in "Resident Assets" on page 46.

LiquiFire User's Guide: Overview

Vector formats allow for limitless scaling and rotation of imagery without the pixel re-sampling and resulting reduction of quality otherwise necessary.

Images can be acquired in an ever-growing list of file formats, including formats that do not represent images as pixels, such as PostScript™, Encapsulated PostScript (EPS) or Simple Vector Graphics (SVG).

Image Creation

Certain situations will warrant the introduction of a new (possibly blank or patterned) image into the image chain. Perhaps a transparent spacer image is needed, or a background on to which text will be drawn. The blank command adds a blank image creation operator to the image chain.

The blank command is used to add an operator to the image chain that creates a new solid image in the image pool:

```
blank=color[red],width[100],height[30]&
sink
```

FIGURE 11. Creating a new image

The new image can be created in any color desired, with many standard colors available by name. The complete list of named colors and the format for specifying custom colors is in the Appendix, "Color Definitions" on page 173.

Stored Chains

Note the difference between a macro command and a stored chain. Macro commands are executable computer code designed to perform complex, and often custom, operations during image chain creation. Stored chains, on the other hand, allow users to store often used request fragments for simple re-use later.

LiquiFire image chains can be stored to disk and can be retrieved from disk or any network accessible location. This ability to store image chains – as portions or complete chains – allows users to amass a library of imaging functions which can be assembled later to perform imaging tasks. Coupled with the use of esoteric metadata (see "Metadata" on page 13) and the set command (page 168), stored chains can behave as *functions*, allowing simple URLs to achieve powerful results.

Suppose you wish to adorn a set of web pages with section tabs similar to the one below:

FIGURE 12. A Graphic Tab

With the graphic for the image tag created as an EPS file, the following image chain could be used to create a section tab with a section name:

```
source=url[file:tab.eps]&
annotate=font[Arial-Roman],pointsize[9],text[Section+One],
    gravity[Center],fill[black]&
sink=format[GIF]
```

FIGURE 13. Section Tab

With this simple image chain, section tab images can be easily created for any area of the web site, without needing to create them ahead of time.

Since stored chains are referenced by URI just as any LiquiFire asset, they may be stored within the Resident Asset Pool or any network-accessible web or FTP server With stored chains, however, this repetitive process can be made simpler. By replacing the text argument in the annotate command with a reference to global esoteric metadata, a portion of this image chain becomes a reusable function stored on the LiquiFire server. Notice that the sink command was omitted from the request.

```
source=url[file:tab.eps]&
annotate=font[Arial-Roman],pointsize[9],
    text[global.section],gravity[Center],fill[black]
```

FIGURE 14. Section Tab Fragment

Image chain fragments can be stored on any server in a file, and can be retrieved as part of a request by using the load command (see "load" on page 165). The set command (see "set" on page 168) can be used to assign values to global metadata fields within stored fragments. If the image chain fragment above in Figure 14 was stored on a web server http://www.domain.com in the file /chains/tab.chain, then the following image commands could be used to create a tab graphic:

```
set=key[section],value[Section+One]&
load=url[http://www.domain.com/chains/tab.chain]&
sink
```

FIGURE 15. Using a Stored Chain

Resulting in a customized tab image:

FIGURE 16. Custom Tab Image

LiquiFire User's Guide: Overview

Resident Assets

LiquiFire assets – images, fonts, stored chains – can be retrieved from any valid URL. LiquiFire supports the file: method within these URLs, indicating that the asset should be retrieved from the LiquiFire resident asset pool. This section describes LiquiFire Orb's facilities to manipulate and explore the asset pool.

LiquiFire's asset pool is divided into three distinct sections, each matching a corresponding type of data and therefore, matching a class of commands. The source command looks to the art asset pool; annotate, text, mftext, and textcurve look to the fonts asset pool; and the load command looks to the chains asset pool. Additionally, the addprofile command looks to the art asset pool for ICC color profiles.

When several LiquiFire servers are installed as a cluster, each slave server accesses a synchronized copy of the master's Resident asset pools, providing unified access to assets without any reduction in performance. Synchronization occurs on a regular basis, determined during configuration via LiquiFire Orb, and can be performed manually at any time.

Additional information regarding the Resident asset pools, manipulation capabilities of LiquiFire Orb, and cluster synchronization can be found in "Resident Assets" on page 46.

LiquiFire User's Guide: Overview

Expressions

LiquiFire commands may contain arbitrary mathematical expressions which will be evaluated when the image chain is created from the request. Expressions are enclosed by parenthesis '(' and ')', and may contain references to image metadata fields.

Expressions are an important element of LiquiFire's flexibility. They permit image manipulations to be constructed in situations where certain aspects of the source image or the necessary target are not known, or when metacommands are used to make decisions during rendering.

Simple expressions are useful to increase clarity within some operation. For example, let's look again at the penguin composition example on page 6. In this case, however, let's position the penguin at the center of the underlying cat image. To do this, we need to know the size of the cat image – information which we don't have available, but can use expressions (and image metadata) to determine.

```
source=url[http://www.liquidpixels.net/images/penguin.gif],
   name[p]&
source=url[http://www.liquidpixels.net/images/truff.jpg]&
composite=compose[Over],image[p],
   x[(_.width/2)],y[(_.height/2)]&
sink
```

FIGURE 17. A Simple Expression

Notice that the image specified in the second source command above, while not explicitly named, can still be identified by the current image name '_'.

The identified image metadata width and height (see section "Metadata" on page 13) are each used within small expressions to determine the center of the current image (named '_').

Expressions in LiquiFire are not typed – an expression resulting in a numeric result can be used later as text to be drawn onto an image. Likewise, textual, yet numeric metadata can be used within arithmetic expressions.

Certain characters may not be permitted within a request of a specific form. HTTP requests, for example, present a limited character set due to the use of several characters by the protocol to indicate special meaning. In all cases, however, encoding techniques specific to the representation can be used to overcome this limitation. LiquiFire Explorer, a component of the Orb management environment, can assist with URL encoding.

Several Metacommands are available that perform decision making operations such as if-then, string matching, or time and date determination. These Metacommands all perform by manipulating global metadata, and the results of their operation can be used within expressions. Let's look at a more complex example:

LiquiFire User's Guide: Overview

```
blank=width[600],height[60],name[bg]&
annotate=text[Only],font[Arial-Bold],pointsize[22],
    fill[black],y[35],x[10]&
annotate=text[days+left+till+Christmas],font[Arial-
Bold],pointsize[22],
    fill[black],y[35],x[150]&
countdown=target[12/25/2001],key[days]&
annotate=text[global.days],font[Dominican],pointsize[36],
    fill[red],y[40],x[82]&
optimize&
sink=format[gif]
```

FIGURE 18. Countdown Example

In the previous example, the number of days remaining until Christmas 2001 is determined by the countdown metacommand supplied with LiquiFire. The resulting number is placed in the global metadata in a field named days, specified by the key argument in the countdown command. Each time this request is processed, the operators that result may contain different values, based on the number of days remaining. This information is used by the annotate command later in the request to draw a custom message on the image. Simple, yet very powerful.

Conditional Execution

Sometimes there are situations where a command within a request should only be executed if a certain criteria is met. Perhaps an image should only be reduced if it exceeds a certain size. Or, perhaps, only images in CMYK should only be converted to RGB, as illustrated in Figure 19. LiquiFire's conditional execution of commands allows for command processing to occur only if a criteria is valid.

```
source=url[http://www.liquidpixels.net/images/Spain.jpg],
    name[image]&
scale=size[500]&
addprofile=url[file:profiles/sRGB.icm],
    if[('image.colorspace' ne 'RGB')]&
sink
```

FIGURE 19. Conditional Execution Example

Any LiquiFire command may contain an additional special argument, 'if'. when the if argument is present for a command, the value of the if argument is evaluated, and the command will be skipped during processing if the value is numerically zero or blank.

Metadata

Images have two components: a visible component, represented as pixels, vector information, or instructions, and a non-visible component called metadata. Metadata comes in two forms, image-specific metadata, representing physical aspects of an image (height, width, color depth, format, etc.) and logical aspects of an image (cached, name, etc.) and esoteric metadata, representing any additional information associated with an image by the user. Image-specific metadata is inherent to the image, it can not be changed explicitly, while esoteric metadata can be arbitrarily manipulated as needed. Esoteric metadata can be manipulated by the attribute command.

Both types of metadata are available to LiquiFire commands within a request. There is no distinction made between image and esoteric metadata within a request.

Metadata is accessed by image pool name, followed by a dot '.' And the name of the metadata field desired. For example, the string `cat.width` could be used within a command to determine the width of an image named `cat`. The current image can also be queried for metadata, even when it is not explicitly named by using an underscore '_' as the image name (`_.width`).

Beyond metadata associated with an image, there is also metadata associated with a request. This metadata, solely esoteric, can be used to pass information between commands in a request, much as variables are used in programming languages. Request-centric metadata is known as Global metadata, and is accessed via a special image name global.

Esoteric metadata can be set globally or specifically for an image by using the `set` metacommand, or by certain other metacommands and macros that may make decisions or calculations earlier in a request.

Image Specific Metadata

Two forms of image-specific metadata are detected and extracted by LiquiFire for use in image chains: IPTC metadata and EXIF metadata.

The International Press Telecommunications Council, or IPTC, defines a format for the exchange of metadata in news content including photographs. Many desktop imaging applications allow you to add IPTC metadata to your images, or view any data already in place. The IPTC metadata fields are listed in "IPTC Metadata" on page 193.

The EXIF, or Exchangeable Image File, defines a common format for image interchange in use by most digital cameras on the market today. Along with the image capture, devices supporting EXIF will populate the EXIF metadata fields with camera-

LiquiFire User's Guide: Overview and possibly location-specific information known at the time of capture. The EXIF metadata fields are listed in "EXIF Metadata" on page 196.

Both EXIF and IPTC metadata can appear in an image together.

LiquiFire User's Guide: Overview

Non-Imaging commands

Non-Imaging commands are commands which, when executed, result in the addition of zero or more new operators added to the image chain. They differ from basic commands in that they do not perform imaging operations themselves. Rather, they are useful to make decisions, fetch data from an external source, perform repetitive commands, and to reduce complex, yet often-repeated imaging operations into a simple single command.

Non-imaging commands can be separated into two categories: metacommands and macros.

Metacommands

Metacommands are commands intended to manipulate metadata. LiquiFire has several stock metacommands:

| Command | Function | Reference |
|---|---|---|
| countdown | Calculates the time remaining from the current time until the date specified. | page 161 |
| fontmetrics | Determines the future resulting size of text when rendered in a specified font and size. | page 164 |
| regexcase | A case statement for string expression matching. | page 166 |
| set | Sets a field in the global metadata to the value specified | page 168 |
| timecase | Given a list of dates, times, or date-times, returns the corresponding value when the current time falls within one of the specified ranges. | page 170 |

Macros

LiquiFire is designed to be extensible. One of the areas in which LiquiFire can be extended is via the development of custom Macros. A macro appears as any other command within a request, but may be designed to perform complex computations, database access, or other computations as precursor steps to adding zero or more operations to the image chain, or setting esoteric metadata. A macro may, for example, be developed to query a database of product information and set esoteric metadata to the current price. This metadata could then be used later in the request to image sale information on the image, or as the basis for conditional execution of a command.

Certain macros are simple conveniences – the common use of LiquiFire to create an image containing styled text rendered in an attractive typeface can be simplified via a macro. To do this takes without a macro three steps: first, determine the size of the text to be rendered, in pixels, second, create a new blank image of that (or slightly larger) size; and third, render the text onto the new blank image. The text macro does just this: it calculates the bounding box for the text to be rendered, and then adds two new operators to the image chain: a blank operator and an annotate operator.

LiquiFire macros can be developed by LiquidPixels to customize the LiquiFire environment for your needs.

Security

In most environments, there is no need to restrict access to a LiquiFire server or cluster. Some environments, however, will require certain restrictions to be placed on access to the server.

LiquiFire security is disabled by default. See "LiquiFire: Host" on page 28 for information on using LiquiFire Orb to enable security and how to select the types of restrictions. See "LiquiFire: Client Access" on page 31 for further information regarding the creation of host access lists.

There are two mechanisms by which access to a LiquiFire server can be restricted: referring host, and keyed requests.

Referring Host

This method is most applicable to websites using LiquiFire for imaging within their own environments or a limited number of external environments. It is not a desirable mechanism for securing LiquiFire access within the arena of HTML e-mail.

When a web browser makes a request to a server, it sends with the request information describing the HTML resource that referred the request. When following a link from one HTML page to another, for example, the browser informs the web server of the URL from which the second page is accessed. When a browser makes a request for an image, the web browser will inform the server the URL of the page containing the image tag.

It is this information that LiquiFire uses to restrict use of a LiquiFire server by alien sites. To do this, LiquiFire must be presented with a list of server names (or URLs) for which requests are permitted. Once the list is complete, and host based security is enabled, any attempts to access LiquiFire via an image tag served by a server not listed will not be permitted. Operation is transparent when the request is made from a web browser, even under JavaScript control.

Keyed Requests

When requests are made from a non-browser environment – HTML e-mail, a Java applet, an application – the referrer information used in host based security is not present. In this case, an additional command must be added to the LiquiFire chain containing a key, unlocking LiquiFire for that request.

A unique key is created for each request to be made; keys are based on the image chain itself, and a 'secret' known to the LiquiFire owner. Keys may be created by using LiquiFire Configurator, or by implementing the algorithm available from LiquidPixels.

LiquiFire User's Guide: Overview

Let's look at a quick example of a keyed request. Suppose you wish to use LiquiFire to perform the following imaging manipulation:

```
source=url[http://www.liquidpixels.net/images/cat.jpg]&
scale=geometry[200x200]&
sink
```

FIGURE 20. Simple Request

Attempting to make this request to a LiquiFire server configured to have key based security enabled will result in an access denied error. To unlock LiquiFire, we first must generate the key for this request via configurator. The resulting key might look like d409fb30 or UmFuZG9tSVbWQPNcmpQy1SiDuszzKIci0+sWsvhmpYY=, depending on the strength of the key you requested, a hash or cipher, respectively.

Once the key has been obtained, the request is slightly modified to include this additional information:

```
source=url[http://www.liquidpixels.net/images/cat.jpg]&
scale=geometry[200x200]&
auth=hash[d409fb30]&
sink
```

FIGURE 21. Simple, Authorized Request

The auth command may appear anywhere in the image chain. See "auth" on page 161.

Cache

LiquiFire maintains two separate cache systems: an *asset cache*, for source images, fonts, profiles, and stored chains; and a *render cache*, for rendered images. Both caches perform the same basic function, to keep recently accessed data near-by such that subsequent accesses are as rapid as possible.

Asset Cache

When any asset is requested via URL in a command such as source or annotate, the asset is retrieved from the location specified and stored within the LiquiFire Asset Cache. Subsequent requests for the same asset will use this cached copy, saving the overhead of the network retrieval.

In clustered LiquiFire environments, this asset cache is automatically synchronized to appear as a single, unified, transparent cache. LiquiFire Orb can be used to remove individual items, flush the entire Asset Cache, or initiate validation of the cached data with the original remote assets. See page 51 for further information.

Render Cache

Similar to the Asset Cache, LiquiFire maintains a cache of all rendered images. This cache is used to accelerate repeat requests for a chain, serving the cached result rather than re-render the image. The decision to return a cached image is based on the request; requests must match *exactly* to cause a cached response to be used.

LiquiFire's Render Cache subsystem yields very high performance, and may be used as a mechanism to serve pseudo-static images – images which are dynamic, but which change infrequently – in a fashion akin to conventional batch processing.

LiquiFire Orb can be used to remove individual items, or flush the entire Render Cache. See page 49 for further information.

LiquiFire User's Guide: Overview

CHAPTER 2  *LiquiFire Configuration*

LiquiFire is a complex environment. That said, there are only a few simple configuration aspects that need to be performed to bring a new server on line. In fact, aside from entering basic host information in the "LiquiFire: Host" pane on page 28, there is no additional required configuration necessary.

This chapter covers LiquiFire Orb, a Web-based tool used for LiquiFire configuration, mainainence, monitoring and access to other helpful tools.

LiquiFire User's Guide: LiquiFire Configuration

Clustering

LiquiFire can be installed as a single server, as multiple discrete servers, or as a *cluster* – a collection of servers working in concert as a single server.

Multiple LiquiFire servers, or *nodes*, can be assembled in many varying configurations, depending on the task or environment. While typical configurations of single servers as well as a cluster containing a single Master and one or more slaves, it is possible to configure complex cluster architectures.

Each LiquiFire server contains sevaral functional components. Nodes can be configured as a Master or Slave. Master nodes can perform image manipulations, but can additionally manage the other nodes in the cluster. Slave nodes perform as highly-efficient workers, operating to only perform rendering.

Orb

LiquiFire Orb™ is a sophisticated web-based environment through which all aspects of LiquiFire operation may be controlled. All configuration, maintainence, and monitoring that is required to operate a single server or LiquiFire cluster environment can be performed from within LiquiFire Orb.

Starting Orb

LiquiFire Orb is accessed through any standard web browser at

```
http://ipaddress:88/
``` where ipaddress is the ip address of your LiquiFire server. You will be presented with the LiquiFire login screen similar to Figure 22.

> The name of the LiquiFire server you are accessing will appear below the Orb title, similar to the name 'LiquidPixels Public' is displayed in this example. If you have not yet configured the name of the server, nothing will be displayed.

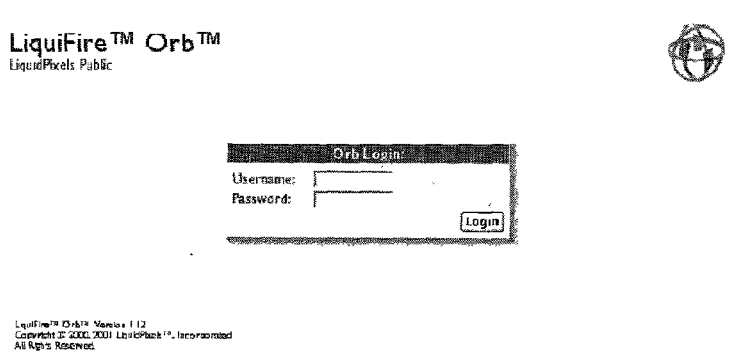

FIGURE 22. Orb Login

As shipped, Orb has a single account, with username liquifire, and password admin. Using Orb, both the username and password can be changed later. It is strongly recommended that the default username and password be changed at the earliest opportunity, to prevent unauthorized access to LiquiFire Orb. LiquiFire Orb will automatically require you to re-login after a certain amount of inactivity.

Once successfully logged in, you will be presented with the following screen:

LiquiFire User's Guide: LiquiFire Configuration

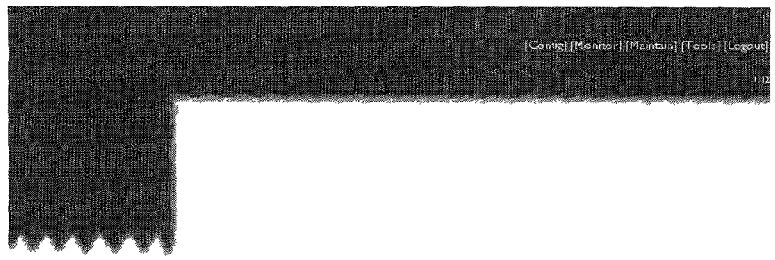

FIGURE 23. Orb Main Screen

The top right area of the Orb screen presents up to four sections, representing the four actions of Orb may be used to perform.

| Section | Functions Within |
| --- | --- |
| Config | Functions relating to the core configuration of a LiquiFire server, cluster member, or whole cluster. |
| Monitor | Monitoring LiquiFire performance, activity, and behavior |
| Maintain | Allows manipulation of LiquiFire asset storage for artwork, fonts, and chains, as well as to query or clear the asset and render caches |
| Tools | Tools for chain development, foreign-characterset exploration, and chain cipher generation |
| Logout | Leaves LiquiFire Orb |

The options available may be restricted, based on the access permissions for the particular Orb user. See "Administration: Users" on page 26 for further information about Orb accounts and access permissions.

LiquiFire User's Guide: LiquiFire Configura-

Configure

The configuration section is used to control overall LiquiFire operation. This includes Orb account administration, LiquiFire server configuration, Cluster member management, and Remote Access.

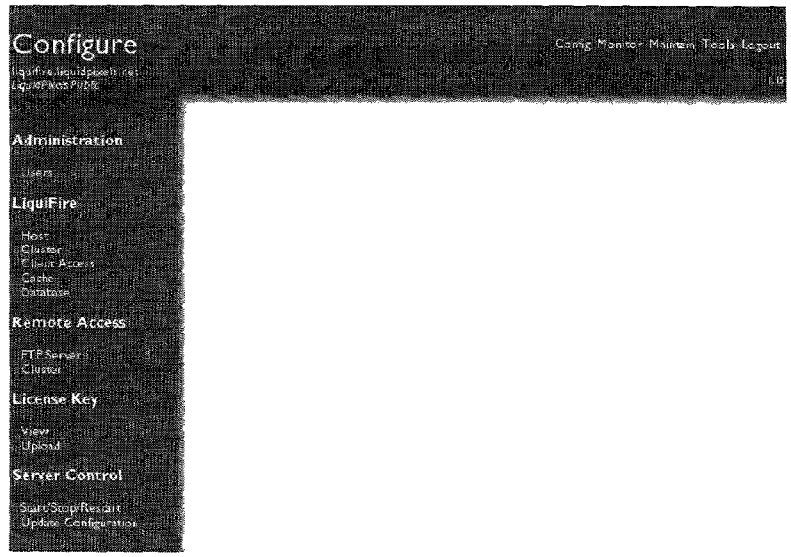

FIGURE 24. Configure Section

The Configure section controls five areas:

- Administration: Orb accounts and access permissions
- LiquiFire: detailed server, cluster, and database configuration
- Remote Access: control aspects of LiquiFire remote accessability
- License Key: view or update the current LiquiFire license key
- Server Control: Start, Restart, and Stop LiquiFire If the LiquiFire server being configured is a *slave*, the Cluster option will not be displayed.

LiquiFire User's Guide: LiquiFire Configuration

Administration: Users

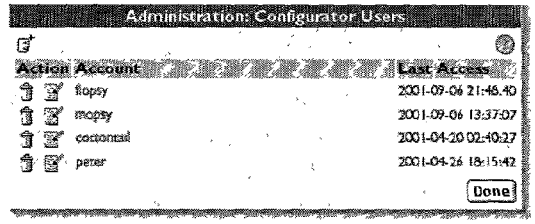

FIGURE 25. Administration: Users

As described above, LiquiFire Orb can be used for four purposes: Configuration, Monitoring, Maintainence, and Tools. The Users pane is used to Add, Edit, and Remove Orb users, each of which may be permitted to use all or some of the four sections.

The pane illustrated in Figure 25 lists the current set of Orb users. Adjacent to each listed account are action buttons, as well as the New Account and Help buttons at the top of the pane. This layout is used throughout Orb.

| Command | Description |
| --- | --- |
| | New Account |
| | Add a new Orb account |
| | Edit Account |
| | Edits a Orb account |
| | Remove Account |
| | Removes a Orb account |
| | Help |

Clicking the New Account or Edit Account icon will display the edit pane, as illustrated in Figure 26. Here the username and password for a user may be entered or changed, as well as select which of the Orb sections will be accessable by the user.

LiquiFire User's Guide: LiquiFire Configura-
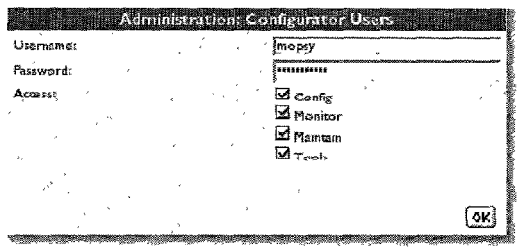
FIGURE 26. Administration: Users: Edit
The default user account, liquifire, has access to all four sections enabled. Be sure to maintain at least one account with configuration access, or you will be unable to make further changes.

LiquiFire User's Guide: LiquiFire Configuration

LiquiFire: Host

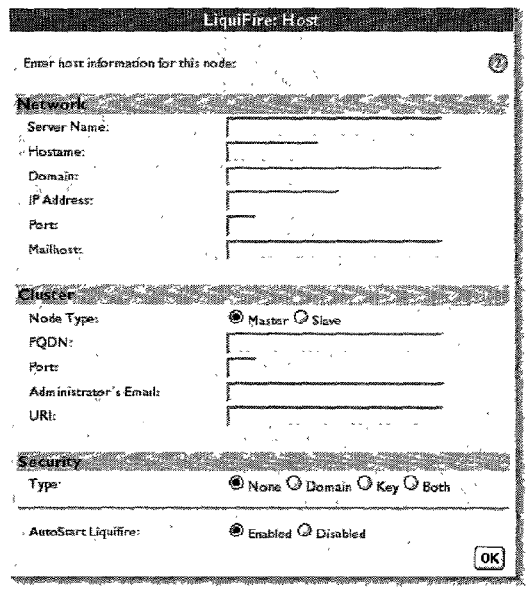

FIGURE 27. LiquiFire: Host

The Host pane is used to configure basic system and network settings for a LiquiFire node. It is devided into three sections: Network, allowing for basic host configuration, Cluster, describing aspects of the entire LiquiFire cluster, and Security, selecting which of the security modes should be active.

| Field | Description |
|---|---|
| Server Name | This field determines the human-readable name for the server. This name will be used to identify the server to the administrator within Orb, in diagnostic messages, and automated e-mail |
| Hostname | The network hostname of the node |
| Domain | The network domain of the node. For example, liquidpixels.net |
| IP Address | The IP address of the node |
| Port | The TCP/IP port on which the Rendering Engine should listen Typically 81, this should only be changed when complex server environments require. |

| Field | Description |
|---|---|
| Mailhost | The IP address for the SMTP mailhost LiquiFire should use to send email, when required. |
| Node Type | The node type, either Master or Slave. |
| | Nodes may be either Masters or Slaves. See page 22 for a detailed discussion of LiquiFire clustering. Single LiquiFire servers should choose Master; there must be at least one Master node in a cluster. |
| FQDN | The Fully-Qualified Domain Name for this node. This is the name by which users will access the LiquiFire cluster, as a single logical entity. For a single node, this is typically the combination of the Node Hostname and Node Domain, above. For clusters or other complex situations, such as where IP-Redirectors are used, this field may be different. |
| Port | The TCP/IP port on which the entire LiquiFire cluster should listen, typically 80 |
| Administrator's Email | The email address to which LiquiFire will send email in situations where problems or other notification is required |
| URI | The URI to which LiquiFire commands will be made. This is a single word, following the domain name in an HTTP request, illustrated in green: |
| | `http://liquifire.liquidpixels.net/image?` |
| Security Type | Determines the security model to use when validating requests. |
| | See "Security" on page 17 for detailed information on LiquiFire security models. |
| Autostart LiquiFire | If enabled, LiquiFire and all its subsystems will be automatically started when the server is booted or rebooted. |

LiquiFire User's Guide: LiquiFire Configuration

LiquiFire: Cluster

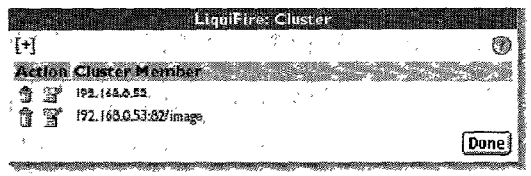

FIGURE 28. LiquiFire: Cluster

LiquiFire servers may be organized into a logical cooperative group called a *Cluster*. In a cluster, several nodes work in concert to share the overall burdon of creating, manipulating, and serving images. Clusters are managed by the Master node, and may have one or more slave nodes. On a Master node, this pane allows you to add, edit, or remove members from a cluster as slaves. The members you add may be either Masters or Slaves, according to your desired system design. See "Clustering" on page 22 for additional information on LiquiFire Clustering.

Note that each node added to a Master node must, in turn, have the Master node listed as an authorized Master. See "Remote Access: Cluster" on page 35 for additional information.

While you can add cluster members by either fully-qualified domain name, or by IP address, we recommend that you use IP addresses exclusively.

Members of the cluster may have differing port or URIs than the server to which they will be slaves. In these cases, enter the optional port or URI may be entered along with the IP address in the form ip:port/URI. For example, adding a member as 192.168.0.1:81/image specifies the slave at 192.168.0.1 be accessed via port 81 with the URI image.

| Command | Description |
|---|---|
|  | Add Member<br>Add a new member to the cluster. |
| 🖉 | Edit Member<br>Change an existing cluster member |
| 🗑 | Remove Member<br>Remove a cluster member |
| ❓ | Help |

LiquiFire: Client Access

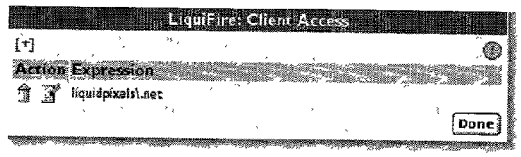

FIGURE 29. LiquiFire: Client Access

As described in "Referring Host" on page 17, one of the mechanisms available for authentication is to control access to a LiquiFire host by Referring Host. This approach requires a list of authorized referring hosts to be maintained.

This pane allows you to manage the list of authorized hosts, by expression[1]. Each expression in the list is checked against the referring host, and if a match against any is found, the request is allowed. An expression of liquidpixels\.net, for example, would match www.liquidpixels.net as well as appletree.liquidpixels.net.

| Command | Description |
|---|---|
| | Add an Expression<br>Add a new access expression to the list. |
| | Edit Member<br>Change an existing access expression |
| | Remove Member<br>Remove an expression |
| | Help |

---

[1]. Regular Expressions provide a general mechanism for describing patterns of characters to match. There are many good references on the Web containing detailed information.

LiquiFire User's Guide: LiquiFire Configuration

LiquiFire: Cache

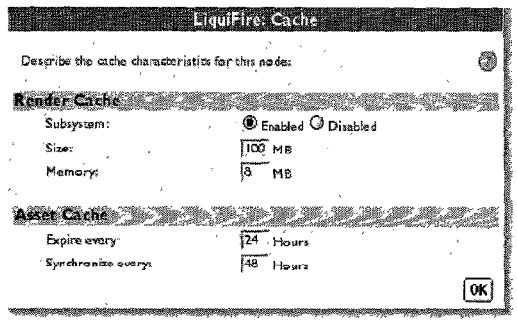

FIGURE 30. LiquiFire: Cache

This pane controls the aspects of the *Render Cache* described in "Cache" on page 19. Each image rendered by LiquiFire is maintained in a complex caching system, allowing repeat requests to be optimised.

| Field | Description |
| --- | --- |
| Subsystem | Enables or Disables the render cache. The Render Cache must be enabled for Cluster configurations. |
| Size | Determines how much disk space should be allocated to caching result rendered images, typically 100MB. |
| Memory | Determines how much memory should be allocated to caching result rendered images, typically 8 MB. In situations where large numbers of requests will likely be made to recently rendered images, it may be desireable to increase this value. |
| Expire Every | The number of hours after which LiquiFire will contact the original host to verify the asset still exists and has not changed. |
| Synchronize Every | The number of hours after which LiquiFire will synchronize the Asset cache contents between members in the cluster. |

LiquiFire: Database

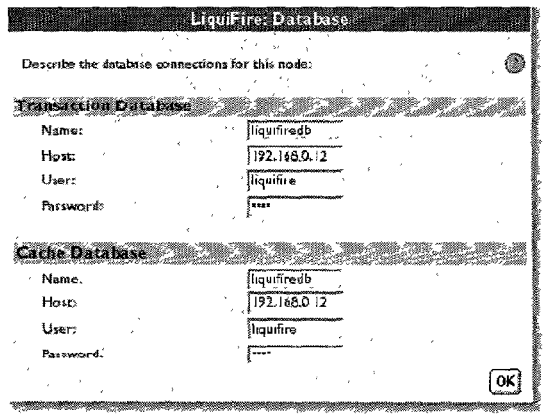

FIGURE 31. LiquiFire: Database

LiquiFire uses an internal database to manage many of its functions. In certain, specialized situations, it may be desirable to override the default database with which LiquiFire communicates for cache and transaction information. This pane allows you to specify settings for those communications.

Do not alter this information unless you know what you're doing.

| Field | Description |
|---|---|
| Name | The database name in which transaction information is stored |
| Host | The hostname or IP-address of the server hosting the database |
| User | The database username |
| Password | The database password |
| Name | The database name in which cache information is stored |
| Host | The hostname or IP-address of the server hosting the database |
| User | The database username |
| Password | The database password |

LiquiFire User's Guide: LiquiFire Configuration
Remote Access: FTP Server
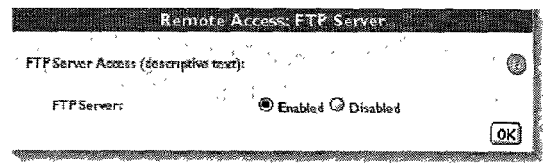
FIGURE 32. Remote Access: FTP Server
LiquiFire's local asset pool, conventionally managed by Orb as described in "Maintain" on page 45, may alternatively be access via FTP using any common FTP client.
| Field | Description |
|---|---|
| FTP Server | If enabled, The LiquiFire asset pool may be accessed via FTP |

LiquiFire User's Guide: LiquiFire Configura-

Remote Access: Cluster

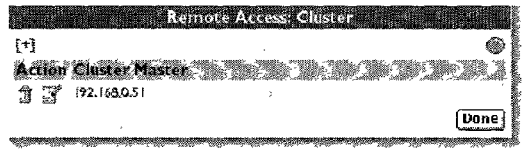

FIGURE 33. Remote Access: Cluster

This pane controls which nodes are authorized to communicate with this node. If a Master node lists this node as a member of a cluster, the slave node, in turn, must authorize connections by the master by listing it's hostname or IP-address here.

| Command | Description |
|---|---|
|  | Add a member |
|  | Authorize a node to connect to the node as a Master |
| ✏️ | Edit Member |
|  | Change an existing member |
| 🗑 | Remove Member |
|  | Remove a member |
| ● | Help |

License Key: View
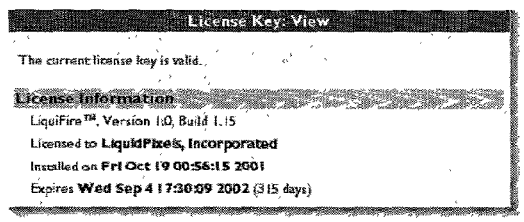
FIGURE 34. License Key: View
This pane displays characteristics of the current, active license key.

License Key: Upload
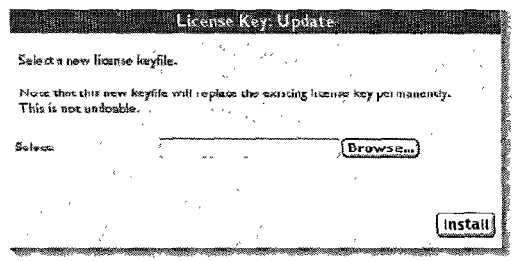
FIGURE 35. License Key: Upload
This pane allows for the installation of a new LiquiFire license key.
When a new key is available, typically sent by LiquidPixels to the customer via e-mail, it can be simply installed via this pane.

LiquiFire User's Guide: LiquiFire Configuration

Server Control: Start/Stop

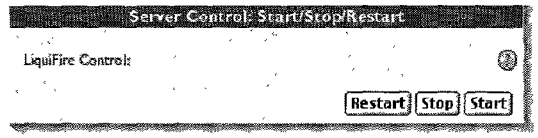

Server Control: Start/Stop

When changes are made to LiquiFire's configuration, the running server must be restarted for those changes to take affect. This pane can additionally be used to stop the server completly, or start a stopped server.

| Command | Description |
| --- | --- |
| Restart | Restarts the LiquiFire Server, incorporating any changes which have been updated in the configuration |
| Stop | Stops the LiquiFire Server |
| Start | Starts the LiquiFire Server |

Server Control: Update Config

Once changes to LiquiFire have been completed, the server's active configuration must be updated to reflect the changes. This pane performs that function, and will additionally eMail the current configuration to the server administrator.

LiquiFire User's Guide: LiquiFire Configuration

Monitoring

The monitoring section is used to observe and analyze overall LiquiFire performance. This includes overall system status, performance statistics, and requess access log.

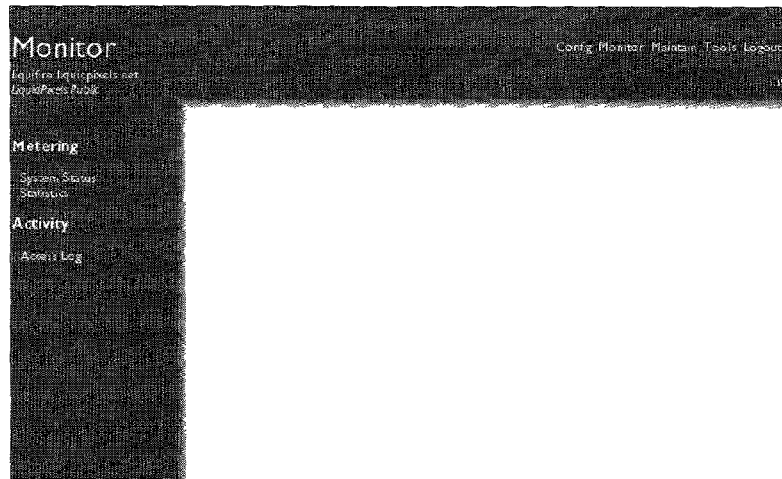

FIGURE 36. Monitor Section

LiquiFire Orb provides several tools which can be used to asses current or past performance of a LiquiFire server or cluster. These tools can be used to simply observe current activity, to analyze the detailed information LiquiFire maintains for each Job run, or to compute usage and performance statistics for a period of time.

Monitoring provides two areas:

- *Metering:* Monitor current performance and server characteristics
- *Activity:* Analyze detailed Job information

Metering: System Status

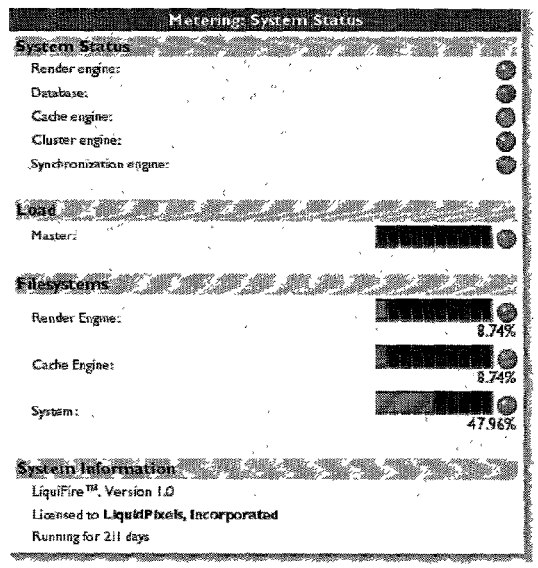

FIGURE 37. Metering: System Status

This pane, within its four sections, displays an overview of the LiquiFire system. Should any of the indicators change to yellow or red, contact LiquidPixels support.

Each of the five LiquiFire subsystems and their respective status, red or green, are displayed under the first section, System Status. Should a serious problem arise, it is possible that one or more of the subsystems will ceace to operate, and this information will be useful to pinpoint the problem area, in concert with LiquidPixels support.

Under the Load section, each member in the *Cluster* will be listed, along with an active bar-graph depicting the current server load for that node. These graphs are updated every 30 seconds, while this pane is displayed.

Disk space is monitored in the Filesystems section, with an active bar-graph for each of the active disk areas in use.

Finally the System Information section displays LiquiFire software version, Licensing information (and an expiry warning, as the end of a licence term draws near) as well as a count of server operating time.

LiquiFire User's Guide: LiquiFire Configuration

Metering: Statistics

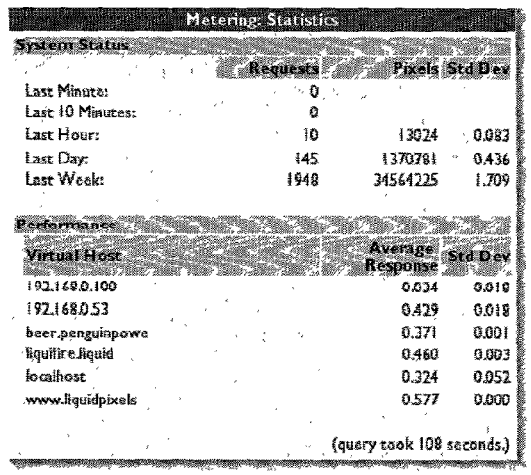

FIGURE 38. Metering Statistics

LiquiFire collects and maintains various statistics of it's performance during operation.

The top portion of this pane provides an overview of recent cluster performance. For each of five timeframes, this area indicates the number of rendering requests (which excludes any requests which are handled by the LiquiFire result cache), the number of pixels served, and the standard-deviation of response time. This last field can provide some overall feeling for performance; if this number becomes 'large' relative to it's value for all time, available in the lower portion of the pane, it may indicate larger-than-normal requests, or some other performance limiting behavior is occuring.

The lower portion of this pane provides performance metrics for a liquiFire cluster, broken down by virtual host. Each virtual host indicates the average render response time and standard-deviation for all time.

Activity: Access Log

FIGURE 39. Activity: Access Log

LiquiFire maintains two logs: a simple log of each request, and detailed transaction information for each request. The simple request log is maintained indefinately, while the details are maintained for 24 hours. This pane provides access to this collection of information.

The pane above allows the user to select which elements of a log they wish to view. Each field is optional; multiple fields are combined as a logical AND. Strings and portions of strings may be entered in any field.

Once the form is submitted, LiquiFire Orb will present a pane containing a list of requests matching the criteria, as illustrated in Figure 40.

FIGURE 40. Activity: Access Log Request Listing

Each line represents a request to LiquiFire, and is displayed along with its JobID, the date and time of the request, the node within the cluster that handled the request, and the IP address of the client making the request. Clicking on the JobID of a request will display additional detailed information, as illustrated in Figure 41.

LiquiFire User's Guide: LiquiFire Configuration

FIGURE 41. Activity:Access Log Details

This pane contains the request, JobID, Date and Time, and detailed execution information for each stage of processing.

Maintain

The maintain section provides a convinent and powerful interface to LiquiFire's resident asset and cache areas. Through this section, files within a LiquiFire server or cluster may be fully manipulated, including archiving and editing.

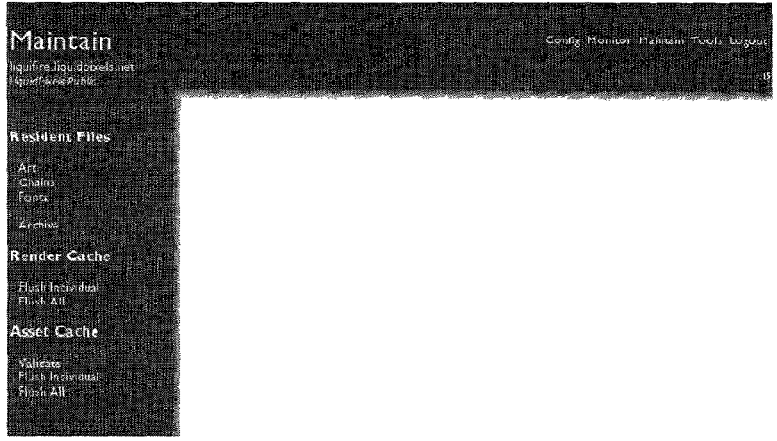

FIGURE 42. Maintain Section

LiquiFire Orb's Maintan section provides all tools necessary to navigate the resident files, to add, delete, rename, and view artwork, chains, and fonts.

Monitoring provides three areas:

- *Resident Assets:* Manage the LiquiFire resident assets
- *Render Cache:* Inspect or purge render cache items
- *Asset Cache:* Inspect or purge asset cache items If the LiquiFire server is operating within a clustered environment, a fourth area appears:

- *Cluster:* Manages cluster member synchronization

Resident Assets

As with a typical filesystem, the LiquiFire asset pool can be organized via subdirectories, and provides typical file-manipulation tools such as rename, delete, view, upload, etc.

Within the Maintain section of Orb, the three Resident asset areas can be accessed by choosing the desired section. A typical view of the art section may present a pane similar to that in Figure 43.

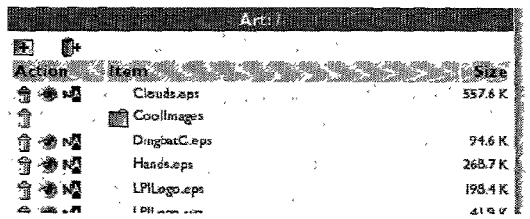

FIGURE 43. Resident Assets: Art

The top of the pane indicates which asset pool is being viewed, as well as the *path* or current folder; the root or '/' folder of the Art pool is being viewed above.

Above the list of files are displayed a suite of icons, representing the globally-accessable tools which may be used within this asset pool. The tools that may be available include:

| Command | Description |
|---|---|
| | New Folder<br>Create a new Folder (directory) within the currently displayed Folder. |
| | New File<br>Create a new, empty file within the currently displayed Folder. Blank files may be subsequently edited via the edit command, see below. |
| | Upload File<br>Upload a file or zip archive into the asset pool. Single files are simply added to the asset pool within the current Folder; zip archives' contents are un-zipped after the archive is transferred to LiquiFire. |

Beneath the column headings appear a list of files and folders, comprising the contents of the Asset pool being viewed. Just as the above commands apply generally to the asset pool and Folder being viewed, the following commands apply specifically to the adjacent file. These commands include:

| Command | Description |
|---|---|
|  | Delete<br>Clicking this icon will, after confirmation, remove the adjacent file permanently from the asset pool. |
|  | View<br>Display the item in the asset pool for inspection |
|  | Rename<br>Change the name of the item in the asset pool |
|  | Edit<br>Edit the item in the asset pool |

LiquiFire User's Guide: LiquiFire Configuration

Cluster: Synchronize

When LiquiFire is operated as a cluster – cluster members have been added via "LiquiFire: Cluster" pane on page 30 – this pane becomes available.

This pane allows for manual invocation of the cluster member synchronization process, normally performed automatically by the LiquiFire master server on a periodic basis.

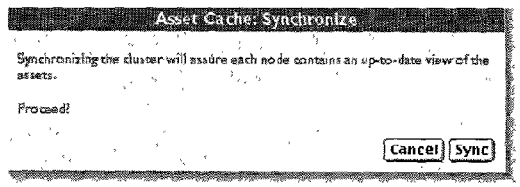

FIGURE 44. Asset Cache: Synchronize

Clicking the Sync button will initiate the cluster synchronization process. This process will assure that all cluster members have current copies of the most recent versions of any resident assets. Depending on the number of members in the cluster and the number of assets, this process may take some time to complete.

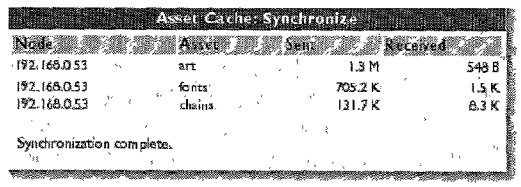

FIGURE 45. Asset Cache: Synchronize Complete

Upon completion, LiquiFire Orb will present the pane depicted in Figure 45, indicating which nodes participated in the synchronization process and how much data was transferred.

LiquiFire User's Guide: LiquiFire Configura-

Render Cache: Flush Individual

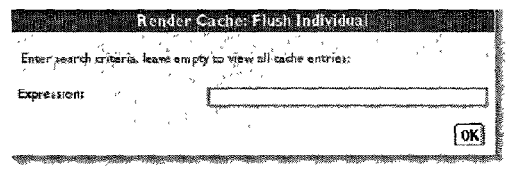

FIGURE 46. Render Cache: Flush Individual

As described in "Render Cache" on page 19, LiquiFire maintains a cached copy of each image it generates to increase performance. There may be situations where it is necessary to force LiquiFire to re-render an image within the *Render Cache*.

Selecting the *Flush Individual* menu item within LiquiFire Orb brings up the pane illustrated in Figure 46. This pane allows a LiquiFire user to query the render cache, based on a regular expression, and selectively re-render the selected image.

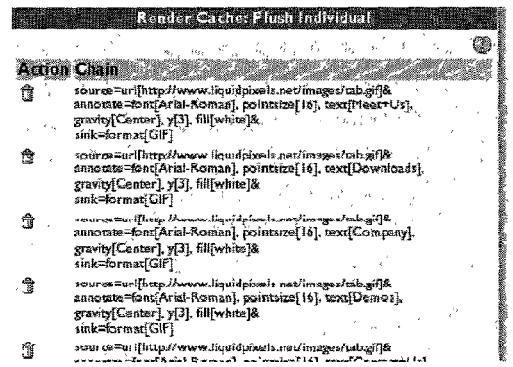

FIGURE 47. Render Cache: Flush Individual Item List

LiquiFire Orb will respond to the query by presenting a list of matching image chains which have corresponding rendered images currently resident in the Render Cache, similar to Figure 47. Clicking the delete icon 🗑 adjacent to a listed cache item will cause the currently stored rendered copy to be discarded and a new, fresh version to be generated in its place.

LiquiFire User's Guide: LiquiFire Configuration

Render Cache: Flush All

The entire contents of the LiquiFire Render Cache may be permanently removed, in its entirety, via the *Flush All* command. After confirmation, LiquiFire Orb will remove the entire contents of the Render Cache. This process may take a moment to complete, during which time LiquiFire will be unavailable.

Asset Cache: Validate

As described in "Asset Cache" pane on page 19, LiquiFire maintains a cache of all assets requested via URL within an image chain. While LiquiFire will periodically (See "LiquiFire: Cache" on page 32.) validate the assets in cache against the original remote data, it may be necessary to initiate this process manually.

Selecting the *Validate* menu item under the *Asset Cache* section will initiate this background process.

Asset Cache: Flush Individual

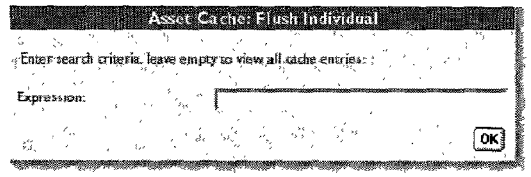

FIGURE 48. Asset Cache: Flush Individual

Similar to the Render Cache, selecting the *Flush Individual* menu item under the Asset Cache section within LiquiFire Orb brings up the pane illustrated in Figure 48. This pane allows a LiquiFire user to query the asset cache, based on a regular expression, and selectively remove the selected asset.

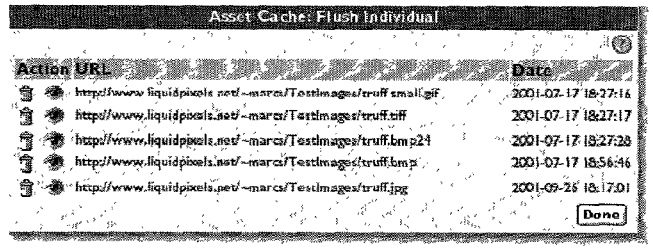

FIGURE 49. Asset Cache: Flush Individual Item List

LiquiFire Orb will respond to the query by presenting a list of matching assets (images, typefaces, color profiles, or chains) which are resident in the Asset Cache, similar to Figure 49. Clicking the delete icon 🗑 adjacent to a listed cache item will cause the currently stored copy to be discarded. Clicking the view icon 👁 adjacent to a listed cache item will display that item.

Asset Cache: Flush All

The complete contents of the LiquiFire Asset Cache may be permanently removed, via the *Flush All* command under the Asset Cache section. After confirmation, LiquiFire Orb will remove the entire contents of the Asset Cache. This process may take a moment to complete.

Tools

Tools: Explorer

LiquiFire Explorer provides a simple, yet powerful way to develop LiquiFire image chains within an assisted, interactive framework. As well, for efficiency, Explorer is integrated into other areas of Orb.

LiquiFire Explorer encompases only a single pane within Orb, illustrated in Figure 50:

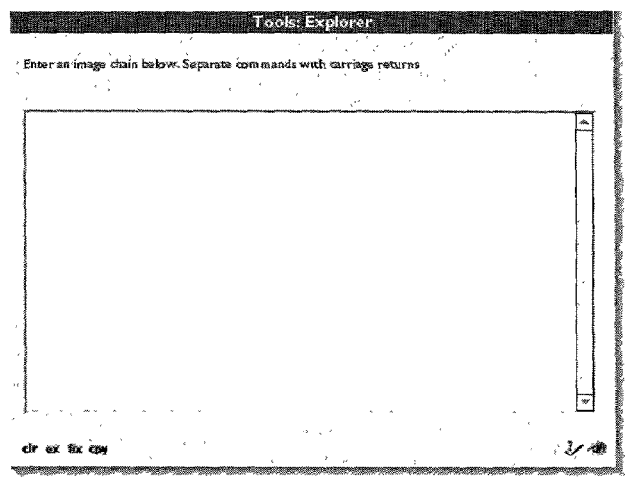

FIGURE 50. Tools: Explorer

Within this pane are two sections: A large text edit box, and a button bar, below. Image chain design and editing takes place within the edit box while the button bar encompases Explorer's command set. The commands available are:

| Command | Description |
| --- | --- |
| clr | Ckear<br>Clears the contents of the the chain design area |
| ex | Examples<br>Presents the Asset pool Folder containing example chains |
| fix | Fixup<br>When pasting a chain from a web page into Explorer, this command can be used to convert the chain into an editable form, as well as to clean up common mistakes such as repeated & characters, etc. |

LiquiFire User's Guide: LiquiFire Configura-

| Command | Description |
|---|---|
| cpy | Copy<br>Copies the chain in the design area into the 'chainboard' |
| pst | Paste<br>Pastes the chain on the 'chainboard' into the design area |
| ✓ | Check<br>Performs syntax checking and vaildation on the chain in the design area. |
| | View<br>Submits the chain in the design area to the LiquiFire server (or cluster) configured in the Config area of LiquiFire Orb for preview. |

Chains are entered into the design area as a list of separate commands, separated by carriage returns. It is unnecessary to perform any X-URL-ENCODING of the chain in the design area, as Explorer will properly escape the chain before submission to LiquiFire for rendering when View is selected. Figure 51 depicts a chain properly formed for Explorer.

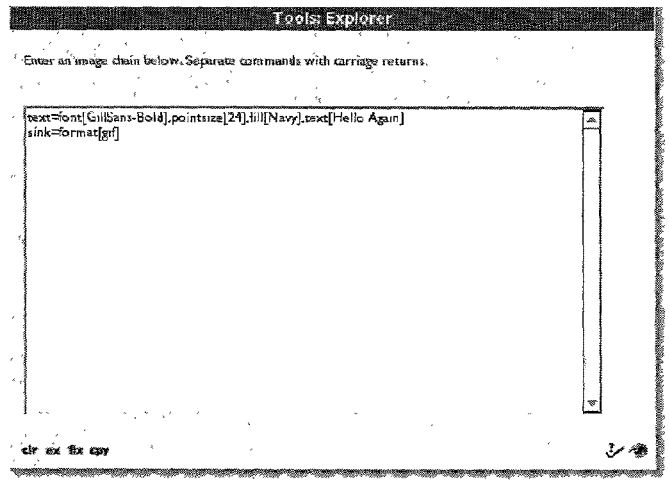

FIGURE 51. Example Explorer Chain

Notice in this example, the space in the text argument is written simply as a space, not as the X-URL-ENCODED '%20' or shorthand '+' — Explorer handles this translation for you automatically.

LiquiFire User's Guide: LiquiFire Configuration

Clicking on the *View* icon ✻ will open a new browser window[1] containing a rendered version of the chain in the design area, if successful, or an appropriate error message, if unsuccessful.

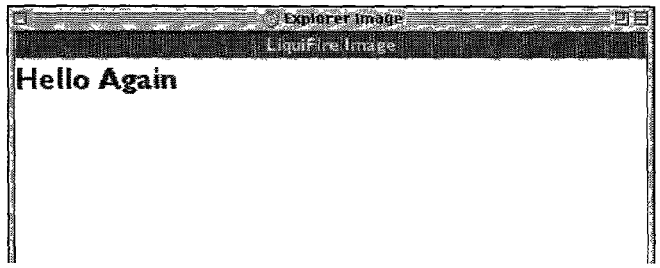

FIGURE 52. Explorer Preview Window

Clicking the *Check* icon ✓ will open a new browser window containing a syntax-hilighted form of the chain in the design area, along with any detected syntax or validation errors detected. This can be immencely useful when developing image chains.

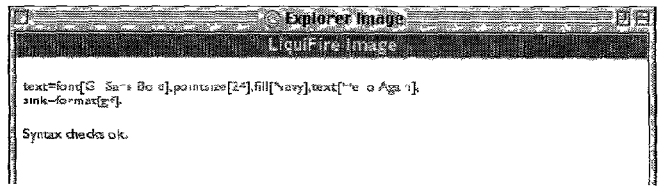

FIGURE 53. Explorer Check Windows

---

1. Using the *Preferences* menu item under the *Tools* view, you may optionally choose to have image previews appear in the same browser window as Explorer.

LiquiFire User's Guide: LiquiFire Configura-

Tools: Font Map

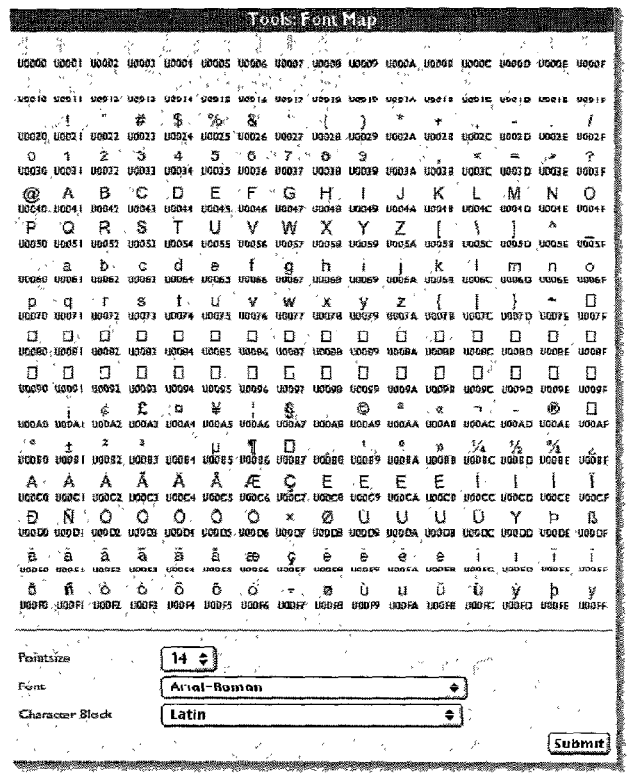

FIGURE 54. Tools: Font Map

LiquiFire allows for access to full font character sets via Unicode character expression. While this capability allows the user to express any character within a request, the vast Unicode character definitions still need to be known to properly identify the character desired.

The Font Map tool displays a specified section of the Unicode character definitions as a table of glyphs (characters), rendered in a specified installed typeface.

Tools: Chain Cipher

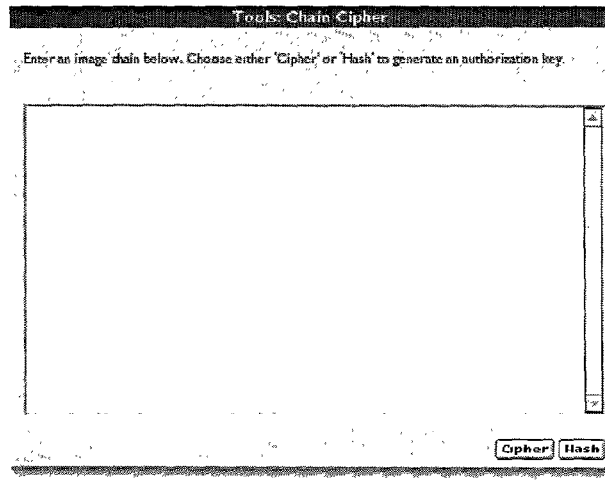

FIGURE 55. Tools: Chain Cipher

As discussed in "Security" on page 17, LiquiFire allows for two modes to restrict access to a LiquiFire server: Refering Host, and Keyed Requests. For the Keyed Requests method, each chain is augmented with a request-specific key, without which the request will not render. Further, since this key is generated from the request itself, any alterations made to the request will cause the chain to not render.

Within the Keyed Requests mechanism, there are two types of keys that may be generated. A simple hash and a more sophisticated cryptographical cipher. The cipher method is available for the truely paranoid.

This tool will generate the key for a particular image chain entered above. As in Explorer, chains are entered as separate lines.

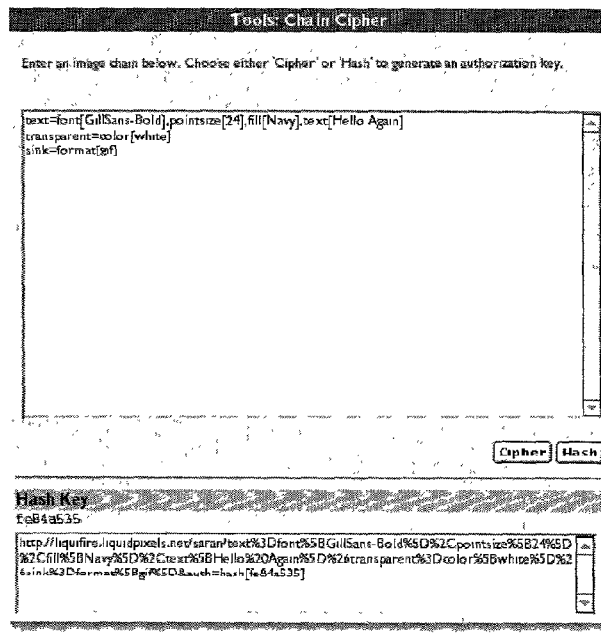
FIGURE 56. Tools: Chain Cipher Hash
When either the Hash or Cipher buttons are pressed, as illustrated in Figure 56, an encoded version of the chain will appear in a new text area below the original chain within the pane. This new version will additionally have the proper key attached.

LiquiFire User's Guide: LiquiFire Configuration

Tools: Preferences

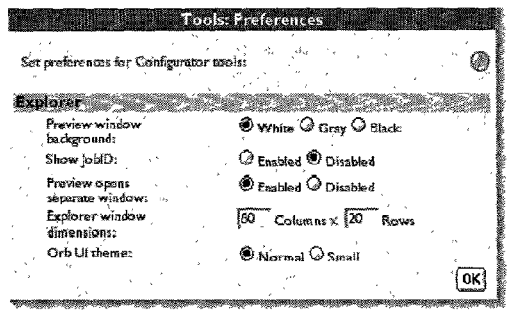

FIGURE 57. Tools: Preferences

LiquiFire Orb has a few preferences which may be controlled by each individual Orb user. These preferences are maintained via a browser cookie, and will be persistant within a particular browser as long as the cookie exists.

| Field | Description |
| --- | --- |
| Preview window background | When developing image chains which result in transparent images, it may be desireable to control the background color on which the image is displayed. This option allows you to set the background color of the view window. |
| Show JobID | When debugging a complex chain, this option may be enabled to cause LiquiFire to render the Job ID onto the rendered image. This ID can then be used within the Access Log section within the Monitor view to see detailed job processing information. |
| Preview opens separate window | When enabled, LiquiFire Orb will display the rendered image in a new separate window. |
| Explorer window dimensions | Allows you to set the size of the Explorer pane's design area. |
| Orb UI Theme | Allows you to choose from any of the installed UI themes for the entire Orb environment. |

CHAPTER 3     *Real World Examples*

This chapter contains several complete examples of LiquiFire imaging, represented as HTTP requests.

They may be simply illustrative, or may serve as a starting point for further chain development and experimentation.

LiquiFire User's Guide: Real World Examples

Format Conversion

Using LiquiFire, a single image can easily be re-purposed on-demand. Here, the image, a JPEG on the server, is delivered as JPEG:

```
source=url[http://www.liquidpixels.net/images/truff.jpg]&
scale=size[50%]&
sink=format[jpg]
```

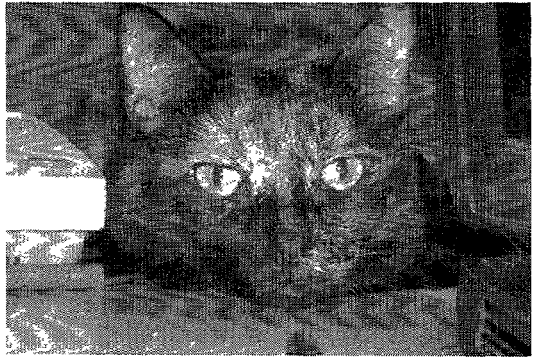

and now as GIF:

```
source=url[http://www.liquidpixels.net/images/truff.jpg]&
scale=size[50%]&
sink=format[gif]
```

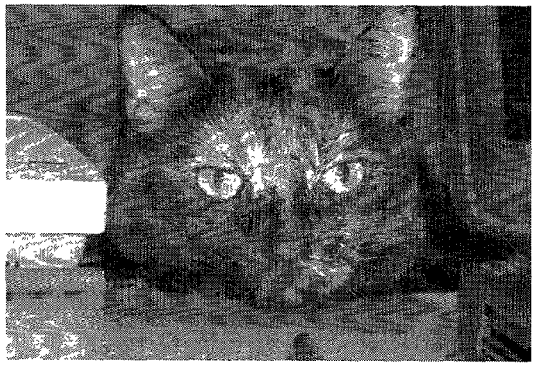

Some browsers can display BMP format images:

```
source=url[http://www.liquidpixels.net/images/truff.jpg]&
scale=size[50%]&
sink=format[bmp]
```

And, as needs and formats evolve, re-purposing existing image assets is as simple as changing the URL. Formats like Adobe PDF, Group 3 Facsimile, and Tagged Image File Format (TIFF) are supported:

```
source=url[http://www.liquidpixels.net/images/truff.jpg]&
scale=size[50%]&
sink=format[pdf]

source=url[http://www.liquidpixels.net/images/truff.jpg]&
scale=size[50%]&
sink=format[g3fax]

source=url[http://www.liquidpixels.net/images/truff.jpg]&
scale=size[50%]&
sink=format[tiff]
```

LiquiFire User's Guide: Real World Examples
Image Scaling
The same high-resolution image asset can be presented as a scaled thumbnail:
```
source=url[http://www.liquidpixels.net/images/truff.jpg]&
scale=size[128]&
sink=format[jpg]
```
...or as a tiny image icon:
```
source=url[http://www.liquidpixels.net/images/truff.jpg]&
scale=size[64]&
sink=format[jpg]
```

LiquiFire User's Guide: Real World Examples

Complex Scaling

Scaling in LiquiFire can be specified in several ways. Here, we use the 'fit to square' method, asking that the source image be scaled such that it fits exactly within a 128 × 128 pixel square. This approach allows images of any aspect-ratio to be easily handled, letting LiquiFire deal with the complex calculations necessary. And it's so simple to add a border too:

```
source=url[http://www.liquidpixels.net/images/truff.jpg],
    name[img]&
scale=size[128]&
blank=width[128],height[128],color[grey80],name[bg]&
border=width[3],height[2],color[slateblue]&
composite=compose[Over],image[img],gravity[Center]&
sink=format[jpg]
```

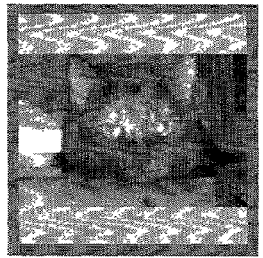

Perhaps the thumbnail should be labeled:

```
source=url[http://www.liquidpixels.net/images/truff.jpg],
    name[img]&
scale=size[128]&
blank=width[128],height[128],color[grey80],name[bg]&
border=width[2],height[2],color[slateblue]&
composite=compose[Over],image[img],gravity[Center]&
annotate=text[My+Kitty],font[Arial-Bold],
    pointsize[14],gravity[South],y[-5]&
sink=format[jpg]
```

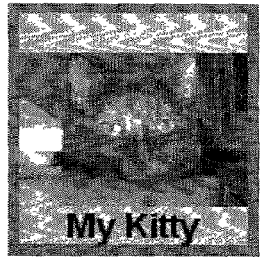

65

LiquiFire User's Guide: Real World Examples

And of course, the background could be an image as well:

```
source=url[http://www.liquidpixels.net/images/truff.jpg],
    name[img]&
scale=size[128]&
border=width[2],height[2],color[black]&
source=url[http://www.liquidpixels.net/images/SlideMount.jpg],
    name[mount]&
scale=size[200]&
composite=compose[Over],image[img],gravity[Center]&
annotate=text[My+Kitty],font[Arial-Bold],pointsize[14],
    gravity[South],y[-15]&
sink=format[jpg]
```

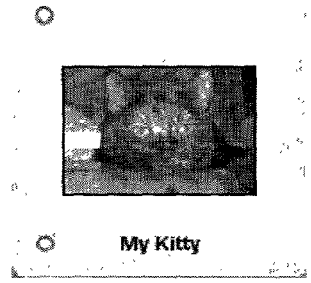

Vector-based Formats

Source images in vector formats, such as Encapsulated PostScript (EPS), PostScript (PS), or Scalable Vector Graphics (SVG) are supported by LiquiFire. Since the conversion to pixels is not done until a pixel-manipulation command is encountered, scaling or rotation can be done without introducing any artifacts, or jaggies, in the resulting image:

```
source=url[file:Hands.eps]&
sink=format[GIF]
```

```
source=url[file:Hands.eps]&
scale=size[200%]&
sink=format[GIF]
```

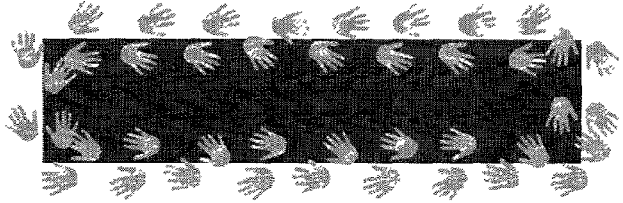

```
source=url[file:Hands.eps]&
scale=size[300%]&
sink=format[GIF]
```

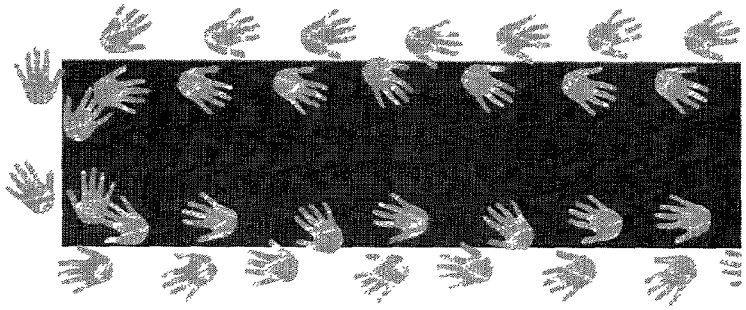

LiquiFire User's Guide: Real World Examples

Dynamic Graphic Elements

By using LiquiFire to generate images on-demand, repetitive tasks are no longer needed, saving valuable time and resources. Changing design elements such as text, typeface, size, color, or position no longer requires a trip to an image editing package. Even foreign language translation is merely a URL change.

```
source=url[file:tab.eps]&
annotate=font[Arial-Roman],pointsize[9],text[Click+Me],
    gravity[Center],fill[black]&
sink=format[GIF]
```

```
source=url[file:tab.eps]&
annotate=font[Arial-Bold],pointsize[9],text[No+Me],
    gravity[Center],fill[black]&
sink=format[GIF]
```

```
source=url[file:tab.eps]&
hue=value[10]&
annotate=font[Arial-Roman],pointsize[9],text[Click+Me],
    gravity[Center],fill[black]&
sink=format[GIF]
```

```
source=url[file:tab.eps]&
hue=value[40]&
annotate=font[Arial-Roman],pointsize[9],text[Click+Me],
    gravity[Center],fill[black]&
sink=format[GIF]
```

LiquiFire User's Guide: Real World Examples

Complex Calculations

Here, a complex LiquiFire request is encapsulated in a stored chain (See "Stored Chains" on page 8.). This allows dynamic information such as the region, color, target date, and holiday to be specified in the URL, while maintaining the look and logic of the banner in a small file on your site:

```
set=key[a],value[nyc]&
set=key[color],value[aquamarine]&
set=key[date],value[2/14/2002]&
set=key[hday],value[Valentine's+Day]&
load=url[file:vdaybanneradj.saran]
```

(and the loaded file vdaybanneradj.saran contains:)

```
regexcase=key[global.a],cases[nyc|sfo|bos],
    values[nycbg.jpg|sfobg.jpg|bosbg.jpg],name[bg]&
regexcase=key[global.a],cases[nyc|sfo|bos],
    values[v1.gif|v2.gif|v1.gif],name[heart]&
regexcase=key[global.a],cases[nyc|sfo|bos],
    values[v1b.gif|v2b.gif|v2.gif],name[hearto]&
source=url[http://www.liquidpixels.net/images/global.bg],
    name[bg]&
source=url[http://www.liquidpixels.net/images/
global.heart],
    name[hon]&
source=url[http://www.liquidpixels.net/images/
global.hearto],
    name[hoff]&
select=name[bg]&
fontmetrics=text[global.vday],font[Dominican],pointsize[36]
&
attribute=name[bg],key[delay],value[30]&
annotate=text[Only],font[Dominican],pointsize[22],
    fill[global.color],y[35],x[10]&
annotate=text[days+left+till+global.hday],font[Dominican],
    pointsize[22],fill[global.color],y[35],x[117]&
countdown=target[global.date],key[vday]&
annotate=text[global.vday],font[Dominican],pointsize[36],
    fill[global.color],y[36],x[(95-bg.metrics.x/2)]&
composite=compose[over],image[hoff],x[386]&
addframe=image[hon],delay[30],x[386],trans[%23000000]&
optimize&
sink=format[gif],loop[forever]
```

LiquiFire User's Guide: Real World Examples

Complex Imaging

Complex imaging tasks are possible with LiquiFire, just as in any desktop imaging application. Here, a mask image is created from the word 'Hello,' through which the cat image is revealed:

```
blank=width[400],height[400],name[c],color[skyblue]&
text=text[Hello],pad[10],bgcolor[white],fill[black],
    font[Arial-Bold],pointsize[100],gravity[Center],name[t]&
source=url[http://www.liquidpixels.net/images/truff.jpg],
    name[cat]&
scale=width[t.width],height[t.height]&
attribute=key[matte],value[true]&
composite=compose[replacematte],image[t]&
select=name[c]&
composite=compose[over],image[cat],x[(c.width/2-t.width/
2)],
    y[(c.height/2-t.height/2)]&
sink
```

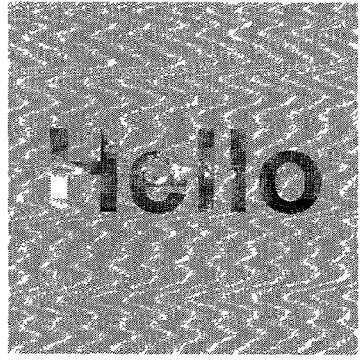

Simple Text

While HTML formatting capabilities are limiting, LiquiFire can create graphic text elements on-demand, allowing your design intent — typeface, color, size — to be preserverd. All without the time and effort of creating a pile of graphics in a desktop application.

```
text=font[Arial-Italic],pointsize[24],fill[DarkGreen],
    text[Hello+Again]&
sink=format[gif]
```

*Hello Again*

Text can be rendered on a transparent background, if the format supports transparency:

```
text=font[Arial-Italic],pointsize[24],fill[DarkGreen],
    text[Hello+Again]&
transparent=color[%23FFFFFF]&
sink=format[gif]
```

*Hello Again*

...any typeface, any size, any color:

```
text=font[Bud+Hand],pointsize[24],fill[DarkBlue],
    text[Hello+Again]&
sink=format[gif]
```

Hello Again

LiquiFire User's Guide: Real World Examples

Text can be aligned to an image:

```
blank=width[300],height[300],color[DarkBlue]&
annotate=font[Bud+Hand],pointsize[24],fill[Yellow],
    text[Hello+Again],gravity[East]&
sink=format[gif]
```

...or fit to the size of an image:

```
blank=width[300],height[300],color[DarkBlue]&
annotate=font[Bud+Hand],pointsize[Fit],fill[Yellow],
    text[Hello+Again]&
sink=format[gif]
```

CHAPTER 4    *Base Command Set*

Source Commands    blank

Aliases new

Description

Creates a new image and adds it to the image pool. A new, solid image is created at the size specified, filled with the specified background color.

Arguments

| Argument | Type | Description |
| --- | --- | --- |
| name | string | Optional. |
| | | The name of the image within the image pool. If omitted, the images is assumed to be the current image. |
| width | number | Required. |
| | | The width, in pixels, of the new image |
| height | number | Required. |
| | | The height, in pixels, of the new image |
| color | color | Default: white |
| | | The color for the new image |

LiquiFire User's Guide: Base Command Set

Example

```
blank=width[100],height[50],color[DarkBlue]&
sink=format[gif]
```

LiquiFire User's Guide: Base Command Set source

Aliases src

Description

Acquires an image from the specified source and places it in the image pool for use later in a request. Images may be acquired from any of the supported sources, and may be in any of the supported formats.

Images can be acquired from http://, ftp://, or file: sources. Images retrieved from remote sources are cached within LiquiFire.

Images are maintained in LiquiFire's cache once retrieved; caching can be prevented by specifying the nocache[true] argument to the source command. Cache characteristics can be adjusted via the LiquiFire Orb. See "LiquiFire: Cache" on page 32.

Arguments

| Argument | Type | Description |
| --- | --- | --- |
| url | | Required. |
| | | Describes the source for the image data. |
| | | URLs can be any valid form for the method indicated. For HTTP or FTP, username and password may be supplied, if required as illustrated in the examples below |
| name | string | Optional. |
| | | The name of the image within the image pool. If omitted, the images is assumed to be the current image. |
| nocache | true\|false | Default: False |
| | | If True, the image is not stored in the LiquiFire caching system and will subsequently re-retrieved from the url specified in later requests. |

Example

```
source=url[http://www.liquidpixels.net/TestImages/truff.jpg]&
sink
```

LiquiFire User's Guide: Base Command Set

Images may be directly retrieved from an FTP server, as well. In this example, the user auser and password mypassword are used to access the FTP server at ftp.liquidpixels.net.

```
source=url[ftp://auser:mypassword@ftp.liquidpixels.net/
   TestImages/Erika.jpg]&
scale=size[400]&
sink
```

LiquiFire User's Guide: Base Command Set select

Description

Makes the named image the current image (' _ '), replacing the previous current image. Can also be used to select a single frame from a multiple-frame image for manipulation.

Arguments

| Argument | Type | Description |
| --- | --- | --- |
| name | string | Required. |
|  |  | The name of the image within the image pool to be selected as the current image. |
| frame | number | Optional. |
|  |  | If specified, the frame indicated is identified as the active frame, and will solely be affected by subsequent image manipulations. To re-select the entire image, use the select command without the frame argument specified. Frames are counted from 0. |

Example

We add 2 images into the image pool. First, a large TIFF image, Fence.tif (3340 × 2259; 22.6MB) given the name 'fence', and second a JFIF image, truff.jpg, which is left unnamed (as the current image). The select command makes the Fence.tif image the current image allowing the subsequent scale and sink commands to operate on it.

LiquiFire User's Guide: Base Command Set

```
source=url[http://www.liquidpixels.net/images/Fence.tif],
    name[fence]&
source=url[file:/home/marcs/TestImages/truff.jpg]&
select=name[fence]&
scale=size[300x300]&
sink=format[jpeg]
```

Example

Given an eight frame GIF-89 (animated GIF) image, select and display frame number 2. Notice that while selecting a frame from an image, the image name must be supplied:

```
source=url[http://www.liquidpixels.net/TestImages/colors.gif]&
select=name[_],frame[2]&
sink=format[gif]
```

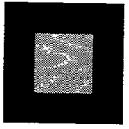

LiquiFire User's Guide: Base Command Set

Sink Commands  sink

Description

Sends the resulting image to the caller.

Arguments

| Argument | Type | Description |
|---|---|---|
| format | any format supported by LiquiFire | Default: JPEG (JFIF). Determines the format of the returned image. |
| quality | number | Optional for JPEG-compressed formats only. Determines the JPEG 'Q' setting |
| loop | number | Optional for GIF-89. Sets the number of loops for animated GIF (GIF-89) images |

Example

The sink command directs LiquiFire to send the image to the client. In the 5 following examples, the request is identical except the sink command, with the sink command used for each image printed below the result.

```
source=url[http://www.liquidpixels.net/images/Fence.tif],
    name[fence]&
scale=size[600x600]&
sink=format[jpeg],quality[5]
```

sink=format[jpeg],quality[5]
13,164 bytes

sink=format[jpeg],quality[25]
26,910 bytes

LiquiFire User's Guide: Base Command Set
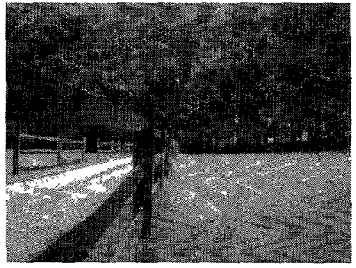
sink=format[jpeg],quality[50]
40,155 bytes
sink=format[jpeg],quality[100]
363,280 bytes
sink=format[gif]
171,255 bytes

LiquiFire User's Guide: Base Command Set

Imaging Commands addframe

Description

Adds the specified image as a new frame of the current image. The sub-image location, disposal, transparency, and delay characteristics for the added frame can be controlled via optional arguments.

Arguments

| Argument | Type | Description |
|---|---|---|
| image | string | Required. |
| | | The name of the image in the pool to add as a new frame |
| x | number | Required. |
| | | The horizontal location of the top corner of the new frame, relative to the current image's left edge |
| y | number | Required. |
| | | The vertical location of the top corner of the new frame, relative to the current image's top edge |
| trans | color | Optional for GIF-89 and PNG |
| | | If specified, the color is treated as transparent |
| delay | number | Optional for GIF-89 and PNG |
| | | Determines the delay in tenths of seconds between frames when the image is viewed as an animation. |
| dispose | none\|asis\|background\|previous | Default: `asis` for GIF-89 |
| | | Determines the GIF disposal method after the frame is displayed. |
| | | `asis`: the frame stays in place after display<br>`background`: the frame is treated as the background for the subsequent frame<br>`previous`: the previous frame is displayed after this one<br>`none`: unspecified; continuous animation frame |

Example

In this example, we will create a simple four frame animation. On a black background image, we will add three frames, each at a new location. The disposal is set to background, causing the black background to be the basis for subsequent frames, rather than leaving the frame in place.

LiquiFire User's Guide: Base Command Set

```
blank=width[100],height[100],color[black],name[bg]&
blank=width[50],height[50],color[red],name[r]&
blank=width[50],height[50],color[green],name[g]&
blank=width[50],height[50],color[blue],name[b]&
select=name[bg]&
attribute=name[bg],key[delay],value[70]&
addframe=image[r],delay[10],x[0],y[25],dispose[background]&
addframe=image[g],delay[10],x[25],y[25],dispose[background]&
addframe=image[b],delay[10],x[50],y[25],dispose[background]&
optimize&
sink=format[gif],loop[forever]
```

 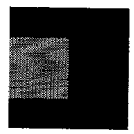 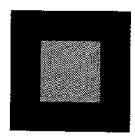 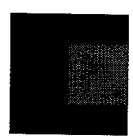

frame 1      frame 2      frame 3      frame 4 addprofile

Description

Embed or apply an ICC Color profile to an image.

If the image does not contain an embedded color profile, addprofile will mark the image with the source profile specified. If a profile is embedded, addprofile will perform the color transformation into the result colorspace specified by the profile given, and embed the profile in the image.

Arguments

| Argument | Type | Description |
|---|---|---|
| url | url | Required. |
| | | The url of the ICC profile to add. |
| | | Color profiles referenced with the file: method must reside within the art directory on LiquiFire. See "Resident Assets" on page 46. |
| intent | Saturation\|Perceptual\|Absolute\|Relative | Optional. |
| | | If present, instructs the color management engine as to the color matching intent desired. |

Example

Certain file formats can represent images in colorspaces which are unsuitable for output. For example, JFIF images can be represented in CMYK colorspace, resulting in strange patterns if displayed on a web browser. By embedding a CMYK colorspace source profile and adding a suitable RGB colorspace profile, the image can be displayed.

```
source=url[http://www.liquidpixels.net/images/colors.jpg]
addprofile=url[file:profiles/GenericCMYK.icm]
addprofile=url[file:profiles/sRGB.icm]
sink
```

See

"removeprofile" on page 131.

LiquiFire User's Guide: Base Command Set alphafill

Description

Fill a region of an image's alpha channel. Since alpha channels are monochrome, the channel is filled with the intensity of the color specified.

Arguments

| Argument | Type | Description |
|---|---|---|
| x | number | Required. |
| | | The horizontal location at which to begin pouring ink. |
| y | number | Required. |
| | | The vertical location at which to begin pouring ink. |
| color | color | Required. |
| | | The color to flood the image. |

Example

See "fill" on page 114.

LiquiFire User's Guide: Base Command Set annotate

Description

Draw text on an image.

Text may contain Unicode characters, expressed as Unnnn, where nnnn is a valid Unicode character value, or as extended characters, expressed as \nnn, where nnn is a valid ascii-extended character code. Unicode character codes may be explored using the *Font Map* tool in LiquiFire Orb.

Multiple lines may be imaged together; line breaks may be expressed by \n within the text.

Additional typefaces can be added to LiquiFire via FTP or LiquiFire Orb, or via URL.

Arguments

| Argument | Type | Description |
| --- | --- | --- |
| text | string | Required. |
|  |  | The text to be imaged |
| font | fontname | Required. |
|  |  | The name or URL of the typeface in which to image the text. If a URL is provided, the typeface is retrieved and cached in the LiquiFire asset pool. |
| pointsize | number\|fit | Required. |
|  |  | Either the size, in points, of the text to be rendered. or the keyword fit, indicating the text size should be chosen such that the text fits within the size of the current image. Additionally, width and height can be specified to specify alternative boundaries to the pointsize. |
| stroke | color | Optional. |
|  |  | If present, the text is outlined in this color. |
| fill | color | Default: Black. |
|  |  | Determines the color for the text |
| box | color | Optional. |
|  |  | If present, fills behind the text with a solid box in the specified color |

LiquiFire User's Guide: Base Command Set

| Argument | Type | Description |
|---|---|---|
| gravity | NorthWest\|<br>North\|<br>NorthEast\|<br>East\|<br>SouthEast\|<br>South\|<br>SouthWest\|<br>West\|<br>Center | Optional.<br><br>Determines the origin from which the baseline of the text is positioned, relative to the current image '_'. |
| alignto | TopLeft\|<br>TopCenter\|<br>TopRight\|<br>Left\|<br>Center\|<br>Right\|<br>BottomLeft\|<br>BottomCenter\|<br>BottomRight | Optional.<br><br>If present, along with x and y arguments, the text is aligned at the point specified, aligned as specified to that point. |
| x | number | The horizontal offset for the text baseline. If a gravity is specified, the origin for x and y is based on that location. Otherwise x and y specify absolute location within the image |
| y | number | The vertical offset for the text baseline. See x for details. |
| width | number | Optional.<br><br>If pointsize is fit and this argument is present, the pointsize is selected such that the rendered text is no wider than width pixels. |
| height | number | Optional.<br><br>If pointsize is fit and this argument is present, the pointsize is selected such that the rendered text is no taller than height pixels. |
| rotate | number | Optional.<br><br>If present, text will be drawn rotated the specified number of degrees clockwise. |

Example

A simple example: Notice the text is barely visible at the top-left of the image. Since no x, y, or gravity was specified, the baseline of the text is located at 0, 0 – resulting in only the portion of the text below the baseline to be visible. The baseline's position within a typeface is determined by the typographer.

LiquiFire User's Guide: Base Command Set

```
blank=width[50],height[50]&
annotate=text[Hello],font[Arial-Roman],pointsize[12],y[10]&
sink
```

Hello

Example

With the addition of the gravity argument, the text is centered within the image.

```
blank=width[50],height[50]&
annotate=text[Hello],font[Arial-Roman],pointsize[12],
    gravity[Center]&
sink
```

Hello

Example

Text can be rendered at any angle. Here, we anchor the coordinates to the top center of the image with the gravity argument, then shift the text downward by 10 pixels with the y argument:

```
blank=width[50],height[50]&
annotate=text[Hello],font[Arial-Roman],pointsize[12],
    gravity[North],rotate[45],y[10]&
sink
```

LiquiFire User's Guide: Base Command Set attribute

Description

Sets (or clears) an image-metadata value. See Appendix, "Image Metadata Fields" on page 191 for a list of image-metadata fields and their semantics.

Arguments

| Argument | Type | Description |
|---|---|---|
| key | string | Required. |
| | | The name of the metadata field to be adjusted |
| value | any | Optional. |
| | | If present, contains the new value for the field specified. If omitted, the contents of the field are cleared to the default value specific to the field. |
| name | string | Optional. |
| | | If present, the attributes of the named image are altered. |

Example

The attribute command is used here to set the inter-frame delay for the newly created background image to 30 tenths of a second.

```
blank=width[50],height[50],color[black],name[bg]&
blank=width[25],height[25],color[red],name[r]&
select=name[bg]&
attribute=name[bg],key[delay],value[30]&
addframe=image[r],delay[30],x[12],y[12]&
optimize&
sink=format[gif],loop[forever]
```

frame 1

frame 2

LiquiFire User's Guide: Base Command Set bevel

Description

Applies a bevel effect to the edges of the image.

Arguments

| Argument | Type | Description |
| --- | --- | --- |
| width | number | Default: 5 |
| | | The width, in pixels, of the left and right bevel edges |
| height | number | Default: 5 |
| | | The height, in pixels, of the top and bottom bevel edges |
| raise | Boolean | Default: false |
| | | If true, shading on the bevel's edges is chosen to produce a raised appearance. Otherwise, a sunken bevel appearance is used. |

Example

Some variations on the below example appear in the following table.

```
source=url[http://www.liquidpixels.net/TestImages/truff.jpg]&
scale=size[300x300]&
bevel&
sink
```

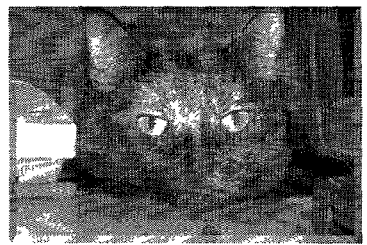
bevel

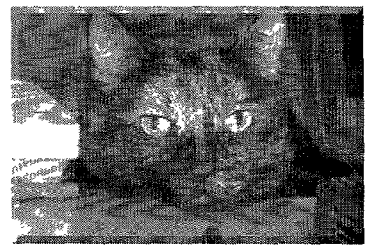
bevel=raise[true]

LiquiFire User's Guide: Base Command Set
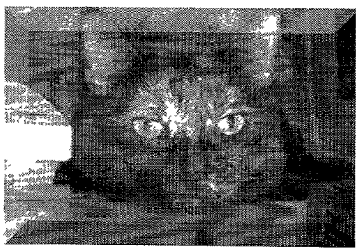
bevel=raise[true],height[20],width[20]

LiquiFire User's Guide: Base Command Set blur

Description

Blurs an image using a speed-optimized Gaussian blur. See "gblur" on page 123.

Arguments

| Argument | Type | Description |
|---|---|---|
| width | number | Required. |
| | | The extent of the blurring from any point. |
| sigma | number | Default: 1.0 |
| | | The amount of blurring to apply. |

Example

```
source=url[http://www.liquidpixels.net/TestImages/truff.jpg]&
scale=size[300x300]&
blur=width[2],sigma[1.0]&
sink
```

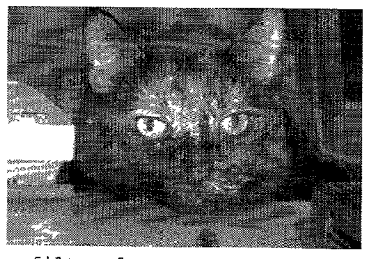
unfiltered

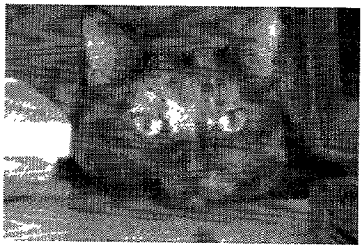
blur=width[2],sigma[1.0]

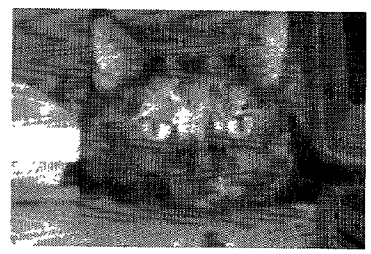
blur=width[4],sigma[1.0]

LiquiFire User's Guide: Base Command Set
 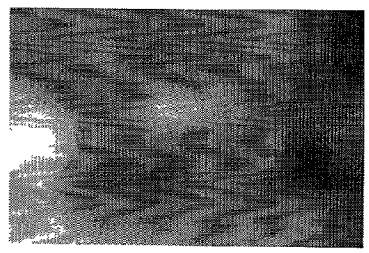
blur=width[6],sigma[3]    blur=width[20],sigma[20]

LiquiFire User's Guide: Base Command Set border

Description

Applies a solid or tiled border to an image.

Arguments

| Argument | Type | Description |
|---|---|---|
| width | number | Required. |
| | | The width, in pixels, of the border |
| height | number | Required. |
| | | The height, in pixels, of the border |
| color | color | Default: white |
| | | The color of the border. See Appendix B: Color Name Definitions for defined color names. |

Example

```
source=url[http://www.liquidpixels.net/TestImages/truff.jpg]&
scale=size[300x300]&
border&
sink
```

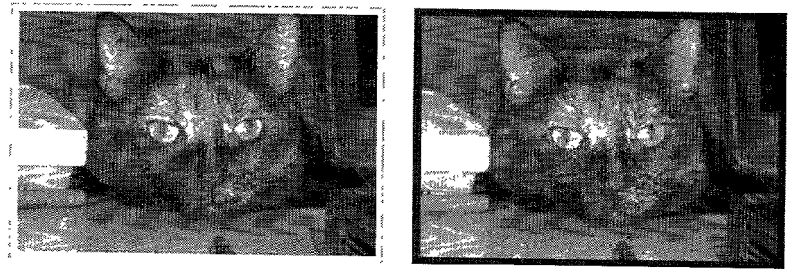

border=width[5],height[5]    border=color[DarkBlue], width[5],height[5]

LiquiFire User's Guide: Base Command Set
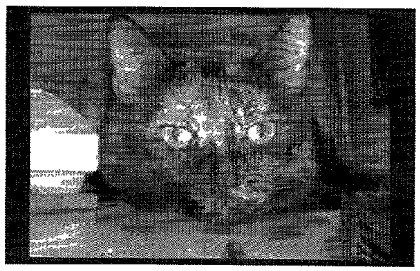
border=color[DarkBlue],width[20],
　　height[5]

LiquiFire User's Guide: Base Command Set brightness

Description

Adjusts brightness of an image

Arguments

| Argument | Type | Description |
|---|---|---|
| value | number | Required. |
| | | The amount of brightness adjustment to apply. Brightness is represented as a percentage; brightness of 0 renders the image black, 100 results in no-change, and values greater than 100 increase brightness. |

Example

```
source=url[http://www.liquidpixels.net/~marcs/TestImages/
truff.jpg]&
scale=size[300x300]&
brightness=value[50]&
sink=quality[100]
```

brightness=value[50]

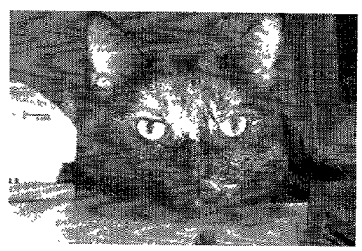
brightness=value[120]

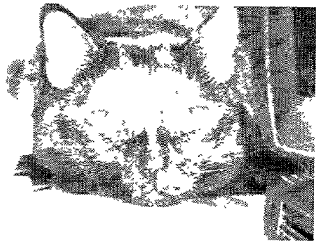
brightness=value[300]

LiquiFire User's Guide: Base Command Set colorize

Description

Tints the image with the color specified.

Arguments

| Argument | Type | Description |
| --- | --- | --- |
| fill | color | Required. |
|  |  | The color with which to tint the image. |
| opacity | number | Default: 100 |
|  |  | Determines the amount of colorization to occur. Lower values permit most of the original image to show through, while higher values result in an image approaching a solid fill color. |

Example

Colorize can be used as a special effect. Here, the fence image is colorized 25% with a strong blue tint:

```
source=url[http://www.liquidpixels.net/images/Fence.tif]&
colorize=fill[blue],opacity[25]&
sink
```

Example

Colorize can also be used to tint monochrome images. By first changing this image to grayscale by decreasing the saturation to 1, then applying a brown tint with colorize, we achieve the Sepiatone effect of aged photographs.

LiquiFire User's Guide: Base Command Set
```
source=url[http://www.liquidpixels.net/images/Fence.tif]
saturation=value[1]
colorize=fill[tan3],opacity[35]
sink
```
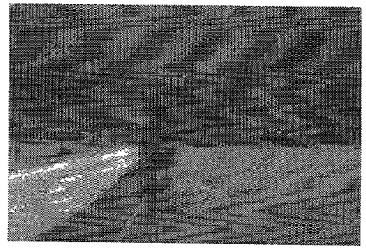

LiquiFire User's Guide: Base Command Set composite

Description

Composition, or layering, allows two images to be combined together. Two images are involved in composition: the current image and a new source image (the layered image) specified by the image argument. During the composition process, alpha channels (transparency information) in both the current image and the layered image may be involved in the combination process, depending on which compose operator is used.

The two images are combined, pixel by pixel, according to the specific compose operator specified. The over compose operator is probably most commonly used; it performs image layering, blending the layered image to the current image based on the current image's alpha channel.

Arguments

| Argument | Type | Description |
|---|---|---|
| compose | Over\|Xor\|Add\|Subtract\|Bumpmap\|Replace\|ReplaceRed\|ReplaceGreen\|ReplaceBlue\|ReplaceAlpha\|Blend\|Displace | Required.<br>The type of composition to perform. |
| image | string | Required.<br>The name of the image in the image pool to use as the layered image. |

LiquiFire User's Guide: Base Command Set

| Argument | Type | Description |
|---|---|---|
| x | number | Optional. |
| | | The horizontal offset, in pixels, of the layered image relative to the left edge of the current image. |
| y | number | Optional. |
| | | The vertical offset, in pixels, of the layered image relative to the top edge of the current image. |
| gravity | NorthWest\| North\| NorthEast\| East\| SouthEast\| South\| SouthWest\| West\|Center | Optional. |
| | | Determines the origin from which the origin of the composite image is positioned, relative to the current image '_'. |
| opacity | number | Optional. [nyi] |
| | | Percentage of opacity to use during composition. |

Examples

In the following examples, these two images and corresponding alpha channels are used:

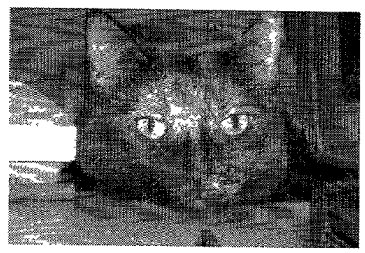
Layered Image

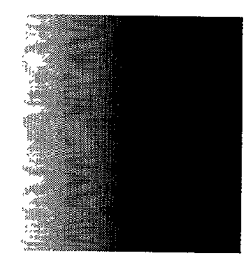
Layered Image's Alpha Channel

Current Image

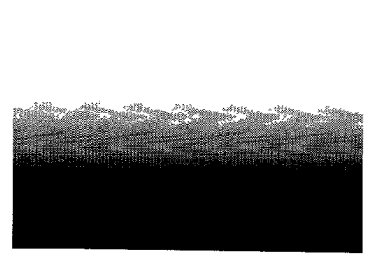
Current Image's Alpha Channel

LiquiFire User's Guide: Base Command Set

These sample images are composited together below using the indicated compose operator.

Over

Renders the layered image, masked by the layered image's inverted alpha channel, layered with the current image, masked by the layered image's alpha channel

```
red     = ( L[r] * (255 - L[α]) + C[r] * L[α] ) * 1/255
green   = ( L[g] * (255 - L[α]) + C[g] * L[α] ) * 1/255
blue    = ( L[b] * (255 - L[α]) + C[b] * L[α] ) * 1/255
alpha   = ( L[a] * (255 - L[α]) + C[a] * L[α] ) * 1/255
```

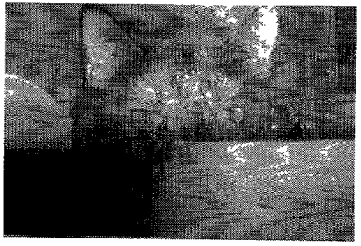

Atop

Renders the layered image masked by the current image's alpha channel, combined with the current image, masked by the layered image's alpha

```
red     = ( L[r] * C[α] + C[r] * ( 255 - L[α] ) ) * 1/255
green   = ( L[g] * C[α] + C[g] * ( 255 - L[α] ) ) * 1/255
blue    = ( L[b] * C[α] + C[b] * ( 255 - L[α] ) ) * 1/255
alpha   = ( L[α] * C[α] + C[α] * ( 255 - L[α] ) ) * 1/255
```

LiquiFire User's Guide: Base Command Set

In

Renders the layered image, masked by the current image's alpha channel

```
red     = L[r] * (255 - C[α]) * 1/255
green   = L[g] * (255 - C[α]) * 1/255
blue    = L[b] * (255 - C[α]) * 1/255
alpha   = L[a] * (255 - C[α]) * 1/255
```

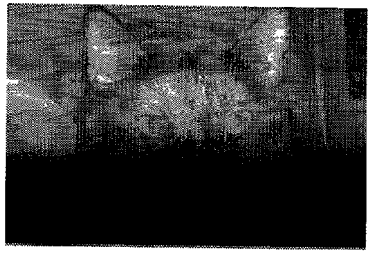

Out

Displays the layered image, masked by the current image's inverted alpha channel

```
red     = ( L[r] * C[α] ) * 1/255
green   = ( L[g] * C[α] ) * 1/255
blue    = ( L[b] * C[α] ) * 1/255
alpha   = ( L[a] * C[α] ) * 1/255
```

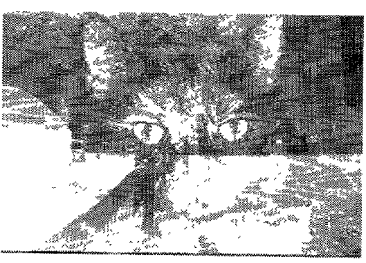

Plus

Renders the layered image arithmetically added to the current image. Channel values exceeding the allowed range are clipped to the maximum allowable level.

(pixel values are clipped)

```
red     = L[r] + C[r]
green   = L[g] + C[g]
blue    = L[b] + C[b]
alpha   = L[α] + C[α]
```

LiquiFire User's Guide: Base Command Set

Minus

Renders the layered image arithmetically subtracted from the current image. Negative channel values are set to zero.

(pixel values are clipped)

```
red      = L[r] - C[r]
green    = L[g] - C[g]
blue     = L[b] - C[b]
alpha    = L[α] - C[α]
```

Difference

Renders the arithmetic difference (absolute value of the difference) between the current image and the layered image.

```
red      = absolute( L[r] - C[r] )
green    = absolute( L[g] - C[g] )
blue     = absolute( L[b] - C[b] )
alpha    = absolute( L[α] - C[α] )
```

Xor

Renders the layered image masked by the current image's alpha channel with the current image masked by the layered image's alpha channel.

```
red      = ( L[r] * C[α] + C[r] * L[α] ) * 1/255
green    = ( L[r] * C[α] + C[r] * L[α] ) * 1/255
blue     = ( L[r] * C[α] + C[r] * L[α] ) * 1/255
alpha    = ( L[r] * C[α] + C[r] * L[α] ) * 1/255
```

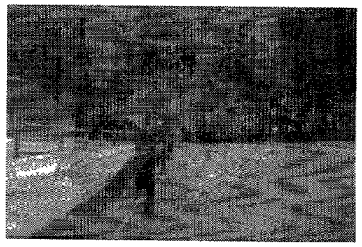

```
red     = brightness( L )
green   = C[g]
blue    = C[b]
```

ReplaceRed

Replaces the current image's red channel with the brightness of the layered image.

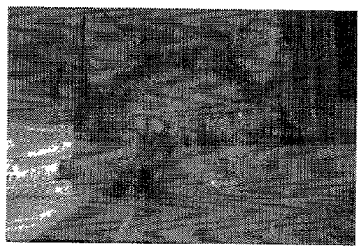

```
red     = C[r]
green   = brightness( L )
blue    = C[b]
```

ReplaceGreen

Replaces the current image's green channel with the brightness of the layered image.

```
red     = C[r]
green   = C[g]
blue    = brightness( L )
```

ReplaceBlue

Replaces the current image's blue channel with the brightness of the layered image.

LiquiFire User's Guide: Base Command Set
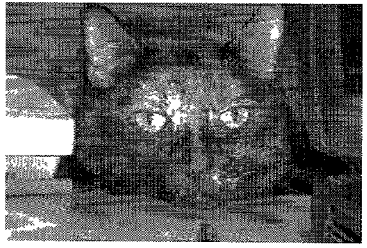
```
red      = C[r]
green    = C[g]
blue     = C[b]
alpha    = brightness( L )
```
ReplaceAlpha
Replaces the current image's alpha channel with the brightness of the layered image.
(no visible change)

LiquiFire User's Guide: Base Command Set
contrast
Description
Perform automatic image contrast optimization.
Arguments
| Argument | Type | Description |
|---|---|---|
| increase | true\|false | Default: True. |
| | | If true, the contrast is increased. If false, the contrast is decreased. |
Example
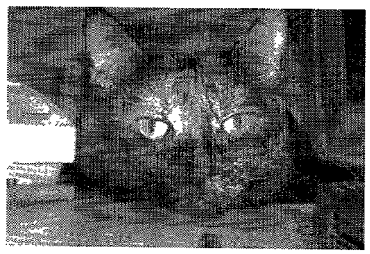 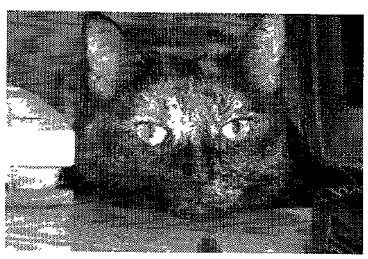
Original                                          contrast=increase[true]

LiquiFire User's Guide: Base Command Set crop

Description

Crop an image

Arguments

| Argument | Type | Description |
|---|---|---|
| width | number | Optional. |
| | | Width, in pixels, of the image region to preserve. If omitted, the area from the horizontal offset x to the right edge of the image is preserved. |
| height | number | Optional. |
| | | Height, in pixels, of the image region to preserve. If omitted, the area from the vertical offset y to the bottom edge of the image is preserved. |
| x | number | Default: 0 |
| | | Horizontal offset, in pixels, from the left edge of the image where cropping will begin. Any image area to the right of this value is preserved. |
| y | number | Default: 0 |
| | | Vertical offset, in pixels, from the top edge of the image where cropping will begin. Any image area below this value is preserved. |

Example

The original image:

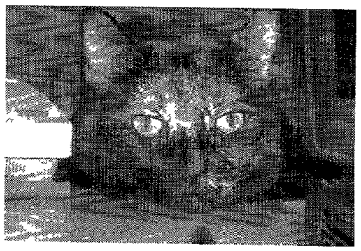

LiquiFire User's Guide: Base Command Set
Cropping 60 pixels from all sides, results in:
```
source=url[http://www.liquidpixels.net/images/truff.jpg]&
crop=x[60],y[60],width[(a.width-120)],
    height[(a.height-120)]&
sink
```

LiquiFire User's Guide: Base Command Set double

Description

Double the size of an image via linear interpolation. Linear interpolation is high speed, mediocre quality. See scale on page 137 for higher-quality alternatives.

Arguments none

LiquiFire User's Guide: Base Command Set draw

Description

Draw arbitrary line-graphics onto an image.

Arguments

| Argument | Type | Description |
|---|---|---|
| primitive | line\|rectangle\|arc\|ellipse\|circle\|polyline\|polygon\|bezier\|color | Required.<br>The name of the graphic element to draw. |
| points | pointlist | Required.<br>A space separated list of points appropriate for the primitive selected. Multiple instances of the same primitive can be imaged by specifying multiple sets of coordinates.<br>Line: Sequence of x,y pairs<br>Rectangle: Left, Top, Right, Bottom<br>Arc: $Start_x$, $Start_y$, $End_x$, $Endy$, $Bias_{start}$, $Bias_{end}$<br>Ellipse: Center x,y, x radius, y radius, start angle, end angle<br>Circle: $Center_x$, $Center_y$, $Point_x$, $Point_y$<br>Polyline: Sequence of x,y points<br>Polygon: Sequence of x, y points. Polygons are closed polylines.<br>Bezier: 4 pairs of points, defining start, $control_1$, $control_2$, and end |
| stroke | color | Stroke color |
| fill | color | Fill color |
| tile | string | Optional.<br>Name of an image in the image pool to use as a pattern when drawing. |
| swidth | number | Optional.<br>width, in pixels, of strokes |

LiquiFire User's Guide: Base Command Set

| Argument | Type | Description |
|---|---|---|
| translate | pointlist | Optional. X, Y offset at which drawing begins. |
| scale | number | Optional. If present, coordinates in drawing operations are scaled by this factor. |
| rotate | number | Optional. If present, drawing operations are rotated counterclockwise. |
| skewx | number | Optional. If present, drawing operations are skewed in the horizontal direction |
| skewy | number | Optional. If present, drawing operations are skewed in the vertical direction |

Example

A few lines:

```
blank=width[300],height[200]&
draw=primitive[line],points[20+50+280+50],stroke[black]&
draw=primitive[line],points[20+70+280+70],stroke[red]&
draw=primitive[line],points[20+90+280+90],
    stroke[purple],swidth[10]&
sink
```

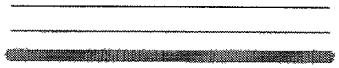

Arcs:

```
blank=width[300],height[200]&
draw=primitive[arc],points[150+100+50+70+50+50],
    stroke[black],swidth[2]&
draw=primitive[arc],points[150+100+200+90+20+20],
    stroke[darkgreen],swidth[2]&
draw=primitive[arc],points[150+100+200+40+40+20],
    stroke[purple],swidth[3]&
sink
```

Circles:

```
source=url[http://www.liquidpixels.net/images/truff.jpg],
    name[cat]&
blank=width[300],height[200]&
draw=primitive[circle],points[150+100+10+100],
    stroke[black],swidth[2],tile[cat]&
draw=primitive[circle],points[150+100+170+100],
    stroke[black],swidth[2],fill[gray80]&
sink=format[gif]
```

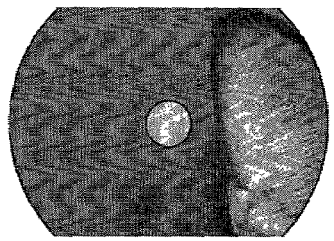

LiquiFire User's Guide: Base Command Set ellipses:

```
blank=width[300],height[200]&
draw=primitive[ellipse],points[150+100+60+70+0+360],
    stroke[black],swidth[2],fill[gray80]&
draw=primitive[ellipse],points[150+100+60+70+290+360],
    stroke[black],swidth[2]&
draw=primitive[ellipse],points[130+70+15+10+0+360],
    stroke[darkgreen],swidth[2],fill[lavender]&
draw=primitive[ellipse],points[170+70+15+10+0+360],
    stroke[darkgreen],swidth[2],fill[lavender]&
draw=primitive[ellipse],points[150+120+40+25+0+180],
    stroke[purple],swidth[3]&
sink=format[gif]
```

LiquiFire User's Guide: Base Command Set

Affine Transformations:

```
blank=width[300],height[200]&
draw=primitive[ellipse],points[150+100+60+70+0+360],
    stroke[black],swidth[2],fill[gray80],rotate[30],
    translate[50+-50]&
draw=primitive[ellipse],points[130+70+15+10+0+360],
    stroke[darkgreen],swidth[2],fill[lavender],rotate[30],
    translate[50+-50]&
draw=primitive[ellipse],points[170+70+15+10+0+360],
    stroke[darkgreen],swidth[2],fill[lavender],rotate[30],
    translate[50+-50]&
draw=primitive[ellipse],points[150+120+40+25+0+180],
    stroke[purple],swidth[3],rotate[30],translate[50+-50]&
sink=format[gif]
```

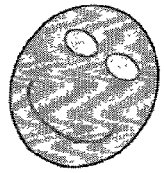

LiquiFire User's Guide: Base Command Set fill

Description

Fill a region of an image to the nearest image border.

Arguments

| Argument | Type | Description |
| --- | --- | --- |
| x | number | Required. |
|  |  | The horizontal location at which to begin pouring ink. |
| y | number | Required. |
|  |  | The vertical location at which to begin pouring ink. |
| color | color | Required. |
|  |  | The color to flood the image. |

Example

While the draw command provides powerful drawing primitives including control over fill and stroke color, there are times when areas of an image must be painted by alternative means. Here, two interlocking circles form a shape which is filled with the fill command.

```
blank=width[300],height[150],color[skyblue]
draw=primitive[Cir-
cle],points[100+75+30+75],swidth[1],stroke[black]
draw=primitive[Cir-
cle],points[200+75+270+75],swidth[1],stroke[black]
fill=x[150],y[75],color[Red]
sink=format[gif]
```

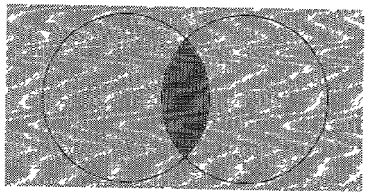

filter

Description

Process an image through an image filter or special effect.

Additional filters can be added to LiquiFire.

Arguments

| Argument | Type | Description |
| --- | --- | --- |
| effect | denoise\| despeckle\| emboss\| enhance\| equalize\| implode\| invert\| noise\| normalize\| paint\| shade\| sketch\| solarize\| spread\| swirl\| wave | Required. The name of the filter to be applied. |
| level | number | Required. Determines the strength of the effect. This value has differing meanings for each filter. See Appendix,"Filter Control Values" on page 189 for specific filter semantics. |
| alpha | number | Optional for certain effects. This value has differing meanings for each filter. See Appendix,"Filter Control Values" on page 189 for specific filter semantics. |
| beta | number | Optional for certain effects. This value has differing meanings for each filter. See Appendix,"Filter Control Values" on page 189 for specific filter semantics. |

LiquiFire User's Guide: Base Command Set
Example
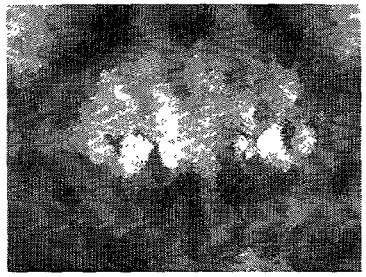
filter=effect[Paint],level[3]
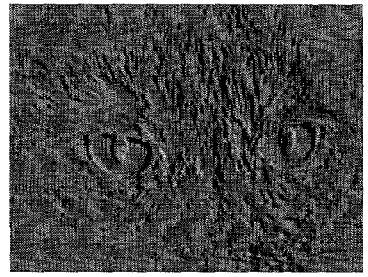
filter=effect[shade],
  level[15],alpha[270]
filter=effect[sketch],level[10]
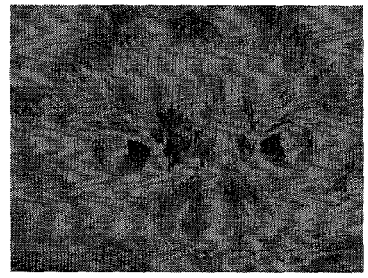
filter=effect[solarize],
  level[50]

flipx
Description
Mirror an image along its X axis; vertically flip the image, top to bottom.
Arguments
none
Example
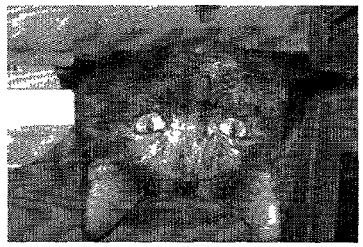

LiquiFire User's Guide: Base Command Set
flipy
Description
Mirror an image along its Y axis; horizontally flip the image, left to right.
Arguments
none
Example
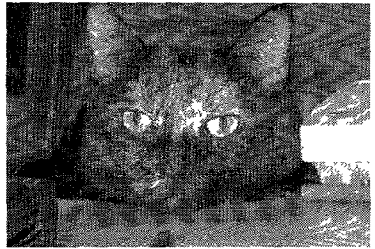

frame

Description

Create a beveled frame around an image, increasing the size of the image buy the size of the frame.

Arguments

| Argument | Type | Description |
| --- | --- | --- |
| width | number | Default: 15 |
| | | Overall combined width, in pixels of each of the three bevel components |
| height | number | Default: 15 |
| | | Overall combined height, in pixels of each of the three bevel components |
| inner | number | Default: 5 |
| | | Number of pixels used for the lighter inner bevel |
| outer | number | Default: 5 |
| | | Number of pixels used for the darker inner bevel |
| color | color | Default: gray70 |
| | | Color of the frame |

Example

```
source=url[http://www.liquidpixels.net/images/truff.jpg]&
frame=width[20],height[20],color[blue]&
sink
```

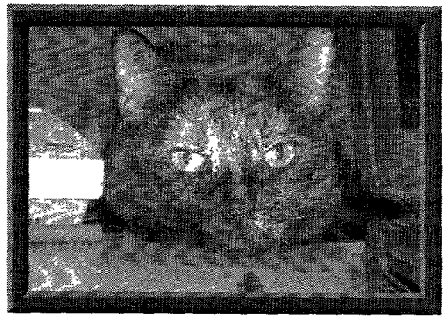

LiquiFire User's Guide: Base Command Set grid

Description

Draw a grid of lines on an image.

Grid spacing, color, thickness, and position can all be controlled.

Arguments

| Argument | Type | Desctiption |
|---|---|---|
| step | number | Default: 10 |
| | | If present, determines the spacing between the grid lines in both the vertical and horizontal direction. |
| xstep | number | Optional. |
| | | If present, independantly determines the spacing between the vertical grid lines. Overrides step. |
| ystep | number | Optional. |
| | | If present, independantly determines the spacing between the horizontal grid lines. Overrides step. |
| color | color | Default: Black |
| | | If present, determines the color of the grid lines. |
| swidth | number | Default: 1 |
| | | If present, determines the thickness of the gridlines. |
| x | number | Optional. |
| | | If present, the grid will begin at the specified horizontal location on the image. |
| y | number | Optional. |
| | | If present, the grid will begin at the specified vertical location on the image. |
| width | number | Optional. |
| | | If present, the grid will end at the specified horizontal location on the image. |
| height | number | Optional. |
| | | If present, the grid will end at the specified vertical location on the image. |

LiquiFire User's Guide: Base Command Set
Example
```
source=url[http://www.liquidpixels.net/TestImages/truff.jpg]
scale=size[50%]
grid=color[yellow]
sink
```
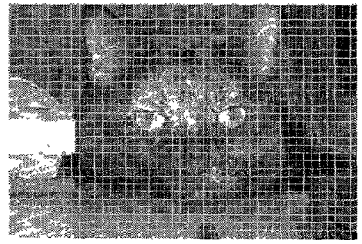

LiquiFire User's Guide: Base Command Set gamma

Description

Apply a gamma correction curve to the image, or to one (or more) channels.

Arguments

| Argument | Type | Desctiption |
|---|---|---|
| gamma | number | Optional, One argument required. |
| | | If present, the entire image is adjusted by the application of gamma correction |
| red | number | Optional, One argument required. |
| | | If present, the red channel is adjusted by the application of gamma correction |
| green | number | Optional, One argument required. |
| | | If present, the green channel is adjusted by the application of gamma correction |
| blue | number | Optional, One argument required. |
| | | If present, the blue channel is adjusted by the application of gamma correction |

Example

```
source=url[http://www.liquidpixels.net/TestImages/truff.jpg]
scale=size[50%]
gamma=gamma[2.0]
sink
```

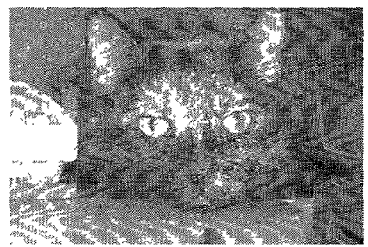

gamma=gamma[2.0]

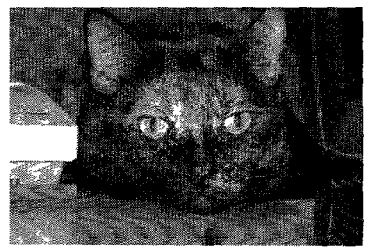

gamma=gamma[0.6]

LiquiFire User's Guide: Base Command Set gblur

Description

Apply a Gaussian blurring to an image.

When blurring an image, numerous options exist for the mechanism and nature of the blurring function. One such mechanism, called a Gaussian blur, attempts to blur the digital image much the way an optical lens would - symmetrically in all directions from any single point. The function enables the user to specify the amount of blur (sigma) and the extent of the blur from any point (radius).

Arguments

| Argument | Type | Description |
|---|---|---|
| width | number | Required. |
| | | The extent of the blurring from any point. |
| sigma | number | Default: 1.0 |
| | | The amount of blurring to apply. |

Example

```
source=url[http://www.liquidpixels.net/TestImages/truff.jpg]&
scale=size[300x300]&
gblur=width[2],sigma[1.0]&
sink
```

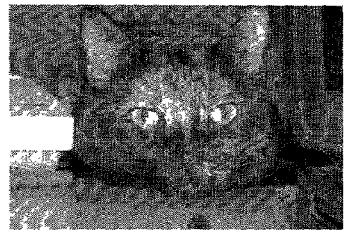

Original

LiquiFire User's Guide: Base Command Set
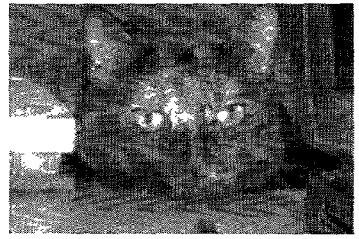
gblur=width[2],sigma[1.0]
gblur=width[4],sigma[1.0]
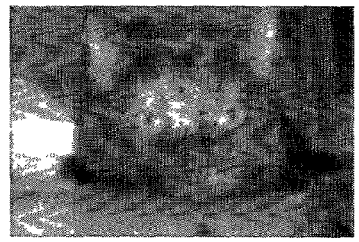
gblur=width[6],sigma[3]
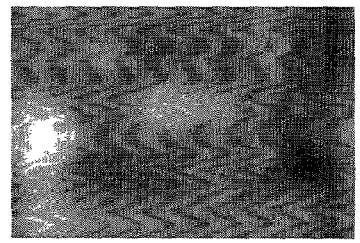
gblur=width[20],sigma[20]

half

Description

Halve the size of an image. Pixel halving is performed by linear interpolation - High speed, mediocre quality. See scale on page 137 for higher-quality alternatives.

Arguments none

LiquiFire User's Guide: Base Command Set hue

Description

Adjusts hue (color) of an image

Arguments

| Argument | Type | Description |
| --- | --- | --- |
| value | number | Required.<br>$0 \leq n \leq 100$<br><br>The amount of hue adjustment, as a percentage of 360°, to apply. A value of 50 shifts colors 180°, a value of 100 shifts colors 360°. |

Example

```
source=url[http://www.liquidpixels.net/images/truff.jpg]&
scale=size[50%]&
hue=value[20]&
sink
```

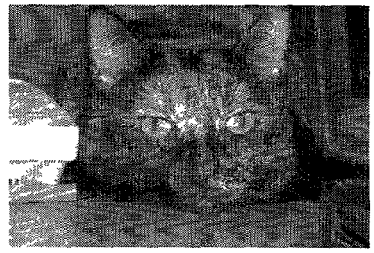

layer

Description

Replace the current image or add a named image to the pool containing the channel specified from the current image. The layer command replaces the original image data with a monochrome image from the selected channel. See the duplicate command to preserve the original image in the pool.

Arguments

| Argument | Type | Description |
|---|---|---|
| layer | red\|green\|blue\|alpha | The name of the channel to select |
| name | string | Optional; |
|  |  | If omitted, the color channel specified is extracted and replaces the currentimage in the pool. If specified, the extracted layer is added to the pool under this name. |

Example

To darken the green channel in an image (whch will appear as a magenta cast), the layer command and brightness commands are used:

```
source=url[http://www.liquidpixels.net/images/truff.jpg],
    name[cat]&
layer=layer[green],name[greenchannel]&
brightness=value[80]&
select=name[cat]&
composite=compose[replaceGreen],image[greenchannel]&
sink
```

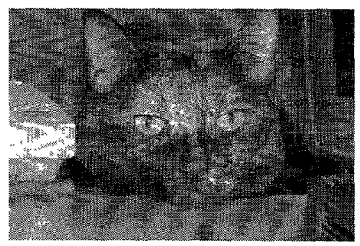

optimize

Description

Adds format-specific optimizations from an image.

Certain formats, such as GIF-89, are capable of presenting their image data as several frames, each with its own origin, color table, and size. The optimize command identifies redundancies in the image and processes each frame to the smallest size possible, with the most efficient color table.

Optimized images are difficult to manipulate, but are significantly smaller when transmitted.

Arguments none

LiquiFire User's Guide: Base Command Set quantize

Description

Reduce the number of colors in an image by using stepwise quantization.

Quantization maintains an even distribution of the image's colors while grouping them into evenly spaced clusters, and replaces the colors in the image with the average color of the cluster.

Optionally, the quantize command can be used to convert the image from one colorspace to another, by specifying the colorspace argument.

Arguments

| Argument | Type | Description |
| --- | --- | --- |
| colors | number | Required. |
| | | The maximum number of colors in the new image |
| dither | Boolean | Default: false |
| | | If true, the image is dithered to appear as if more colors are in use. |
| colorspace | RGB\|Gray\|Transparent\|OHTA\|XYZ\|YCbCr\|YIQ\|YPbPr\|YUV | Optional. The name of an alternative colorspace. |

Example

```
source=url[http://www.liquidpixels.net/images/truff.jpg],name[c]&
quantize=colors[16]&
sink
```

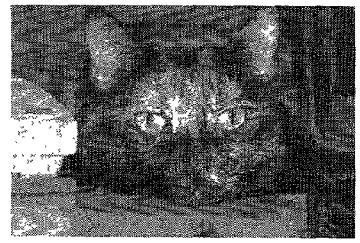
quantize=colors[16]

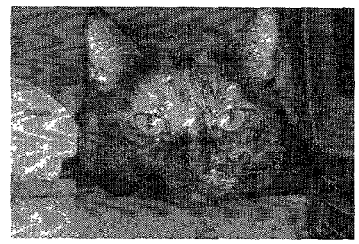
quantize=colors[8],dither[true]

LiquiFire User's Guide: Base Command Set
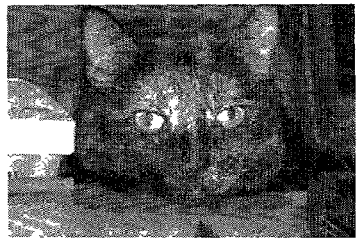
quantize=colors[8],
colorspace[gray]
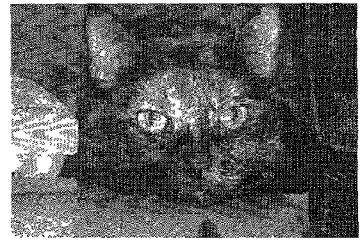
quantize=colors[4],
colorspace[gray],dither[true]

LiquiFire User's Guide: Base Command Set removeprofile

Description

Removes all ICC profiles embedded in an image.

Arguments

None.

See

"addprofile" on page 83.

LiquiFire User's Guide: Base Command Set resize

Description

Scale an image, using a specific sampling algorithm.

See "scale" on page 137.

Arguments

| Argument | Type | Description |
|---|---|---|
| size | dim\|%labsSize\| | The desired size of the image. |
| | | Size can be specified as a percentage (n%), an enclosing rectangle (mxn). or an absolute size in pixels (mxn!) |
| filter | Point\|Box\|Triangle\|c\|Hermite\|Hanning\|Hamming\|Blackman\|Gaussian\|Quadratic\|Cubic\|Catrom\|Mitchell\|Lanczos\|BessellSinc | Default: point |
| | | The name of the sampling algorithm to use. |

Relative Performance

| Filter | Overhead | Filter | Overhead |
|---|---|---|---|
| Point | (baseline) | Quadratic | 160% |
| Box | 114% | Mitchell | 160% |
| Hamming | 128% | Cubic | 162% |
| Triangle | 128% | Lanczos | 196% |
| Hermite | 128% | Cantrom | 197% |
| Blackman | 129% | Bessel | 206% |
| Hanning | 132% | Sinc | 231% |
| Gaussian | 136% | | |

TABLE 1. Relative Filter Performance roll

Description

Roll an image horizontally or vertically.

Rolling an image shifts the content, replacing the original content with the portion of the image that fall outside the original image bounds.

Arguments

| Argument | Type | Description |
| --- | --- | --- |
| x | number | Optional. |
| | | The horizontal displacement, in pixels. |
| y | number | Optional. |
| | | The vertical displacement, in pixels. |

Example

By using the border command, in conjunction with the roll command and LiquiFire's ability to evaluate expressions, we can create a space for text annotations - regardless of the image's size.

```
source=url[http://www.liquidpixels.net/images/truff.jpg]
    ,name[cat]&
border=height[20],width[1]&
roll=y[(cat.height-19)]&
annotate=gravity[south],font[Arial-Roman],
    text[A+Cat],pointsize[14],y[-28]&
sink
```

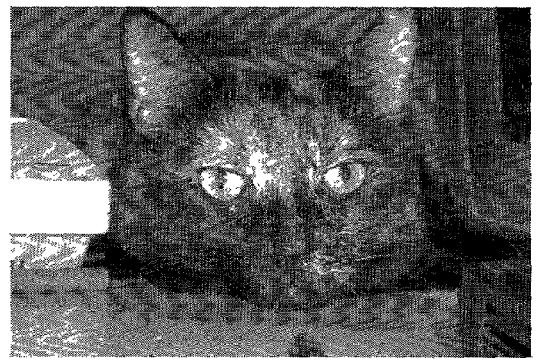

A Cat

LiquiFire User's Guide: Base Command Set rotate

Description

Rotate an image clockwise.

Arguments

| Argument | Type | Description |
|---|---|---|
| degrees | number | Required. |
| | | The angle, in degrees. |
| fill | color | Optional. |
| | | If present, the 'triangles' remaining are filled with this color when an image is rotated an amount other than 90° increments. |

Example

```
source=url[http://www.liquidpixels.net/images/truff.jpg]&
scale=size[50%]&
rotate=degrees[38.5],fill[lightblue]&
sink
```

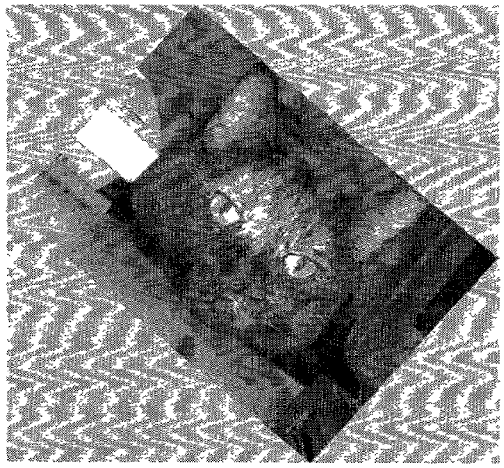

LiquiFire User's Guide: Base Command Set
```
source=url[http://www.liquidpixels.net/images/truff.jpg]&
scale=size[50%]&
rotate=degrees[90]&
sink
```

LiquiFire User's Guide: Base Command Set saturation

Description

Adjusts saturation of an image

Arguments

| Argument | Type | Description |
| --- | --- | --- |
| value | number | Required. |
| | | The amount of saturation adjustment to apply, represented as percent. A value of 0 will desaturate an image completely – converting it to grayscale; 100 represents no change; values greater than 100 increase saturation. |

Example

Original

 

saturation=value[50]           saturation=value[150]

scale

Description

Scale an image. Image dimensions can be specified in 4 ways:

| Mechanism | Format | Description |
|---|---|---|
| a fixed target size | widthxheight! | In this mode, the image will be scaled to exactly the dimensions specified. The image will be distorted from the original aspect ratio if necessary. |
| an enclosing rectangle | widthxheight | In this mode, the image will be scaled to the maximum size possible within the specified dimensions, preserving the image's aspect ratio |
| an enclosing square | side | Shorthand; equivalent to an enclosing rectangle with equal sides |
| a percentage | percent% | The image will be decreased in size if the number is less than 100; increased for numbers greater than 100. |

TABLE 2. Image Dimension Specification

Arguments

| Argument | Type | Description |
|---|---|---|
| size | dim|%| absSize! | The desired size of the image. |
| | | Size can be specified as a percentage (nn%), an enclosing rectangle (mmxnn). or an absolute size in pixels (mmxnn!) |
| width | number | Optional. |
| | | If present, the image is scaled to the specified width, in pixels. |
| height | number | Optional. |
| | | If present, the image is scaled to the specified width, in pixels. |

Example

Here, we specify the scale size in 'enclosing square' mode. The resulting image's aspect ratio is preserved with the larger size scaled to 400 pixels and the other such that the image is not stretched.

LiquiFire User's Guide: Base Command Set
```
source=url[http://www.liquidpixels.net/images/Fence.tif]&
scale=size[400]&
sink
```
Fixed target size can be used to stretch images:
```
source=url[http://www.liquidpixels.net/images/Fence.tif]
scale=size[500x100!]
sink
```

LiquiFire User's Guide: Base Command Set segment

Description

Perform color reduction by histogram analysis and similar-color clustering. Very accurate, Very computationally expensive (slow)

Arguments

| Argument | Type | Description |
|---|---|---|
| colorspace | RGB\|Gray\|Transparent\|OHTA\|XYZ\|YCbCr\|YIQ\|YPbPr\|YUV | Optional. If present, specifies new colorspace for the image. Note that, for non-direct conversion, profile-based color management is not employed during this conversion |
| cluster | number | Weight to apply to color clusters |
| smooth | number | Amount of smoothing applied to the histogram. Higher numbers result in fewer colors |

Example

Original

segment=smooth[0.2]

segment=smooth[0.5]

sharpen
Description
Apply sharpening with a laplacian kernel to an image.
See also usharpmask on page 147.
Arguments
| Argument | Type | Description |
| --- | --- | --- |
| radius | number | Required. |
| | | The extent of the sharpening from any point. |
| sigma | number | Default: 1.0 |
| | | The amount of sharpening to apply. |
Example
Original
 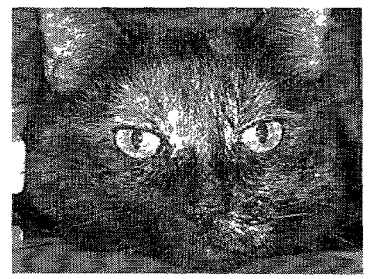
sharpen=radius[1],sigma[20]     sharpen=radius[2],sigma[20]

LiquiFire User's Guide: Base Command Set showid

Description

Images the JobID onto the image. This is useful when developing complex image chains as the JobID can be used in LiquiFire Orb to obtain additional detailed information about the processing of a job.

Arguments

None

Example

```
source=url[http://www.liquidpixels.net/images/truff.jpg]
scale=size[50%]
showid
sink
```

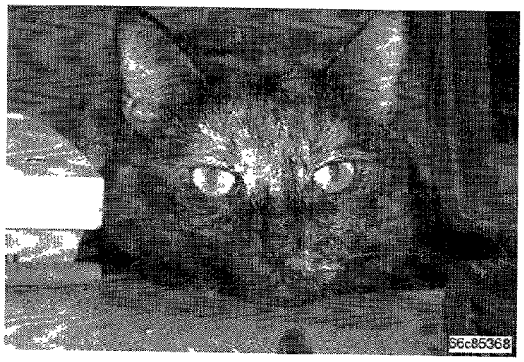

LiquiFire User's Guide: Base Command Set svg

Description

Manipulate Scalable Vector Graphics documents dynamically.

Additional information about SVG can be found at
http://www.w3.org/TR/2001/PR-SVG-20010719/index.html

Arguments

| Argument | Type | Description |
|---|---|---|
| id | number | Required. |
| | | The id for the SVG element you which to alter. |
| type | style | Required |
| | | The type of manipulation to perform. Currently only styles may be changed. |
| value | string | Required |
| | | The new value for the attribute |

Example

```
source=url[http://www.liquidpixels.net/images/USA.svg]
svg=type[style],id[NE],value[fill:teal;]
sink
```

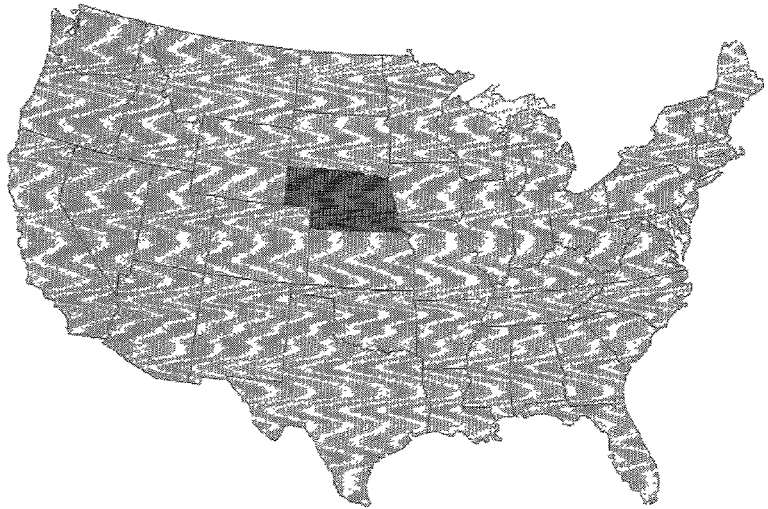

threshold

Description

Convert an image to monochrome via intensity thresholding.

The image is first converted to greyscale (more accurately, the intensity of each pixel is evaluated). The gray levels are then mapped to either 'black' or 'white' by the threshold value. Gray levels below the threshold are changed to 'white' while those at or above the threshold are changed to 'black.'

Arguments

| Argument | Type | Description |
| --- | --- | --- |
| level | number | Default: 128 |
|  |  | (0 ≤ n ≤ 255) |
|  |  | The gray level at which pixels are mapped to black. |

Example

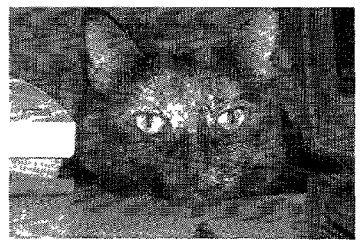
Original

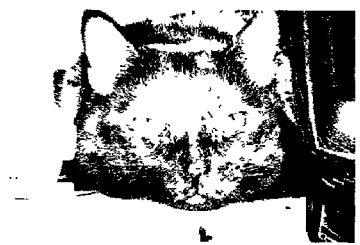
threshold=level[64]

threshold=level[192]

LiquiFire User's Guide: Base Command Set tile

Description

Fill the current image by tiling the specified image.

Arguments

| Argument | Type | Description |
| --- | --- | --- |
| image | string | The name of the image in the image pool to be used as the tile. |

Example

The first example takes the cat image, scales it to fit within a 64 pixel square, and uses this small picture as a tile on a blank image background.

```
source=url[http://www.liquidpixels.net/images/truff.jpg],
    name[cat]&
scale=size[64]&
blank=width[300],height[300]&
tile=image[cat]&
sink
```

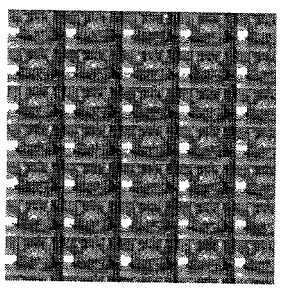

LiquiFire User's Guide: Base Command Set

Here, we use LiquiFire to create the now ubiquitous 'Apple Effect' where an image is modified to contain lighter lines throughout:

```
source=url[http://www.liquidpixels.net/images/truff.jpg],
    name[cat]&
scale=size[50%]&
blank=width[4],height[4],name[tile]&
draw=primitive[line],points[0 0 3 0],stroke[black]&
draw=primitive[line],points[0 2 3 2],stroke[black]&
blank=width[(cat.width)],height[(cat.height)],name[lines]&
tile=image[tile]&
brightness=value[30]&
select=name[cat]&
composite=compose[difference],image[lines]&
sink
```

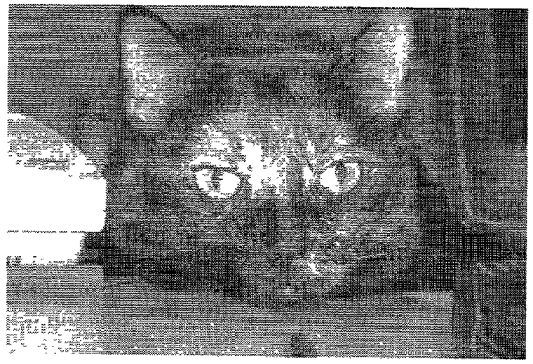

LiquiFire User's Guide: Base Command Set transparent

Description

Indicate that the color specified should be transparent in formats which support transparency.

Arguments

| Argument | Type | Description |
|---|---|---|
| color | color | Required. |
| | | The color to be marked transparent. |

Example

```
text=font[GillSans-Bold],pointsize[24],fill[Navy],
    text[Hello+Again]&
transparent=color[white]&
sink=format[gif]
```

Hello Again

LiquiFire User's Guide: Base Command Set usharpmask

Description

Applies an unsharp masking transformation to an image.

Unsharp masking works by accentuating the difference between details, actually brightening and darkening adjacent pixels to increase apparent sharpness.

Arguments

| Argument | Type | Description |
|---|---|---|
| radius | number | Required. |
| | | The range of pixels adjacent to be affected. |
| amount | number | Required. |
| | | The amount of adjustment to apply, as a percentage. Typical values range between 50 and 150 (%). |
| threshold | number | Optional. |
| | | If present, the threshold which must be exceeded before sharpening is applied; if omitted, all pixels are affected. |
| sigma | number | Default: 5 |
| | | The standard deviation of the gaussian kernel, in pixels. |

Example

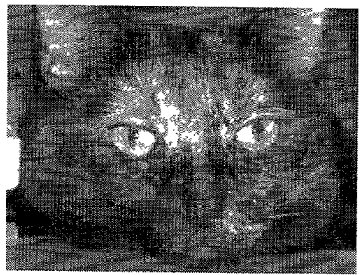

Original

LiquiFire User's Guide: Base Command Set
usharpmask=radius[1],
   amount[150]
usharpmask=radius[1.5],
   amount[120]
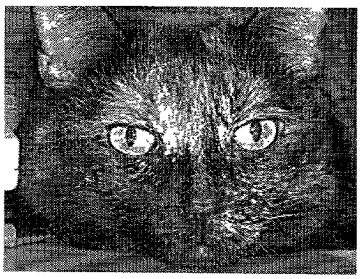
usharpmask=radius[3],
   amount[120]
usharpmask=radius[1],
   amount[120],sigma[10]

unoptimize

Description

Removes format-specific optimizations from an image.

Certain formats, such as GIF-89, are capable of presenting their image data as several frames, each with its own origin, color table, and size. The unoptimize command converts each frame into an image the full size of the background image, and creates a unified color table. Images that have been unoptimized are larger, but may be much more easily manipulated in a uniform fashion.

Use the optimize command to reverse the process.

Arguments none

LiquiFire User's Guide: Base Command Set watermark

Description

Hides an image in the low-order bits of the current image

Arguments

| Argument | Type | Description |
|---|---|---|
| image | string | Required. |
| | | The name of an image in the image pool to be hidden in the image |
| offset | number | Optional. |
| | | The numeric offset to be applied to the data as it is embedded. |

LiquiFire User's Guide: Base Command Set

Macros addalpha

Description

Creates an image with transparency (alpha channel) from the combination of a color image and a mask image. The brightness of the mask image are used to define the opacity.

Arguments

| Argument | Type | Description |
|---|---|---|
| image | url | Required; |
| | | The url for the color image |
| mask | url | Required; |
| | | The url for the mask image |
| invert | boolean | Default: false |
| | | If true, the mask image is inverted before the combination process is performed. |
| name | string | Optional; |
| | | If present, determines the the name for the combined image in the pool. |

Example

```
addalpha=image[http://www.liquidpixels.net/images/Gray.jpg],
    mask[http://www.liquidpixels.net/images/GrayMask.jpg],
    name[shirt],invert[true]&
blank=width[shirt.width],height[shirt.height]&
composite=compose[over],image[shirt]&
sink
```

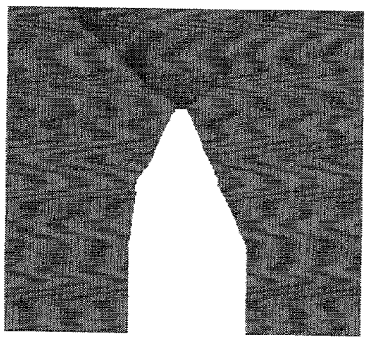

LiquiFire User's Guide: Base Command Set bullet

Description

Creates an image containing a dingbat, or symol, and a single line of text, similar to a bulleted item.

Arguments

| Argument | Type | Description |
|---|---|---|
| size | integer | Default: 10 |
| | | When the glyph argument is present, determines the size of the glyph drawn, in pixels. |
| space | integer | Optional; |
| | | If present, determines the space, in pixels, surrounding the glyph drawn. If omitted, the space is set to one-half the size of the glyph. |
| bgcolor | color | Default: white |
| | | If present, determines the the background color for the image. |
| glyph | circle\|square | Optional; |
| | | If present, determines the shape of the glyph to image adjacent to the text. |
| glyphfill | color | Default: black |
| | | If present, determines the color of the glyph |
| glyphstroke | color | Optional; |
| | | If present, the glyph is stroked (outlined) in the color specified. |
| glyphswidth | integer | Default: 1 |
| | | If present, determines the thickness of the glyph stroke. |
| image | name | Optional; |
| | | If present, the image named will be used in place of a graphic glyph. |
| pointsize | See "annotate" on page 85. | |
| font | See "annotate" on page 85. | |

| Argument | Type | Description |
|---|---|---|
| text | See "annotate" on page 85. | |
| fill | See "annotate" on page 85. | |
| swidth | See "annotate" on page 85. | |
| stroke | See "annotate" on page 85. | |

Example

```
bullet=text[Item+Number+Six],pointsize[16],
  glyphfill[darkred],font[Arial-Roman],fill[navy],glyph[square]
sink
```

■ Item Number Six

```
source=url[file:DingbatC.eps],name[pixels]
scale=size[20]
bullet=text[LiquidPixels],pointsize[14],
  font[Arial-Roman],image[pixels]
sink
```

❋ LiquidPixels

LiquiFire User's Guide: Base Command Set mftext

Description

Render text onto multiple frames of a multi-frame image.

This macro adds a sequence of select – annotate pairs operators to the image chain.

Arguments

| Argument | Type | Description |
|---|---|---|
| start | number | Required. |
| | | Frame number at which to start imaging text |
| end | number | Required. |
| | | Frame number at which to end imaging text |
| name | string | Required. |
| | | Name of multi-frame image in image pool on which text is to be rendered. |
| x | number | Required. |
| | | Horizontal position of text baseline |
| y | number | Required. |
| | | Vertical position of text baseline |
| xstep | number | Optional. |
| | | If present, the horizontal position of the text baseline will be incremented by this value for each subsequent frame, resulting in animated text. |
| ystep | number | Optional. |
| | | If present, the vertical position of the text baselinewill be incremented by this value for each subsequent frame resulting in animated text. |
| gravity | See "annotate" on page 85. | |
| font | See "annotate" on page 85. | |
| pointsize | See "annotate" on page 85. | |
| fill | See "annotate" on page 85. | |
| stroke | See "annotate" on page 85. | |
| swidth | See "annotate" on page 85. | |
| text | string | Required. |
| | | The text to be rendered onto the selected frames |

LiquiFire User's Guide: Base Command Set

Example

The banner image contains 39 frames of animation, and is stored as an optimized gif. Here, we use mftext three times to image a number onto multiple frames, so it persists for a portion of the animation. The optimize command removes this redundancy when the image is transmitted as GIF.

```
source=url[http://www.someserver.com/images/banner.gif]&
unoptimize&
mftext=start[1],end[10],name[_],font[GillSans-Roman],
    gravity[Southwest],x[50],y[-10],text[AAPL:+21.125],
    pointsize[12],fill[white]&
mftext=start[11],end[20],name[_],font[GillSans-Roman],
    gravity[Southwest],x[170],y[-10],text[IBM:+114.05],
    pointsize[12],fill[white]&
mftext=start[21],end[30],name[_],font[GillSans-Roman],
    gravity[Southwest],x[290],y[-10],text[SUNW:+31.125],
    pointsize[12],fill[white]&
select=name[_]&
optimize&
sink=format[GIF],loop[forever]
```

This example depicts the creation of a four-frame image with the word 'Wheee' imaged at four locations on each frame.

```
blank=width[100],height[50],name[b]&
blank=width[100],height[50],name[a]&
attribute=key[delay],value[20]&
addframe=image[b],delay[20]&
addframe=image[b],delay[20]&
addframe=image[b],delay[20]&
select=image[a]&
mftext=font[Arial-Roman],pointsize[18],text[Wheee],
    start[1],end[4],xstep[10],x[5],y[30],name[a]&
select=image[a]&
sink=format[gif],loop[forever]
```

| Wheee | Wheee | Wheee | Wheee |
|---|---|---|---|
| Frame 1 | Frame 2 | Frame 3 | Frame 4 |

LiquiFire User's Guide: Base Command Set text

Description

Image text onto a new, appropriately sized, background image.

Text may contain unicode characters, expressed as Unnnn, where nnnn is a valid Unicode character value, or as extended characters, expressed as \nnn, where nnn is a valid ascii-extended character code.

Multiple lines may be imaged together; line breaks may be expressed by \n within the text.

Additional typefaces can be added to LiquiFire via FTP or LiquiFire Orb, or via URL.

Arguments

| Argument | Type | Description |
| --- | --- | --- |
| text | string | Required. |
| | | The text to be rendered |
| font | See "annotate" on page 85. | |
| pointsize | See "annotate" on page 85. | |
| name | string | Optional. |
| | | If specified, the new image created by the text macro will be added to the image pool under this name. Otherwise, the image will be created as the current image. |
| pad | number | Optional. |
| | | If specified, the background image will be larger than the bounding-box of the text by the specified number of pixels. |
| padx | number | Optional. |
| | | If specified, the background image will be larger in width than the bounding-box of the text by the specified number of pixels. Overrides pad. |
| pady | number | Optional. |
| | | If specified, the background image will be larger in height than the bounding-box of the text by the specified number of pixels. Overrides pad. |
| bgcolor | string | Default: white |
| | | The color of the background image |
| fill | See "annotate" on page 85. | |

LiquiFire User's Guide: Base Command Set

Example

Notice the two escaped characters using two separate escaping methods: the \054, representing the ',' using the '\' to specify an extended character, and the '+' representing a space ' ' using http url-encoding.

```
text=text[LiquidPixels\054+Incorporated],
   font[Anyway-Bold],pointsize[24]&
sink
```

*LiquidPixels, Incorporated*

LiquiFire User's Guide: Base Command Set textcurve

Description

Render text along the radius of a curve.

Arguments

| Argument | Type | Description |
| --- | --- | --- |
| text | string | Required. |
| | | The text to be rendered onto the current image |
| font | See "annotate" on page 85. | |
| fill | See "annotate" on page 85. | |
| pointsize | See "annotate" on page 85. | |
| stroke | See "annotate" on page 85. | |
| swidth | See "annotate" on page 85. | |
| radius | number | Required. |
| | | The radius, in pixels, of the circle on which the text will be imaged |
| x | number | Required. |
| | | The horizontal location of the center of the curcle |
| y | number | Required. |
| | | The vertical location of the center of the curcle |
| start | number | Optional. |
| | | If present, the text will start from the angle specified and continue clockwise. If omitted, the text is centered along the top edge of the circle |
| spacing | number | Optional. |
| | | If present, letters will be drawn at the specified separation. If omitted, letters are drawn following the font-specified character spacing |

Example
```
blank=width[200],height[200],color[gray80]&
textcurve=text[Hello+LiquiFire],x[100],y[100],radius[80],
    font[Arial-Roman],pointsize[20],fill[green]&
sink
```
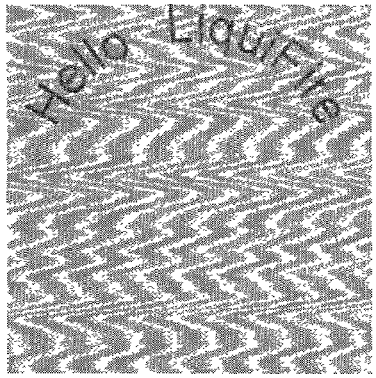

LiquiFire User's Guide: Base Command Set dump

Description

Causes LiquiFire to dump the entire metadata table for the current image into the activity log. Useful at times for debugging complex metadata manipulations.

To access the activity log, the Job ID is required. The showid command can be used to facilitate access to this execution information via LiquiFire Orb. See "showid" on page 141.

Arguments none

LiquiFire User's Guide: Base Command Set

Metacommands auth

Description

Convey authorization information for a request.

Arguments

| Argument | Type | Description |
|---|---|---|
| hash | string | Optional; hash or cipher must be present. |
| | | If present, indicates the provided key is a unique hash specific to the request and unique server 'secret.' |
| cipher | string | Optional; hash or cipher must be present. |
| | | If present, indicates the provided key is a unique cryptographic cipher specific to the request and unique server 'secret.' |

Example

```
source=url[http://www.liquidpixels.net/images/cat.jpg]&
scale=geometry[200x200]&
auth=hash[d409fb30]&
sink
```

LiquiFire User's Guide: Base Command Set countdown

Description

Calculates the time remaining from the current time until the date specified.

Arguments

| Argument | Type | Description |
|---|---|---|
| key | string | Required. |
| | | The name of the metadata field to set |
| target | string | Required. |
| | | The target date, in practically any format, including: |
| | | Dow, dd Mon yyyy, dd Mon yy, dd Mon yyyy, Mon dd yyyy, yyyy/mm/dd, yyyy/mm, mm/dd/yy, mm/dd/yyyy, mm/yy, count "days", count "weeks", count "months", count "years", Dow "after next", "next" Dow, "tomorrow", "today", "yesterday", "last" dow, "last week" |
| name | string | Optional. |
| | | If specified, the name of the image where the resulting metadata will be set. If omitted, the Global metadata will be set. |
| type | Days\|Seconds | Default: days |
| | | Seconds: returns the countdown in seconds remaining until the target date. |
| | | Days: returns the countdown in days remaining to the target date. |

Example

```
countdown=key[day],target[11/22/2001]&
text=text[There+are+(global.day)+days+till+Thanksgiving],
    font[Arial-Roman],pointsize[16]&
sink
```

LiquiFire User's Guide: Base Command Set

There are 294 days till Thanksgiving fontmetrics

Description

Determines the future resulting size of text when rendered in a specified font and size.

The resulting dimensions are added as esoteric metadata to the current image under the names metrics.x and metrics.y.

Arguments

| Argument | Type | Description |
| --- | --- | --- |
| text | string | Required. |
| | | The text to be measured |
| font | string | Required. |
| | | The name of the typeface in which to render the text |
| pointsize | number | Required. |
| | | The size, in points, in which to render the text |

Example

```
fontmetrics=text[Hello],pointsize[30],font[Arial-Bold]&
blank=width[(_.metrics.x%2B5)],height[(_.metrics.y%2B5)]&
annotate=text[Hello],pointsize[30],gravity[Center],
    font[Arial-Bold]&
sink
```

LiquiFire User's Guide: Base Command Set load

Description

Retrieve an image chain, or image chain fragment stored in a file from a web server, ftp server, or file within a LiquiFire server.

Arguments

| Argument | Type | Description |
|---|---|---|
| url | url | Required. Describes the source for the image data |

Example

With a file named /chains/tab.chain containing

```
source=url[file:tab.eps]&
annotate=font[Arial-Roman],pointsize[9],text[global.section],
    gravity[Center],fill[black]
``` located on a server http://www.liquidpixels.net, the request:

```
set=key[section],value[Section+One]&
load=url[http://www.liquidpixels.net/chains/tab.chain]&
sink=format[gif]
``` creates the effective request

```
set=key[section],value[Section+One]&
source=url[file:tab.eps]&
annotate=font[Arial-Roman],pointsize[9],text[global.section],
    gravity[Center],fill[black]&
sink=format[gif]
```

LiquiFire User's Guide: Base Command Set regexcase

Description

A case statement for string expression matching.

Given a list of strings, returns the corresponding value when the key matches one of the specified expressions.

Arguments

| Argument | Type | Description |
|---|---|---|
| key | string | Required. |
| | | The key to match against the cases. |
| name | string | Required. |
| | | The name of the global metadata field to contain the result |
| cases | string | Required. |
| | | A 'l' separated list of extended regular expression patterns. Cases are searched in order. |
| values | string | Required |
| | | A 'l' separated list of results to return when the specified key matches the corresponding expression specified in cases |
| default | string | Optional. |
| | | The result to return should the key does not match any of the specified expressions |

Example

In this example, the countdown command is used to calculate the number of days remaining until November 22, 2001. This value, stored in the global metadata field day is then matched against two regular expressions with the regexcase command. The first expression, '^.$', will match a single character, while the second expression, '.+', will match one or more characters. If the number of days is 9 or less – a single digit – the first expression will match and regexcase will set the global metadata field vday to 'a few'. Otherwise, global.vday is set to the value in the global.day field originally set by countdown.

LiquiFire User's Guide: Base Command Set

```
countdown=key[day],target[11/22/2001]&
regexcase=name[vday],key[global.day],cases[^.$|.%2b],
    values[a+few|global.day]&
text=text[There+are+global.vday+days+till+Thanksgiving],
    font[Arial-Roman],pointsize[16]&
sink=format[gif]
```

There are a few days till Thanksgiving

There are 294 days till Thanksgiving set

Description

Sets a field in the global metadata to the value specified

Arguments

| Argument | Type | Description |
|---|---|---|
| key | string | Required. |
|  |  | The name of the field to set |
| value | string | Optional. |
|  |  | If specified, the value of the field will be set to the value specified. If omitted, the value of the metadata field will be cleared. |

LiquiFire User's Guide: Base Command Set time

Description

Populate esoteric metadata fields with values corresponding to the date and time specified, or the current time, if no date is specified.

The time command populates 33 subfields of the `global.date` metadata field.

Arguments

| Argument | Type | Description |
| --- | --- | --- |
| date | string | Optional. If omitted, the current time and date |
| | | The time and/or date for which the fields should be populated. Times can be expressed in practically any format, including: |
| | | Dow, dd Mon yyyy, dd Mon yy, dd Mon yyyy, Mon dd yyyy, yyyy/mm/dd, yyyy/mm, mm/dd/yy, mm/dd/yyyy, mm/yy, count "days", count "weeks", count "months", count "years", Dow "after next", "next" Dow, "tomorrow", "today", "yesterday", "last" dow, "last week" |

Fields

| Format | Description | Example |
| --- | --- | --- |
| date.zhour | Hour number, 24 hour format, with leading zero | 00 |
| date.zhr | Hour number, 12 hour format, with leading zero | 00 |
| date.hour | Hour number, 24 hour format | 0 |
| date.hr | Hour number, 12 hour format | 0 |
| date.zmin | Minute number, with leading zeros | 45 |
| date.min | Minute number | 45 |
| date.zsec | Second number, with leading zeros | 56 |
| date.sec | Second number | 56 |
| date.zday | Day number, with leading zero | 01 |
| date.day | Day number | 1 |
| date.zmnum | Month number, with leading zeros | 01 |
| date.mnum | Month number | 1 |
| date.mon | Abbreviated month name | Jan |
| date.month | Month name | January |

LiquiFire User's Guide: Base Command Set

| Format | Description | Example |
|---|---|---|
| date.yr | Year, 2 digit format | 03 |
| date.year | Year, 4 digit format | 2003 |
| date.zdoy | Day of the year, starting from 1, with leading zeros | 001 |
| date.doy | Day of the year, starting from 1 | 1 |
| date.wkdy | Abbreviated day of the week | Mon |
| date.weekday | Day of the week | Monday |
| date.wkdynum | Week number, weeks start on Sunday | 4 |
| date.monornate | Ornate month (st, nd, rd) | 2nd |
| date.ampm | Meridian indication | AM |
| date.quarter | Year quarter number | 1 |
| date.zone | Timezone, abbreviated universal form | EST |
| date.zonenum | Timezone, numeric form | -0500 |
| date.mdyhms | Terse month/day/year hour:minute:second | 01/01/01 00:00:00 |
| date.long | Standard Internet format, including timezone | Mon Jan 1 00:00:00 EST 2001 |
| date.mdy | Terse month/day/year | 01/01/01 |
| date.hms | hour:minute:second | 03:45:56 |
| date.hm | hour:minute | 03:45 |
| date.hmsampm | hour:minute:second with meridian | 03:45:56 AM |
| date.common | Common long form date | Thursday, January 2, 2003 |
| date.commontz | Common long form date, with timezone | Thursday, January 2, 2003 EST |

Example

```
time=date[1/2/2003+3:05:56]&
text=font[Arial-Roman],pointsize[14],text[global.date.common]&
sink
```

Thursday, January 2, 2003

LiquiFire User's Guide: Base Command Set timecase

Description

A case statement for dates.

Given a list of dates, times, or date-times, returns the corresponding value when the current time falls within one of the specified ranges.

Arguments

| Argument | Type | Description |
| --- | --- | --- |
| name | string | Required. |
| | | The name of the global metadata field to contain the result |
| cases | string | Required. |
| | | A '\|' separated list of time ranges. Ranges are specified as two times, separated by a dash ('-'). Times can be expressed in practically any format, including: |
| | | Dow, dd Mon yyyy, dd Mon yy, dd Mon yyyy, Mon dd yyyy, yyyy/mm/dd, yyyy/mm, mm/dd/yy, mm/dd/yyyy, mm/yy, count "days", count "weeks", count "months", count "years", Dow "after next", "next" Dow, "tomorrow", "today", "yesterday", "last" dow, "last week" |
| values | string | Required. |
| | | A '\|' separated list of results to return when the current date falls within the corresponding date range specified in cases |
| default | string | Optional. |
| | | The result to return when the current date does not fall within any of the specified ranges |

Example

Assuming a clothing sale runs for the seven days prior to Halloween, the following chain would display a sale indicator atop the image only during the sale period:

LiquiFire User's Guide: Base Command Set

```
timecase=name[ss],cases[10/24/2001-10/31/2001],
    values[1],default[0]&
source=url[file:o/SpikeySplat.svg],name[splat]&
transparent=color[white]&
annotate=text[Sale!],font[GillSans-BoldItalic],
    pointsize[fit],width[(splat.width-60)],
    height[(splat.height-60)],
    gravity[Center],fill[red],stroke[black],swidth[2],
    if[global.ss]&
source=url[http://www.liquidpixels.net/images/shirttie/
    Blue-s.jpg],name[shirt]&
scale=size[200]&
blank=width[300],height[shirt.height]&
composite=image[shirt]&
composite=image[splat],gravity[northeast],if[global.ss]&
sink=format[jpg]
```

current date is between
10/24/2001 and 10/31/2001

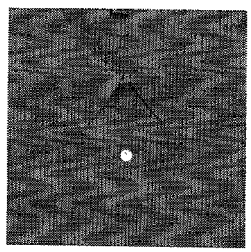
current date outside the range

APPENDIX A

Color Definitions

When color is to be specified, it may be described by name or by component value. To describe by value, colors are specified in the following format:

RRGGBB where RR represents a hexadecimal value for the Red component, GG represents a hexadecimal value for the Green component, and BB represents a hexadecimal value for the Blue component. Note that within requests presented over HTTP, the '#' symbol must be escaped as '%23.'

The list of supported color names, along with their definitions are identified in the tables that follow.

LiquiFire User's Guide: Color Definitions

| | | | | | |
|---|---|---|---|---|---|
| 0/ 0/ 0<br>0/ 0/ 0<br>black | 0/ 0/ 0<br>0/ 0/ 0<br>gray0 | 0/ 0/ 0<br>0/ 0/ 0<br>grey0 | 3/ 3/ 3<br>0/ 0/ 3<br>gray1 | 3/ 3/ 3<br>0/ 0/ 3<br>grey1 | 5/ 5/ 5<br>0/ 0/ 5<br>gray2 |
| 5/ 5/ 5<br>0/ 0/ 5<br>grey2 | 8/ 8/ 8<br>0/ 0/ 8<br>gray3 | 8/ 8/ 8<br>0/ 0/ 8<br>grey3 | 10/ 10/ 10<br>0/ 0/ 10<br>gray4 | 10/ 10/ 10<br>0/ 0/ 10<br>grey4 | 13/ 13/ 13<br>0/ 0/ 13<br>gray5 |
| 13/ 13/ 13<br>0/ 0/ 13<br>grey5 | 15/ 15/ 15<br>0/ 0/ 15<br>gray6 | 15/ 15/ 15<br>0/ 0/ 15<br>grey6 | 18/ 18/ 18<br>0/ 0/ 18<br>gray7 | 18/ 18/ 18<br>0/ 0/ 18<br>grey7 | 20/ 20/ 20<br>0/ 0/ 20<br>gray8 |
| 20/ 20/ 20<br>0/ 0/ 20<br>grey8 | 23/ 23/ 23<br>0/ 0/ 23<br>gray9 | 23/ 23/ 23<br>0/ 0/ 23<br>grey9 | 26/ 26/ 26<br>0/ 0/ 26<br>gray10 | 26/ 26/ 26<br>0/ 0/ 26<br>grey10 | 28/ 28/ 28<br>0/ 0/ 28<br>gray11 |
| 28/ 28/ 28<br>0/ 0/ 28<br>grey11 | 31/ 31/ 31<br>0/ 0/ 31<br>gray12 | 31/ 31/ 31<br>0/ 0/ 31<br>grey12 | 33/ 33/ 33<br>0/ 0/ 33<br>gray13 | 33/ 33/ 33<br>0/ 0/ 33<br>grey13 | 36/ 36/ 36<br>0/ 0/ 36<br>gray14 |
| 36/ 36/ 36<br>0/ 0/ 36<br>grey14 | 38/ 38/ 38<br>0/ 0/ 38<br>gray15 | 38/ 38/ 38<br>0/ 0/ 38<br>grey15 | 41/ 41/ 41<br>0/ 0/ 41<br>gray16 | 41/ 41/ 41<br>0/ 0/ 41<br>grey16 | 43/ 43/ 43<br>0/ 0/ 43<br>gray17 |
| 43/ 43/ 43<br>0/ 0/ 43<br>grey17 | 46/ 46/ 46<br>0/ 0/ 46<br>gray18 | 46/ 46/ 46<br>0/ 0/ 46<br>grey18 | 48/ 48/ 48<br>0/ 0/ 48<br>gray19 | 48/ 48/ 48<br>0/ 0/ 48<br>grey19 | 51/ 51/ 51<br>0/ 0/ 51<br>gray20 |
| 51/ 51/ 51<br>0/ 0/ 51<br>grey20 | 54/ 54/ 54<br>0/ 0/ 54<br>gray21 | 54/ 54/ 54<br>0/ 0/ 54<br>grey21 | 56/ 56/ 56<br>0/ 0/ 56<br>gray22 | 56/ 56/ 56<br>0/ 0/ 56<br>grey22 | 59/ 59/ 59<br>0/ 0/ 59<br>gray23 |
| 59/ 59/ 59<br>0/ 0/ 59<br>grey23 | 61/ 61/ 61<br>0/ 0/ 61<br>gray24 | 61/ 61/ 61<br>0/ 0/ 61<br>grey24 | 64/ 64/ 64<br>0/ 0/ 64<br>gray25 | 64/ 64/ 64<br>0/ 0/ 64<br>grey25 | 66/ 66/ 66<br>0/ 0/ 66<br>gray26 |

LiquiFire User's Guide: Color Definitions

| | | | | | |
|---|---|---|---|---|---|
| 66/66/66 0/0/66 grey26 | 69/69/69 0/0/69 gray27 | 69/69/69 0/0/69 grey27 | 71/71/71 0/0/71 gray28 | 71/71/71 0/0/71 grey28 | 74/74/74 0/0/74 gray29 |
| 74/74/74 0/0/74 grey29 | 77/77/77 0/0/77 gray30 | 77/77/77 0/0/77 grey30 | 79/79/79 0/0/79 gray31 | 79/79/79 0/0/79 grey31 | 82/82/82 0/0/82 gray32 |
| 82/82/82 0/0/82 grey32 | 84/84/84 0/0/84 gray33 | 84/84/84 0/0/84 grey33 | 87/87/87 0/0/87 gray34 | 87/87/87 0/0/87 grey34 | 89/89/89 0/0/89 gray35 |
| 89/89/89 0/0/89 grey35 | 92/92/92 0/0/92 gray36 | 92/92/92 0/0/92 grey36 | 94/94/94 0/0/94 gray37 | 94/94/94 0/0/94 grey37 | 97/97/97 0/0/97 gray38 |
| 97/97/97 0/0/97 grey38 | 99/99/99 0/0/99 gray39 | 99/99/99 0/0/99 grey39 | 102/102/102 0/0/102 gray40 | 102/102/102 0/0/102 grey40 | 105/105/105 0/0/105 dim gray |
| 105/105/105 0/0/105 DimGray | 105/105/105 0/0/105 dim grey | 105/105/105 0/0/105 DimGrey | 105/105/105 0/0/105 gray41 | 105/105/105 0/0/105 grey41 | 107/107/107 0/0/107 gray42 |
| 107/107/107 0/0/107 grey42 | 110/110/110 0/0/110 gray43 | 110/110/110 0/0/110 grey43 | 112/112/112 0/0/112 gray44 | 112/112/112 0/0/112 grey44 | 115/115/115 0/0/115 gray45 |
| 115/115/115 0/0/115 grey45 | 117/117/117 0/0/117 gray46 | 117/117/117 0/0/117 grey46 | 120/120/120 0/0/120 gray47 | 120/120/120 0/0/120 grey47 | 122/122/122 0/0/122 gray48 |
| 122/122/122 0/0/122 grey48 | 125/125/125 0/0/125 gray49 | 125/125/125 0/0/125 grey49 | 127/127/127 0/0/127 gray50 | 127/127/127 0/0/127 grey50 | 130/130/130 0/0/130 gray51 |

LiquiFire User's Guide: Color Definitions

| | | | | | |
|---|---|---|---|---|---|
| 130/130/130 0/ 0/130 grey51 | 133/133/133 0/ 0/133 gray52 | 133/133/133 0/ 0/133 grey52 | 135/135/135 0/ 0/135 gray53 | 135/135/135 0/ 0/135 grey53 | 138/138/138 0/ 0/138 gray54 |
| 138/138/138 0/ 0/138 grey54 | 140/140/140 0/ 0/140 gray55 | 140/140/140 0/ 0/140 grey55 | 143/143/143 0/ 0/143 gray56 | 143/143/143 0/ 0/143 grey56 | 145/145/145 0/ 0/145 gray57 |
| 145/145/145 0/ 0/145 grey57 | 148/148/148 0/ 0/148 gray58 | 148/148/148 0/ 0/148 grey58 | 150/150/150 0/ 0/150 gray59 | 150/150/150 0/ 0/150 grey59 | 153/153/153 0/ 0/153 gray60 |
| 153/153/153 0/ 0/153 grey60 | 156/156/156 0/ 0/156 gray61 | 156/156/156 0/ 0/156 grey61 | 158/158/158 0/ 0/158 gray62 | 158/158/158 0/ 0/158 grey62 | 161/161/161 0/ 0/161 gray63 |
| 161/161/161 0/ 0/161 grey63 | 163/163/163 0/ 0/163 gray64 | 163/163/163 0/ 0/163 grey64 | 166/166/166 0/ 0/166 gray65 | 166/166/166 0/ 0/166 grey65 | 168/168/168 0/ 0/168 gray66 |
| 168/168/168 0/ 0/168 grey66 | 169/169/169 0/ 0/169 dark grey | 169/169/169 0/ 0/169 DarkGrey | 169/169/169 0/ 0/169 dark gray | 169/169/169 0/ 0/169 DarkGray | 171/171/171 0/ 0/171 gray67 |
| 171/171/171 0/ 0/171 grey67 | 173/173/173 0/ 0/173 gray68 | 173/173/173 0/ 0/173 grey68 | 176/176/176 0/ 0/176 gray69 | 176/176/176 0/ 0/176 grey69 | 179/179/179 0/ 0/179 gray70 |
| 179/179/179 0/ 0/179 grey70 | 181/181/181 0/ 0/181 gray71 | 181/181/181 0/ 0/181 grey71 | 184/184/184 0/ 0/184 gray72 | 184/184/184 0/ 0/184 grey72 | 186/186/186 0/ 0/186 gray73 |
| 186/186/186 0/ 0/186 grey73 | 189/189/189 0/ 0/189 gray74 | 189/189/189 0/ 0/189 grey74 | 190/190/190 0/ 0/190 gray | 190/190/190 0/ 0/190 grey | 191/191/191 0/ 0/191 gray75 |

LiquiFire User's Guide: Color Definitions

| | | | | | |
|---|---|---|---|---|---|
| 191/191/191 0/ 0/191 grey75 | 194/194/194 0/ 0/194 gray76 | 194/194/194 0/ 0/194 grey76 | 196/196/196 0/ 0/196 gray77 | 196/196/196 0/ 0/196 grey77 | 199/199/199 0/ 0/199 gray78 |
| 199/199/199 0/ 0/199 grey78 | 201/201/201 0/ 0/201 gray79 | 201/201/201 0/ 0/201 grey79 | 204/204/204 0/ 0/204 gray80 | 204/204/204 0/ 0/204 grey80 | 207/207/207 0/ 0/207 gray81 |
| 207/207/207 0/ 0/207 grey81 | 209/209/209 0/ 0/209 gray82 | 209/209/209 0/ 0/209 grey82 | 211/211/211 0/ 0/211 light grey | 211/211/211 0/ 0/211 LightGrey | 211/211/211 0/ 0/211 light gray |
| 211/211/211 0/ 0/211 LightGray | 212/212/212 0/ 0/212 gray83 | 212/212/212 0/ 0/212 grey83 | 214/214/214 0/ 0/214 gray84 | 214/214/214 0/ 0/214 grey84 | 217/217/217 0/ 0/217 gray85 |
| 217/217/217 0/ 0/217 grey85 | 219/219/219 0/ 0/219 gray86 | 219/219/219 0/ 0/219 grey86 | 220/220/220 0/ 0/220 gainsboro | 222/222/222 0/ 0/222 gray87 | 222/222/222 0/ 0/222 grey87 |
| 224/224/224 0/ 0/224 gray88 | 224/224/224 0/ 0/224 grey88 | 227/227/227 0/ 0/227 gray89 | 227/227/227 0/ 0/227 grey89 | 229/229/229 0/ 0/229 gray90 | 229/229/229 0/ 0/229 grey90 |
| 232/232/232 0/ 0/232 gray91 | 232/232/232 0/ 0/232 grey91 | 235/235/235 0/ 0/235 gray92 | 235/235/235 0/ 0/235 grey92 | 237/237/237 0/ 0/237 gray93 | 237/237/237 0/ 0/237 grey93 |
| 240/240/240 0/ 0/240 gray94 | 240/240/240 0/ 0/240 grey94 | 242/242/242 0/ 0/242 gray95 | 242/242/242 0/ 0/242 grey95 | 245/245/245 0/ 0/245 white smoke | 245/245/245 0/ 0/245 WhiteSmoke |
| 245/245/245 0/ 0/245 gray96 | 245/245/245 0/ 0/245 grey96 | 247/247/247 0/ 0/247 gray97 | 247/247/247 0/ 0/247 grey97 | 250/250/250 0/ 0/250 gray98 | 250/250/250 0/ 0/250 grey98 |

LiquiFire User's Guide: Color Definitions

| RGB | Name |
|---|---|
| 252/252/252 0/ 0/252 | gray99 |
| 252/252/252 0/ 0/252 | grey99 |
| 255/255/255 0/ 0/255 | white |
| 255/255/255 0/ 0/255 | gray100 |
| 255/255/255 0/ 0/255 | grey100 |
| 139/137/137 0/ 3/137 | snow4 |
| 205/201/201 0/ 4/201 | snow3 |
| 255/250/250 0/ 5/250 | snow |
| 255/250/250 0/ 5/250 | snow1 |
| 238/233/233 0/ 5/233 | snow2 |
| 188/143/143 0/ 61/143 | rosy brown |
| 188/143/143 0/ 61/143 | RosyBrown |
| 255/193/193 0/ 62/193 | RosyBrown1 |
| 238/180/180 0/ 62/180 | RosyBrown2 |
| 205/155/155 0/ 62/155 | RosyBrown3 |
| 139/105/105 0/ 62/105 | RosyBrown4 |
| 240/128/128 0/119/128 | light coral |
| 240/128/128 0/119/128 | LightCoral |
| 205/ 92/ 92 0/140/ 92 | indian red |
| 205/ 92/ 92 0/140/ 92 | IndianRed |
| 139/ 58/ 58 0/148/ 58 | IndianRed4 |
| 238/ 99/ 99 0/148/ 99 | IndianRed2 |
| 255/106/106 0/149/106 | IndianRed1 |
| 205/ 85/ 85 0/149/ 85 | IndianRed3 |
| 165/ 42/ 42 0/190/ 42 | brown |
| 139/ 35/ 35 0/190/ 35 | brown4 |
| 255/ 64/ 64 0/191/ 64 | brown1 |
| 205/ 51/ 51 0/191/ 51 | brown3 |
| 238/ 59/ 59 0/191/ 59 | brown2 |
| 178/ 34/ 34 0/206/ 34 | firebrick |
| 255/ 48/ 48 0/207/ 48 | firebrick1 |
| 139/ 26/ 26 0/207/ 26 | firebrick4 |
| 205/ 38/ 38 0/207/ 38 | firebrick3 |
| 238/ 44/ 44 0/207/ 44 | firebrick2 |
| 255/ 0/ 0 0/255/ 0 | red |
| 255/ 0/ 0 0/255/ 0 | red1 |
| 238/ 0/ 0 0/255/ 0 | red2 |
| 205/ 0/ 0 0/255/ 0 | red3 |
| 139/ 0/ 0 0/255/ 0 | red4 |
| 139/ 0/ 0 0/255/ 0 | dark red |
| 139/ 0/ 0 0/255/ 0 | DarkRed |
| 205/183/181 5/ 29/181 | MistyRose3 |
| 255/228/225 6/ 30/225 | misty rose |
| 255/228/225 6/ 30/225 | MistyRose |
| 255/228/225 6/ 30/225 | MistyRose1 |
| 250/128/114 6/138/114 | salmon |
| 238/213/210 6/ 30/210 | MistyRose2 |
| 139/125/123 8/ 29/123 | MistyRose4 |
| 205/ 79/ 57 9/184/ 57 | tomato3 |
| 238/ 92/ 66 9/184/ 66 | tomato2 |
| 255/ 99/ 71 9/184/ 71 | tomato |
| 255/ 99/ 71 9/184/ 71 | tomato1 |
| 139/ 54/ 38 10/185/ 38 | tomato4 |
| 205/ 91/ 69 10/169/ 69 | coral3 |

LiquiFire User's Guide: Color Definitions

| | | | | | |
|---|---|---|---|---|---|
|  |  |  |  |  |  |
| 139/ 62/ 47<br>10/168/ 47<br>coral4 | 238/106/ 80<br>10/169/ 80<br>coral2 | 255/114/ 86<br>10/169/ 86<br>coral1 | 238/130/ 98<br>14/150/ 98<br>salmon2 | 205/112/ 84<br>14/150/ 84<br>salmon3 | 139/ 76/ 57<br>14/150/ 57<br>salmon4 |
|  |  |  |  |  |  |
| 255/140/105<br>14/150/105<br>salmon1 | 233/150/122<br>15/121/122<br>dark salmon | 233/150/122<br>15/121/122<br>DarkSalmon | 139/ 37/ 0<br>16/255/ 0<br>OrangeRed4 | 205/ 55/ 0<br>16/255/ 0<br>OrangeRed3 | 255/127/ 80<br>16/175/ 80<br>coral |
|  |  |  |  |  |  |
| 238/ 64/ 0<br>16/255/ 0<br>OrangeRed2 | 255/ 69/ 0<br>16/255/ 0<br>orange red | 255/ 69/ 0<br>16/255/ 0<br>OrangeRed | 255/ 69/ 0<br>16/255/ 0<br>OrangeRed1 | 238/149/114<br>17/132/114<br>LightSalmon2 | 255/160/122<br>17/133/122<br>light salmon |
|  |  |  |  |  |  |
| 255/160/122<br>17/133/122<br>LightSalmon | 255/160/122<br>17/133/122<br>LightSalmon1 | 139/ 87/ 66<br>17/133/ 66<br>LightSalmon4 | 205/129/ 98<br>17/133/ 98<br>LightSalmon3 | 205/104/ 57<br>19/184/ 57<br>sienna3 | 238/121/ 66<br>19/184/ 66<br>sienna2 |
|  |  |  |  |  |  |
| 255/130/ 71<br>19/184/ 71<br>sienna1 | 160/ 82/ 45<br>19/183/ 45<br>sienna | 139/ 71/ 38<br>20/185/ 38<br>sienna4 | 255/245/238<br>25/ 17/238<br>seashell | 255/245/238<br>25/ 17/238<br>seashell1 | 238/118/ 33<br>25/219/ 33<br>chocolate2 |
|  |  |  |  |  |  |
| 205/102/ 29<br>25/218/ 29<br>chocolate3 | 255/127/ 36<br>25/219/ 36<br>chocolate1 | 210/105/ 30<br>25/218/ 30<br>chocolate | 139/ 69/ 19<br>25/220/ 19<br>saddle brown | 139/ 69/ 19<br>25/220/ 19<br>SaddleBrown | 139/ 69/ 19<br>25/220/ 19<br>chocolate4 |
|  |  |  |  |  |  |
| 205/197/191<br>26/ 17/191<br>seashell3 | 238/229/222<br>26/ 17/222<br>seashell2 | 139/134/130<br>27/ 16/130<br>seashell4 | 244/164/ 96<br>28/154/ 96<br>sandy brown | 244/164/ 96<br>28/154/ 96<br>SandyBrown | 238/203/173<br>28/ 69/173<br>PeachPuff2 |
|  |  |  |  |  |  |
| 205/175/149<br>28/ 69/149<br>PeachPuff3 | 255/218/185<br>28/ 70/185<br>peach puff | 255/218/185<br>28/ 70/185<br>PeachPuff | 255/218/185<br>28/ 70/185<br>PeachPuff1 | 139/119/101<br>28/ 69/101<br>PeachPuff4 | 255/165/ 79<br>29/176/ 79<br>tan1 |
| 139/ 90/ 43<br>29/176/ 43<br>tan4 | 238/154/ 73<br>29/176/ 73<br>tan2 | 205/133/ 63<br>30/176/ 63<br>peru | 205/133/ 63<br>30/176/ 63<br>tan3 | 238/118/ 0<br>30/255/ 0<br>DarkOrange2 | 139/ 69/ 0<br>30/255/ 0<br>DarkOrange4 |

LiquiFire User's Guide: Color Definitions

| | | | | | |
|---|---|---|---|---|---|
|  |  |  |  |  | 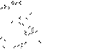 |
| 205/102/ 0<br>30/255/ 0<br>DarkOrange3 | 255/127/ 0<br>30/255/ 0<br>DarkOrange1 | 250/240/230<br>30/ 20/230<br>linen | 205/183/158<br>32/ 58/158<br>bisque3 | 255/228/196<br>33/ 59/196<br>bisque | 255/228/196<br>33/ 59/196<br>bisque1 |
|  | 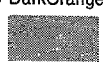 |  |  |  |  |
| 238/213/183<br>33/ 58/183<br>bisque2 | 255/140/ 0<br>33/255/ 0<br>dark orange | 255/140/ 0<br>33/255/ 0<br>DarkOrange | 205/192/176<br>33/ 36/176<br>AntiqueWhite3 | 255/239/219<br>33/ 36/219<br>AntiqueWhite1 | 139/115/ 85<br>33/ 99/ 85<br>burlywood4 |
|  | 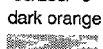 | 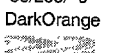 | 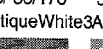 | 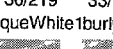 | 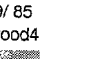 |
| 238/223/204<br>34/ 36/204<br>AntiqueWhite2 | 238/197/145<br>34/ 99/145<br>burlywood2 | 255/211/155<br>34/100/155<br>burlywood1 | 139/125/107<br>34/ 58/107<br>bisque4 | 205/170/125<br>34/ 99/125<br>burlywood3 | 222/184/135<br>34/ 99/135<br>burlywood |
|  | 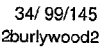 | 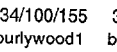 | 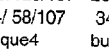 | 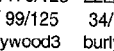 | 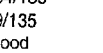 |
| 250/235/215<br>34/ 35/215<br>antique white | 250/235/215<br>34/ 35/215<br>AntiqueWhite | 210/180/140<br>34/ 85/140<br>tan | 139/131/120<br>35/ 34/120<br>AntiqueWhite4 | 238/207/161<br>36/ 82/161<br>NavajoWhite2 | 255/222/173<br>36/ 82/173<br>navajo white |
|  | 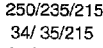 | 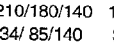 | 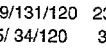 | 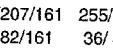 | 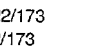 |
| 255/222/173<br>36/ 82/173<br>NavajoWhite | 255/222/173<br>36/ 82/173<br>NavajoWhite1 | 255/235/205<br>36/ 50/205<br>blanched almond | 255/235/205<br>36/ 50/205<br>BlanchedAlmond | 139/121/ 94<br>36/ 82/ 94<br>NavajoWhite4 | 205/179/139<br>36/ 82/139<br>NavajoWhite3 |
|  | 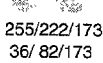 | 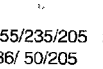 | 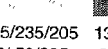 | 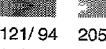 |  |
| 255/239/213<br>37/ 42/213<br>papaya whip | 255/239/213<br>37/ 42/213<br>PapayaWhip | 255/228/181<br>38/ 74/181<br>moccasin | 255/165/ 0<br>39/255/ 0<br>orange | 255/165/ 0<br>39/255/ 0<br>orange1 | 238/154/ 0<br>39/255/ 0<br>orange2 |
|  | 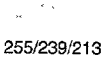 |  |  |  |  |
| 139/ 90/ 0<br>39/255/ 0<br>orange4 | 139/126/102<br>39/ 67/102<br>wheat4 | 205/133/ 0<br>39/255/ 0<br>orange3 | 245/222/179<br>39/ 68/179<br>wheat | 253/245/230<br>39/ 23/230<br>old lace | 253/245/230<br>39/ 23/230<br>OldLace |
|  |  |  |  |  |  |
| 255/231/186<br>39/ 69/186<br>wheat1 | 205/186/150<br>39/ 68/150<br>wheat3 | 238/216/174<br>39/ 68/174<br>wheat2 | 255/250/240<br>40/ 15/240<br>floral white | 255/250/240<br>40/ 15/240<br>FloralWhite | 255/185/ 15<br>43/240/ 15<br>DarkGoldenrod1 |
|  |  |  |  |  |  |
| 238/173/ 14<br>43/240/ 14<br>DarkGoldenrod2 | 205/149/ 12<br>43/240/ 12<br>DarkGoldenrod3 | 139/101/ 8<br>43/240/ 8<br>DarkGoldenrod | 184/134/ 11<br>43/239/ 11<br>dark goldenrod | 184/134/ 11<br>43/239/ 11<br>DarkGoldenrod | 139/105/ 20<br>43/218/ 20<br>goldenrod4 |

LiquiFire User's Guide: Color Definitions

| | | | | | |
|---|---|---|---|---|---|
| 218/165/ 32 43/217/ 32 goldenrod | 255/193/ 37 43/218/ 37 goldenrod1 | 238/180/ 34 43/218/ 34 goldenrod2 | 205/155/ 29 43/218/ 29 goldenrod3 | 255/248/220 48/ 35/220 cornsilk | 255/248/220 48/ 35/220 cornsilk1 |
| 238/232/205 49/ 35/205 cornsilk2 | 205/200/177 49/ 34/177 cornsilk3 | 238/220/130 50/115/130 LightGoldenrod | 255/236/139 50/116/139 LightGoldenrod2 | 205/190/112 50/115/112 LightGoldenrod3 | 139/129/ 76 50/115/ 76 LightGoldenrod4 |
| 139/117/ 0 51/255/ 0 gold4 | 139/136/120 51/ 34/120 cornsilk4 | 238/221/130 51/115/130 light goldenrod | 238/221/130 51/115/130 LightGoldenrod | 255/215/ 0 51/255/ 0 gold | 255/215/ 0 51/255/ 0 gold1 |
| 205/173/ 0 51/255/ 0 gold3 | 238/201/ 0 51/255/ 0 gold2 | 238/233/191 54/ 50/191 LemonChiffon2 | 205/201/165 54/ 49/165 LemonChiffon3 | 255/250/205 54/ 50/205 lemon chiffon | 255/250/205 54/ 50/205 LemonChiffon |
| 255/250/205 54/ 50/205 LemonChiffon1 | 240/230/140 54/106/140 khaki | 238/232/170 55/ 72/170 pale goldenrod | 238/232/170 55/ 72/170 PaleGoldenrod | 139/134/ 78 55/111/ 78 khaki4 | 255/246/143 55/112/143 khaki1 |
| 205/198/115 55/111/115 khaki3 | 238/230/133 55/112/133 khaki2 | 139/137/112 56/ 49/112 LemonChiffon4 | 189/183/107 56/110/107 dark khaki | 189/183/107 56/110/107 DarkKhaki | 139/139/131 60/ 14/131 ivory4 |
| 205/205/193 60/ 14/193 ivory3 | 238/238/224 60/ 15/224 ivory2 | 255/255/240 60/ 15/240 ivory | 255/255/240 60/ 15/240 ivory1 | 245/245/220 60/ 26/220 beige | 255/255/224 60/ 31/224 light yellow |
| 255/255/224 60/ 31/224 LightYellow | 255/255/224 60/ 31/224 LightYellow1 | 238/238/209 60/ 31/209 LightYellow2 | 205/205/180 60/ 31/180 LightYellow3 | 139/139/122 60/ 31/122 LightYellow4 | 250/250/210 60/ 40/210 light goldenrod yellow |
| 250/250/210 60/ 40/210 LightGoldenrodYellow | 255/255/ 0 60/255/ 0 yellow | 255/255/ 0 60/255/ 0 yellow1 | 238/238/ 0 60/255/ 0 yellow2 | 205/205/ 0 60/255/ 0 yellow3 | 139/139/ 0 60/255/ 0 yellow4 |

LiquiFire User's Guide: Color Definitions

| | | | | | |
|---|---|---|---|---|---|
| 105/139/ 34<br>79/192/ 34<br>OliveDrab4 | 192/255/ 62<br>80/193/ 62<br>OliveDrab1 | 107/142/ 35<br>80/192/ 35<br>olive drab | 107/142/ 35<br>80/192/ 35<br>OliveDrab | 179/238/ 58<br>80/192/ 58<br>OliveDrab2 | 154/205/ 50<br>80/192/ 50<br>yellow green |
| 154/205/ 50<br>80/192/ 50<br>YellowGreen | 154/205/ 50<br>80/192/ 50<br>OliveDrab3 | 85/107/ 47<br>82/142/ 47<br>dark olive green | 85/107/ 47<br>82/142/ 47<br>DarkOliveGreen | 202/255/112<br>82/143/112<br>DarkOliveGreen | 110/139/ 61<br>82/143/ 61<br>DarkOliveGreen4 |
| 188/238/104<br>82/143/104<br>DarkOliveGreen | 162/205/ 90<br>82/143/ 90<br>DarkOliveGreen | 173/255/ 47<br>84/208/ 47<br>green yellow | 173/255/ 47<br>84/208/ 47<br>GreenYellow | 127/255/ 0<br>90/255/ 0<br>chartreuse | 127/255/ 0<br>90/255/ 0<br>chartreuse1 |
| 102/205/ 0<br>90/255/ 0<br>chartreuse3 | 69/139/ 0<br>90/255/ 0<br>chartreuse4 | 118/238/ 0<br>90/255/ 0<br>chartreuse2 | 124/252/ 0<br>90/255/ 0<br>lawn green | 124/252/ 0<br>90/255/ 0<br>LawnGreen | 131/139/131<br>120/ 14/131<br>honeydew4 |
| 193/205/193<br>120/ 14/193<br>honeydew3 | 224/238/224<br>120/ 15/224<br>honeydew2 | 240/255/240<br>120/ 15/240<br>honeydew | 240/255/240<br>120/ 15/240<br>honeydew1 | 143/188/143<br>120/ 61/143<br>dark sea green | 143/188/143<br>120/ 61/143<br>DarkSeaGreen |
| 193/255/193<br>120/ 62/193<br>DarkSeaGreen | 180/238/180<br>120/ 62/180<br>DarkSeaGreen | 155/205/155<br>120/ 62/155<br>DarkSeaGreen | 105/139/105<br>120/ 62/105<br>DarkSeaGreen | 152/251/152<br>120/100/152<br>pale green | 152/251/152<br>120/100/152<br>PaleGreen |
| 144/238/144<br>120/100/144<br>PaleGreen2 | 144/238/144<br>120/100/144<br>light green | 144/238/144<br>120/100/144<br>LightGreen | 124/205/124<br>120/100/124<br>PaleGreen3 | 84/139/ 84<br>120/100/ 84<br>PaleGreen4 | 154/255/154<br>120/101/154<br>PaleGreen1 |
| 34/139/ 34<br>120/192/ 34<br>forest green | 34/139/ 34<br>120/192/ 34<br>ForestGreen | 50/205/ 50<br>120/192/ 50<br>lime green | 50/205/ 50<br>120/192/ 50<br>LimeGreen | 0/100/ 0<br>120/255/ 0<br>dark green | 0/100/ 0<br>120/255/ 0<br>DarkGreen |
| 0/255/ 0<br>120/255/ 0<br>green | 0/255/ 0<br>120/255/ 0<br>green1 | 0/238/ 0<br>120/255/ 0<br>green2 | 0/205/ 0<br>120/255/ 0<br>green3 | 0/139/ 0<br>120/255/ 0<br>green4 | 78/238/148<br>146/171/148<br>SeaGreen2 |

LiquiFire User's Guide: Color Definitions

| | | | | | |
|---|---|---|---|---|---|
| 84/255/159 | 46/139/87 | 46/139/87 | 46/139/87 | 67/205/128 | 60/179/113 |
| 146/171/159 | 146/170/87 | 146/170/87 | 146/170/87 | 147/171/128 | 147/169/113 |
| SeaGreen1 | sea green | SeaGreen | SeaGreen4 | SeaGreen3 | medium sea green |
| 60/179/113 | 0/238/118 | 0/139/69 | 0/205/102 | 0/255/127 | 0/255/127 |
| 147/169/113 | 150/255/118 | 150/255/69 | 150/255/102 | 150/255/127 | 150/255/127 |
| MediumSeaGreen | SpringGreen2 | SpringGreen4 | SpringGreen3 | spring green | SpringGreen |
| 0/255/127 | 245/255/250 | 245/255/250 | 0/250/154 | 0/250/154 | 102/205/170 |
| 150/255/127 | 150/10/250 | 150/10/250 | 157/255/154 | 157/255/154 | 160/128/170 |
| SpringGreen1 | mint cream | MintCream | medium springgreen | MediumSpringGreen | medium aquamarine |
| 102/205/170 | 102/205/170 | 127/255/212 | 127/255/212 | 118/238/198 | 69/139/116 |
| 160/128/170 | 160/128/170 | 160/128/212 | 160/128/212 | 160/128/198 | 160/128/116 |
| MediumAquamarine | aquamarine3 | aquamarine | aquamarine1 | aquamarine2 | aquamarine4 |
| 64/224/208 | 32/178/170 | 32/178/170 | 72/209/204 | 72/209/204 | 131/139/139 |
| 174/182/208 | 177/209/170 | 177/209/170 | 178/167/204 | 178/167/204 | 180/14/139 |
| turquoise | light sea green | LightSeaGreen | medium turquoise | MediumTurquoise | azure4 |
| 193/205/205 | 224/238/238 | 240/255/255 | 240/255/255 | 224/255/255 | 224/255/255 |
| 180/14/205 | 180/15/238 | 180/15/255 | 180/15/255 | 180/31/255 | 180/31/255 |
| azure3 | azure2 | azure | azure1 | light cyan | LightCyan |
| 224/255/255 | 209/238/238 | 180/205/205 | 122/139/139 | 175/238/238 | 175/238/238 |
| 180/31/255 | 180/31/238 | 180/31/205 | 180/31/139 | 180/67/238 | 180/67/238 |
| LightCyan1 | LightCyan2 | LightCyan3 | LightCyan4 | pale turquoise | PaleTurquoise |
| 102/139/139 | 187/255/255 | 150/205/205 | 174/238/238 | 47/79/79 | 47/79/79 |
| 180/67/139 | 180/68/255 | 180/68/205 | 180/68/238 | 180/103/79 | 180/103/79 |
| PaleTurquoise | PaleTurquoise | PaleTurquoise | PaleTurquoise | dark slate gray | DarkSlateGray |
| 47/79/79 | 47/79/79 | 141/238/238 | 151/255/255 | 121/205/205 | 82/139/139 |
| 180/103/79 | 180/103/79 | 180/103/238 | 180/104/255 | 180/104/205 | 180/104/139 |
| dark slate grey | DarkSlateGrey | DarkSlateGray1 | DarkSlateGray2 | DarkSlateGray3 | DarkSlateGray4 |

LiquiFire User's Guide: Color Definitions
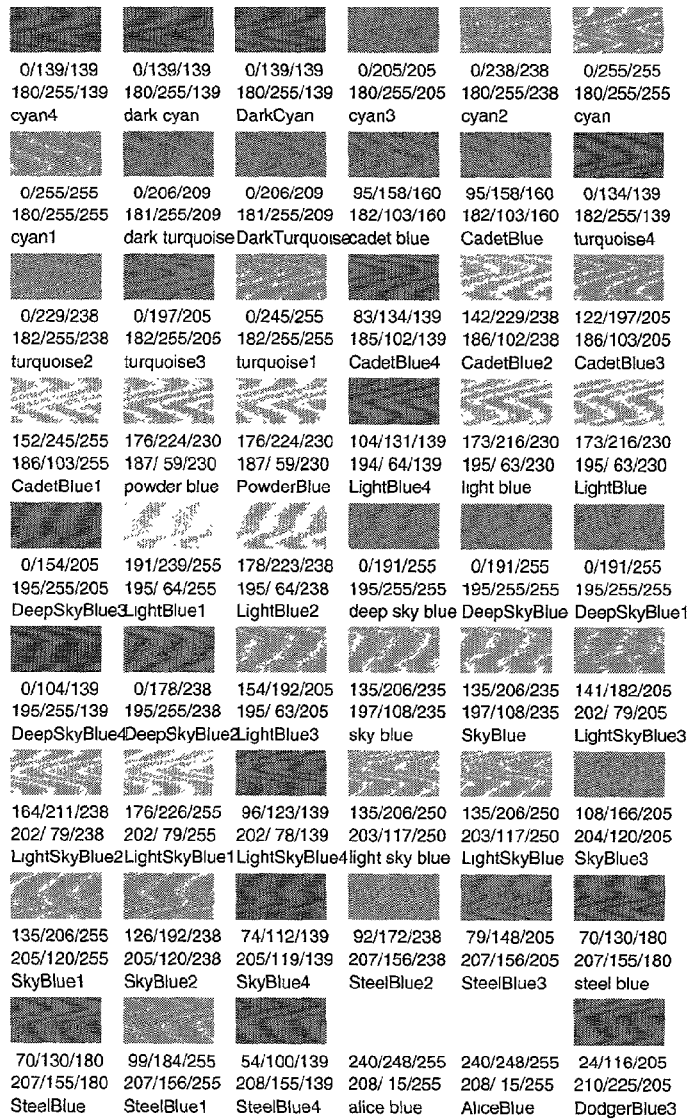

LiquiFire User's Guide: Color Definitions
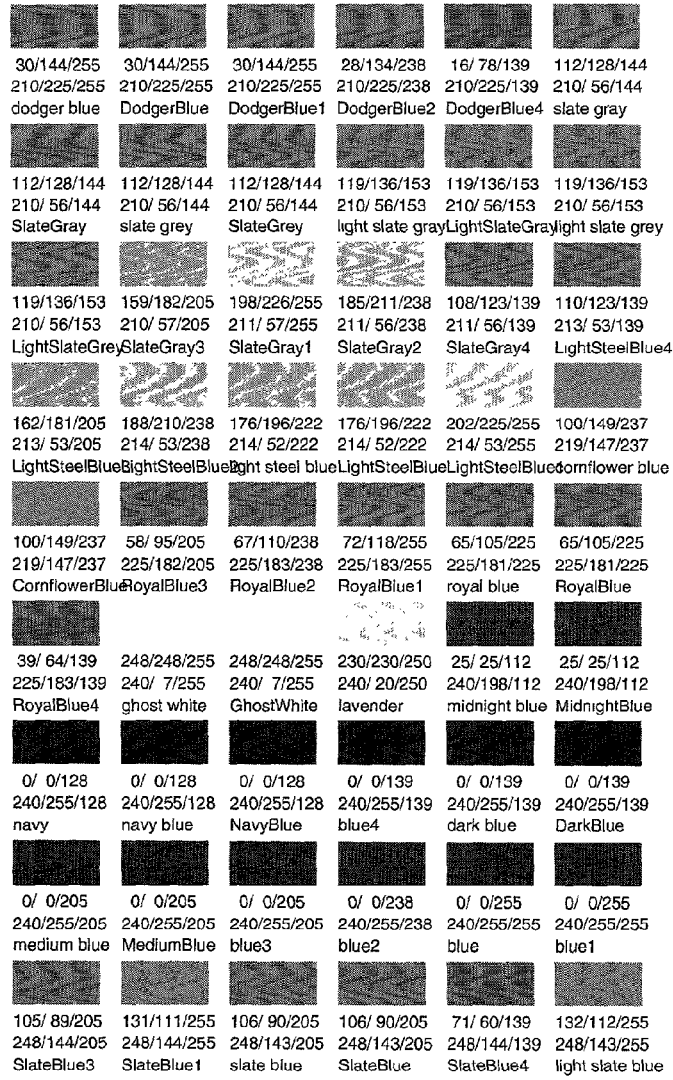

LiquiFire User's Guide: Color Definitions

| | | | | | |
|---|---|---|---|---|---|
| 132/112/255<br>248/143/255<br>LightSlateBlue | 122/103/238<br>248/144/238<br>SlateBlue2 | 72/ 61/139<br>248/143/139<br>dark slate blue | 72/ 61/139<br>248/143/139<br>DarkSlateBlue | 123/104/238<br>249/143/238<br>medium slate blue | 123/104/238<br>249/143/238<br>MediumSlateBlue |
| 93/ 71/139<br>259/124/139<br>MediumPurple4 | 159/121/238<br>259/125/238<br>MediumPurple3 | 137/104/205<br>260/125/205<br>MediumPurple2 | 147/112/219<br>260/124/219<br>medium purple | 147/112/219<br>260/124/219<br>MediumPurple | 171/130/255<br>260/125/255<br>MediumPurple1 |
| 155/ 48/255<br>271/207/255<br>purple1 | 138/ 43/226<br>271/206/226<br>blue violet | 138/ 43/226<br>271/206/226<br>BlueViolet | 145/ 44/238<br>271/207/238<br>purple2 | 125/ 38/205<br>271/207/205<br>purple3 | 85/ 26/139<br>271/207/139<br>purple4 |
| 160/ 32/240<br>277/221/240<br>purple | 104/ 34/139<br>280/192/139<br>DarkOrchid4 | 178/ 58/238<br>280/192/238<br>DarkOrchid2 | 191/ 62/255<br>280/193/255<br>DarkOrchid1 | 153/ 50/204<br>280/192/204<br>dark orchid | 153/ 50/204<br>280/192/204<br>DarkOrchid |
| 154/ 50/205<br>280/192/205<br>DarkOrchid3 | 148/ 0/211<br>282/255/211<br>dark violet | 148/ 0/211<br>282/255/211<br>DarkViolet | 180/ 82/205<br>288/153/205<br>MediumOrchid4 | 209/ 95/238<br>288/153/238<br>MediumOrchid2 | 224/102/255<br>288/153/255<br>MediumOrchid1 |
| 122/ 55/139<br>288/154/139<br>MediumOrchid3 | 186/ 85/211<br>288/152/211<br>medium orchid | 186/ 85/211<br>288/152/211<br>MediumOrchid | 139/123/139<br>300/ 29/139<br>thistle4 | 216/191/216<br>300/ 29/216<br>thistle | 205/181/205<br>300/ 29/205<br>thistle3 |
| 238/210/238<br>300/ 30/238<br>thistle2 | 255/225/255<br>300/ 30/255<br>thistle1 | 139/102/139<br>300/ 67/139<br>plum4 | 255/187/255<br>300/ 68/255<br>plum1 | 205/150/205<br>300/ 68/205<br>plum3 | 238/174/238<br>300/ 68/238<br>plum2 |
| 221/160/221<br>300/ 70/221<br>plum | 238/130/238<br>300/115/238<br>violet | 139/ 0/139<br>300/255/139<br>magenta4 | 139/ 0/139<br>300/255/139<br>dark magenta | 139/ 0/139<br>300/255/139<br>DarkMagenta | 205/ 0/205<br>300/255/205<br>magenta3 |
| 238/ 0/238<br>300/255/238<br>magenta2 | 255/ 0/255<br>300/255/255<br>magenta | 255/ 0/255<br>300/255/255<br>magenta1 | 139/ 71/137<br>302/124/137<br>orchid4 | 218/112/214<br>302/123/214<br>orchid | 205/105/201<br>302/124/201<br>orchid3 |

APPENDIX B   HTTP Syntax Definition

LiquiFire Syntax

```
lfescoctet    = "\" DIGIT DIGIT DIGIT
lfunicode     = "U" DIGIT DIGIT DIGIT DIGIT
lfescape      = lfescoctet | lfunicode | escape
lfname        = *( ALPHA | DIGIT )
lfsafe        = ALPHA | DIGIT | safe | lfescape lfrequest     = *( lfcommand )
lfcommand     = lfname ["=" lfargs ]

lfargs        = *( lfargkey "[" lfargvalue "]" "," )
lfargkey      = *( ALPHA | DIGIT )
lfexpression  = "(" *( lfsafe | ":" | "*" | "'" ) ")"
lfargvalue    = lfsafe | lfexpression
```

Basic URI Syntax.

For definitive information on URL syntax and semantics, see RFC 1738 and RFC 1808

```
URI           = ( absoluteURI | relativeURI ) [ "#" fragment ]

absoluteURI   = scheme ":" *( uchar | reserved )
relativeURI   = net_path | abs_path | rel_path net_path      = "//" net_loc [ abs_path ]
abs_path      = "/" rel_path
rel_path      = [ path ] [ ";" params ] [ "?" query ]

path          = fsegment *( "/" segment )
fsegment      = 1*pchar
segment       = *pchar params        = param *( ";" param )
param         = *( pchar | "/" )
scheme        = 1*( ALPHA | DIGIT | "+" | "-" | "." )
net_loc       = *( pchar | ";" | "?" )
```

LiquiFire User's Guide: HTTP Syntax Definition

```
query        = *( uchar | reserved )
fragment     = *( uchar | reserved )

pchar        = uchar | ":" | "@" | "&" | "=" | "+"
uchar        = unreserved | escape
unreserved   = ALPHA | DIGIT | safe | extra | national escape       = "%" HEX HEX
reserved     = ";" | "/" | "?" | ":" | "@" | "&" | "=" | "+"
extra        = "!" | "*" | "'" | "(" | ")" | ","
safe         = "$" | "-" | "_" | "."
unsafe       = CTL | SP | <"> | "#" | "%" | "<" | ">"
national     = "{" | "}" | "|" | "\" | "^" | "~" | "[" | "]" | "`"

lowalpha     = "a" .. "z"
hialpha      = "A" .. "Z"
ALPHA        = lowalpha | hialpha
DIGIT        = "0" .. "9"
```

APPENDIX C *Filter Control Values*

| Filter Type | Level | Alpha | Beta |
|---|---|---|---|
| Sketch | Degree of effect | | |
| Emboss | Degree of effect | | |
| Denoise | Degree of effect | | |
| Implode | Degree of effect | | |
| Solarize | Degree of effect | | |
| Paint | Size of brush | | |
| Swirl | Angle of swirling | | |
| Shade | Elevation of light | Angle of light | |
| Wave | Amplitude | Wavelength | |
| Noise | | | |
| Despeckle | | | |
| Enhance | | | |
| Equalize | | | |
| Invert | | | |
| Normalize | | | |
| Spread | | | |

LiquiFire User's Guide: Filter Control Values

APPENDIX D — Image Metadata Fields

LiquiFire

The following metadata fields are avaliable for all images:

| LiquiFire Name | Field Description |
|---|---|
| colors | Number of colors in the image |
| colorspace | Colorspace of the image; one of: RGB, Gray, Transparent, XYZ, YCbCr, YCC, YIQ, YPbPr, YUV, CMYK, sRGB |
| comment | Textual comment for the image |
| compress | Compression type; one of: None, BZip, Fax, Group4, JPEG, LosslessJPEG, LZW, Runlength, Zip |
| delay | Inter-frame delay |
| density | pixel density |
| depth | bits per pixel |
| dispose | GIF disposal mode |
| gamma | Image gamma compensation value, if assigned |
| height | Height of the image, in pixels |
| interlace | Image pixel organization; one of: Undefined, None, Line, Plane, Partition |
| loop | GIF/MNG looping repetitions |
| matte | True if the image contains an alpha channel |
| monochrome | True if the image is bi-level |
| quality | For compression technologies, indicates the 'quality' or 'lossiness' of the compression |
| rendering_intent | Color management profile rendering intent; one of: Saturation, Perceptual, Absolute, Relative |
| subimage | Number of frames in the image |
| type | Image data type; one of: Bilevel, Grayscale, Palette, PaletteMatte, TrueColor, TrueColorMatte, ColorSeparation |

LiquiFire User's Guide: Image Metadata Fields

| LiquiFire Name | Field Description |
|---|---|
| units | Measurement units for density and resolution; one of: pixels/inch, pixels/mm |
| width | Width of the image, in pixels |
| x-resolution | Horizontal pixel density |
| y-resolution | Horizontal pixel density |

LiquiFire User's Guide: Image Metadata

IPTC Metadata

This standard, developed by a consortium of world-wide providers including Reuters and the Associated Press was designed to identify images, digital-audio, and digital-video, as well as to identify the transport over which these media travel. Divided into two parts covering the transport and content, respectively, IPTC metadata has become the de-facto standard for image metadata due to the support of widely available imaging packages such as Adobe™ PhotoShop™.

LiquiFire supports and maintains any elements within Part 2 that are present in the original image.

| IPTC Name | IPTC ID | LiquiFire Name | Field Description |
|---|---|---|---|
| action advised | 2:42 | actionadvised | Action code, defined by image provider<br>2 digits |
| by-line | 2:80 | byline | Photographer's Name<br>32 characters |
| by-line title | 2:85 | bylinetitle | Photographer's title. For example, House photographer or correspondent etc<br>32 characters |
| caption/abstract | 2:120 | caption | Full text of caption<br>2000 characters |
| category | 2:15 | category | The subject of the image<br>3 letter code |
| city | 2:90 | city | City of image origin<br>32 characters |
| contact | 2:118 | contact | Contact for further image information<br>128 characters |
| content location code | 2:26 | contentlocationcode | Country in which the captured event took place<br>3 letter code |
| content location name | 2:27 | contentlocationname | Country in which the captured event took place; full name<br>64 characters |
| copyright notice | 2:116 | copyright | The image provider's copyright notice<br>128 characters |
| country/primary location code | 2:100 | primarylocationcode | Country in which the image was captured<br>3 letter code |
| country/primary location name | 2:101 | primarylocationname | Country in which the image was captured; full name<br>64 characters |

LiquiFire User's Guide: Image Metadata Fields

| IPTC Name | IPTC ID | LiquiFire Name | Field Description |
|---|---|---|---|
| credit | 2:110 | credit | Identity of the provider. Possibly an organization representing the capturer 32 characters |
| date created | 2:55 | datecreated | Date of event (not necessarily digitization time) |
| digital creation date | 2:62 | digitalcreationdate | Date digital conversion took place |
| digital creation time | 2:63 | digitalcreationtime | Time digital conversion took place |
| edit status | 2:07 | editstatus | Status of the object data 64 characters |
| editorial update | 2:08 | editorialupdate | Indicates edits made to other fields fieldID |
| expiration date | 2:37 | expirationdate | The latest valid date at which this image may be used |
| expiration time | 2:38 | expirationtime | The latest valid time at which this image may be used |
| fixture identifier | 2:22 | fixtureidentifier | |
| headline | 2:105 | headline | Synopsis of the subject matter 256 characters |
| image orientation | 2:131 | imageorientation | Portrait: P, Landscape: L, Square: S Single character code |
| image type | 2:130 | imagetype | Code representing image data composition |
| object cycle | 2:75 | objectcycle | For images with cyclic use, indicates Morning, Evening, or Both 1 character |
| object name | 2:05 | objectname | Image title 64 characters |
| original transmission reference | 2:103 | originaltransmissionreference | Provider's code indicating image transmission origin 32 characters |
| originating program | 2:65 | originatingprogram | Name of digitization program 64 characters |
| program version | 2:70 | programversion | Version of digitization program 10 characters |

LiquiFire User's Guide: Image Metadata

| IPTC Name | IPTC ID | LiquiFire Name | Field Description |
|---|---|---|---|
| province/state | 2:95 | province | Province or State of image origin<br>32 characters |
| reference date | 2:47 | referencedate | Provider origin date |
| reference number | 2:50 | referencenumber | Provider origin numeric code<br>8 characters |
| reference service | 2:45 | referenceservice | Provider origin service name<br>10 characters |
| release date | 2:30 | releasedate | Earliest permissible image utilization date |
| release time | 2:35 | releasetime | Earliest permissible image utilization time |
| source | 2:115 | source | Original image owner or creator<br>32 characters |
| special instructions | 2:40 | specialinstructions | Special handling instructions<br>255 characters |
| sub-location | 2:92 | sublocation | Identification of sub-location<br>32 characters |
| subject reference | 2:12 | subjectreference | Colon (:) separated list of Subject Reference Number, Subject Name, Subject Matter, Subject Detail Name<br>236 characters |
| time created | 2:60 | timecreated | Time of event<br>(not necessarily digitization time) |
| urgency | 2:10 | urgency | Urgency, from 1 (most) through 8 (least)<br>1 digit |
| writer/editor | 2:122 | writereditor | Name of metadata author<br>32 characters |

LiquiFire User's Guide: Image Metadata Fields

EXIF Metadata

Exif data is captured from images originating in any of the following formats: BMP, GIF, JPEG (JFIF/EXIF), PNG, SVG, XBM, XPM.

| LiquiFire Name | Field Description |
|---|---|
| FNumber | Reciprocal of the aperature of the lens at time of capture |
| BitsPerSample | Number of bits per pixel sample |
| CompressedBitsPerPixel | Compression model used for the image, expressed in bite per pixel sample |
| ExposureTime | Time at which the image was captured |
| FocalLength | Focal length of the lens, in millimeters, at time of capture |
| SubjectDistance | Fistance, in meters, to the subject |
| YCbCrSubSampling | Sampling ratio of chrominance components in relation to the luminance component. |
| XResolution | Horizontal image pixel density |
| YResolution | Vertical image pixel density |
| WhitePoint | Chromaticity of the white point of the image |
| PrimaryChromaticities | Chromaticity of the three primary colors of the image. |
| YCbCrCoefficients | The matrix coefficients for transformation from RGB to YCBCR image data |
| ReferenceBlackWhite | Reference black point and white point values |
| GPSLatitude | Latitude, in degrees, minutes, seconds, N/S |
| GPSLongitude | Longitude, in degrees, minutes, seconds, E/W |
| GPSAltitude | Altitude, in meters |
| GPSTimeStamp | Time of data acquisition |
| GPSDOP | GPS Degree Of Precision |
| GPSSpeed | GPS receiver speed of movement, in kilometers/hour (K), miles per hour (M), or Knots (N) |
| GPSTrack | GPS receiver direction of movement, in degrees |
| GPSImgDirection | Direction in which the image was captured, in degrees |
| GPSDestLatitude | Latitude, in degrees, minutes, seconds, N/S, of the destination |
| GPSDestLongitude | Longitude, in degrees, minutes, seconds, E/W, of the destination |
| GPSDestBearing | Bearing to destination point, in degrees |
| GPSDestDistance | Distance to destination point, in degrees |
| MakerNote | Manufacturer device identification information |

INDEX

Symbols
. (dot) 13
_ (current image) 2

A
accounts 26
actionadvised 193
activity 40
addalpha 151
addframe 81
addprofile 10, 83
alpha channel 70, 99
alphafill 84
annotate 9, 10, 85
argument 4
art 10, 83
aspect-ratio 65
asset 7
  cache 7, 19
  cache expiry 32
  cache flushing 52
  cache validation 32, 51
  resident 7, 10, 45, 46
  source 7
attribute 70, 88
auth 18, 161
authorized hosts 31

B
banner 69
batch processing 19
bevel 89
bitspersample 196
blank 8, 73
blur 91
border 93
brightness 95
bullet 152 byline 193
bylinetitle 193

C
cache 19, 45
calculations 65
caption 193
category 193
chain 10
chain representation 4
chainboard 55
cipher 18, 58, 161
city 193
cluster 10, 22, 35, 45, 48
  member management 25
  synchronization 10, 45, 48
CMYK 12
color 173
color management 1, 83
color profiles 10
colorize 96
colors 191
colorspace 191
command 6
comment 191
composite 7, 70, 98
compress 191
compressedbitsperpixel 196
conditional execution 12
configuration 21, 25
  administration users 26
  autostart 29
  cache expire 32
  cache memory 32
  cache size 32
  cache subsystem 32
  cache synchronize 32
  database host 33 domain 28
e-mail 29
FQDN 29
hostname 28
IP address 28
license key upload 37
liquifire cache 32
liquifire client access 31
liquifire cluster 30
liquifire database 33
liquifire host 28
luster 28
mailhost 29
network 28
port 28
remote access cluster 35
remote access FTP 34
restart 38
security 28
security type 29
server control 38
server name 28
URI 29
configure 24
contact 193
contentlocationcode 193
contentlocationname 193
contrast 105
copyright 193
countdown 15, 162
credit 194
crop 106
current image 2

D database 15
date 11
datecreated 194
decisions 11
delay 191
delete 47
denoise 115
density 191
depth 191
despeckle 115
digitalcreationdate 194
digitalcreationtime 194
direct commands 3
disk space 41
dispose 191
double 108
draw 109
dump 160

E edit 47
editorialupdate 194
editstatus 194
emboss 115
Encapsulated PostScript 1
encoding 11
enhance 115
EPS 1, 67
equalize 115
escape 173
esoteric metadata 13
examples 61
expirationdate 194
expirationtime 194
exposuretime 196
expressions 11
extensible 15

F

Facsimile 63
file 7, 45
fill 114
filter 115, 189
fixtureidentifier 194
flipx 117
flipy 118
fnumber 196
focallength 196
folder 46
font map 57
fontmetrics 15, 164
fonts 10
format conversion 62
formats
   BMP 63
   Encapsulated PostScript 1
   EPS 1, 67
   Exchangeable Image File 13
   EXIF 13
   g3fax 63
   GIF 67
   Graphics Interchange Format 67
   Group 3 Facsimile 63
   PDF 63
   Portable Document Format 63
   Scalable Vector Graphics 1
   SVG 1, 67
   Tagged Image File Format 63
   TIFF 63
frame 119
ftp 7
function 9

G
g3fax 63
gamma 122, 191
gaussian blur 123
gblur 123
glyphs 57
GPS 196
grid 120

H
half 125
hash 18, 161
headline 194
height 191
hexadecimal 173
host
　authorization 31
host authorization 17, 31
http 7
hue 126

I
ICC profile 83, 131
icon 64
if 12
if-then 11
image chain 3, 10, 15, 54
　cipher 58
　representation 4
　validation 55
image creation 8
image pool 2
image specific metadata 13
imageorientation 194
images 2
　metadata 2
imagetype 194
implode 115
interlace 191
International Press Telecommunications
　　Council 13, 193
invert 115
IPTC 13, 193

J
JavaScript 17
job 3
jobID 43, 60

K
key 17, 36
keyed requests 17

L
layer 127
license 36
LiquiFire Orb 1, 21
load 9, 165
log 43
login 23
logout 24
loop 191

M
macro 15
macro command 3, 8
maintain 24, 45
　asset cache flush 52
　cluster synchronize 48
　delete file 47
　edit file 47
　new file 46
　new folder 46
　rename file 47
　render cache flush 49
　upload file 46
　view file 47
makernote 196
mask 70
master 10, 22
matte 191
metacommand 3, 15
metadata 1, 8, 13
　fields 191
metering 40
mftext 10, 154
monitor 24, 40
　activity access log 43
　metering statistics 42
　metering system status 41
monochrome 191
multiple images 5

N
new 73
node 22
noise 115
non-imaging commands 15
normalize 115

O
objectcycle 194
objectname 194
operator 4, 15
optimize 128

LiquiFire User's Guide:

Orb 21
originaltransmissionreference 194
originatingprogram 194

P
paint 115
password 23
PDF 63
performance 41, 42
permissions 26
pixels 13
preferences 60
primarychromaticities 196
primarylocationcode 193
primarylocationname 193
programversion 194
province 195
pseudo-static images 19

Q
quality 191
quantize 129

R
referenceblackwhite 196
referencedate 195
referencenumber 195
referenceservice 195
referring host 17, 31
regexcase 15, 69, 166
releasedate 195
releasetime 195
remote access 25
remove profile 131
rename 47
render cache 19, 32
   size 32
rendering_intent 191
request 3, 6
resident assets 7, 10, 45, 46
resize 132
roll 133
rotate 134

S
saturation 136
Scalable Vector Graphics 1
scale 5, 137
security 17
segment 139
select 2, 77
separate window 60 server configuration 21, 25
server name 17
set 13, 15, 168
shade 115
sharpen 140
show jobid 60
showid 141
shttp 7
sink 5, 79
sketch 115
slave 10, 22
solarize 115
source 2, 5, 10, 75, 195
specialinstructions 195
spread 115
starting Orb 23
stored chains 8
string matching 11
subimage 2, 191
subjectdistance 196
subjectreference 195
sublocation 195
SVG 1, 67
svg 142
swirl 115

T
Tagged Image File Format 63
text 10, 71, 156
   alignment 72
textcurve 10, 158
threshold 143
thumbnail 64
TIFF 63
tile 144
time 11, 169
timecase 15, 171
timecreated 195
tools 24, 54
   chain cipher 58
   explorer 54
   font map 57
   preferences 60
transparent 146
type 191

U
Unicode 1, 57, 85
units 192
unoptimize 149
upload 46
urgency 195
user

LiquiFire User's Guide:

Orb accounts 26
username 23
usharpmask 147

V
vector 13
view 47

W
watermark 150
wave 115
whitepoint 196
width 192
window background 60
window dimensions 60
writereditor 195

X
x-resolution 192
xresolution 196
x-url-encoding 55

Y
ycbcrcoefficients 196
y-resolution 192
yresolution 196

Z
zero 12

What is claimed is:

1. A dynamic imaging server comprising:

a parser that receives an image request from a remote location over a communication network and interprets the image request into a set of individual operation commands defined as a job, wherein the job represents a sequential collection of the individual operation commands parsed by the parser from data contained in the image request;

a job processor that receives the job from the parser and sequentially executes the individual commands contained in the job to perform a plurality of image related operations;

at least one image processing engine that performs an image related operation in response to a command received by the job processor to generate processed image data; and a formatter that receives the processed image data and formats the processed image data into a desired image format to produce a result image that is transferred to the remote location over the communication network in satisfaction of the image request;

wherein the dynamic imaging server is connectable to a local storage device that is coupled to a synchronization engine, wherein the synchronization engine synchronizes transfer of files from remote sources over the communication network to the local storage device.

2. A dynamic imaging server as claimed in claim 1, further comprising a script execution engine, capable of executing code during execution of the job by the job processor, that retrieves information from remote locations via a communication network in response to commands executed by the job processor, wherein the information is utilized to perform an image operation.

3. A dynamic imaging system comprising:

a local storage device capable of storing a plurality of digital images files;

a dynamic imaging server coupled to the local storage device, wherein the dynamic imaging server comprises: a parser that receives an image request and interprets the image request into a set of individual operation commands defined as a job, wherein the job represents a sequential collection of the individual operation commands parsed by the parser from data contained in the image request; a job processor that receives the job from the parser and sequentially executes the individual commands contained in the job to perform a plurality of image related operations; at least one image processing engine that performs an image related operation in response to a command received by the job processor to generate processed image data; and a formatter that receives the processed image data and formats the processed image data into a desired image format to produce a result image;

a relational database accessible by the dynamic imaging server, wherein the dynamic imaging server queries the relational database to determine a location and availability of an asset required by the dynamic imaging server to produce the result image;

a network server coupled to the dynamic imaging server, wherein the network server retrieves assets, not located in the local storage device coupled to the dynamic imaging server, from other sources via a communication network; and a synchronization engine coupled to the storage device that synchronizes transfer of files from the other sources to the local storage device.

4. A dynamic imaging system as claimed in claim 3, wherein the dynamic imaging server further comprises a script execution engine capable of executing code during execution of the job by the job processor.

5. A dynamic imaging system as claimed in claim 3, further comprising a request cache that receives image requests and determines whether the image request corresponds to a previous request that can be satisfied from an image file previously stored in the local storage device or whether the image request corresponds to a new image request to be forwarded to the dynamic imaging server for processing.

6. A dynamic imaging system comprising:

at least one cluster, said cluster including at least one cluster master device and at least one cluster slave device;

wherein the cluster master device comprises: a local storage device capable of storing a plurality of digital images; a dynamic imaging server coupled to the local storage device, wherein the dynamic imaging server comprises: a parser that receives a request and interprets the request into a set of individual operation commands defined as a job, wherein the job represents a sequential collection of the individual operation commands parsed by the parser from data contained in the request; a job processor that receives the job from the parser and sequentially executes the individual commands contained in the job to perform a plurality of image related operations; at least one image processing engine that performs an image related operation in response to a command received by the job processor to generate processed image data; and a formatter that receives the processed image data and formats the processed image data into a desired image format to produce a result image; a relational database accessible by the dynamic imaging server, wherein the dynamic imaging server queries the relational database to determine a location and availability of an asset required by the dynamic imaging server to produce the result image; a network server coupled to the dynamic imaging server, wherein the network server retrieves assets, not located in the local storage device coupled to the dynamic imaging server, from other sources via a communication network; and a cluster engine;

wherein the cluster slave device includes: a local storage device capable of storing a plurality of digital images; a dynamic image server coupled to the local storage device, wherein the dynamic imaging server comprises: a parser that receives a request and interprets the request into a set of individual operation commands defined as a job, wherein the job represents a sequential collection of the individual operation commands parsed by the parser from data contained in the request; a job processor that receives the job from the parser and sequentially executes the individual commands contained in the job to perform a plurality of image related operations; at least one image processing engine that performs an image related operation in response to a command received by the job processor to generate processed image data; and a formatter that receives the processed image data and formats the processed image data into a desired image format to produce a result image: a relational database accessible by the dynamic imaging server, wherein the dynamic imaging server queries the relational database to determine a location and availability of an asset required by the dynamic imaging server to produce the result image; a network server coupled to the dynamic imaging server, wherein the network server retrieves assets, not located in the local storage device coupled to the dynamic imaging server, from other sources via a communication network; and wherein the cluster engine manages a flow of image requests between the cluster master and the cluster slave.

7. A dynamic imaging system as claimed in claim 6, wherein the dynamic imaging server of the cluster master and the dynamic imaging server of the cluster slave each further comprise a script execution engine capable of executing code during execution of the job.

8. The dynamic imaging system as claimed in claim 6, further comprising a plurality of clusters.

9. A computer implemented method at providing dynamic imaging, said method comprising:

providing at least one dynamic imaging cluster including at least one cluster master and at least one cluster slave;

analyzing an image request with a cluster engine to select either the cluster master or the cluster slave to process the image request; and processing the image request with either the selected cluster master or the selected cluster slave;

wherein the processing of the image request includes, parsing the image request into a job comprising a plurality of commands, wherein the job represents a sequential collection of individual operation commands based on data contained in the image request; processing the job to sequentially execute the individual commands contained in the job to perform a plurality of image operations, wherein the image operations generate processed image data that is responsive to the request; and formatting the processed image data into a result image that is transferred to a remote location via a communication network;

wherein the cluster master includes: a storage device; a dynamic imaging server coupled to the storage device; a database accessible by the dynamic imaging server; and a network server; and wherein the cluster slave includes: a storage device; a dynamic imaging server coupled to a storage device; and a network server;

wherein the cluster engine manages a flow of image requests between the cluster master and the cluster slave.

10. A computer implemented method of providing dynamic imaging, as claimed in claim 9, wherein a plurality of dynamic imaging clusters is provided, and the method further includes:

analyzing an image request with a cluster engine to select which of the plurality of dynamic image processing clusters will process the image request;

forwarding the image request to the selected dynamic image processing cluster; and processing the image request with the selected dynamic imaging processing cluster.

11. A computer implemented method of providing dynamic imaging as claimed in claim 10, wherein at last one of the dynamic imaging clusters comprises a user cluster and at least one of the dynamic imaging clusters comprises a third party cluster, and wherein the third party cluster is utilized to provide overflow capacity precessing for the user cluster.

* * * * *

UNITED STATES PATENT AND TRADEMARK OFFICE
CERTIFICATE OF CORRECTION

PATENT NO.        : 7,109,985 B2
APPLICATION NO.   : 10/017271
DATED             : September 19, 2006
INVENTOR(S)       : Marc D. Spencer et al.

It is certified that error appears in the above-identified patent and that said Letters Patent is hereby corrected as shown below:

In Section (73) Assignee: the correct appearance of the name of the assignee requires the capitalization of the letter "p" as follows:

--LiquidPixels, Inc.--

In Section (57) Abstract: the term "job" should be enclosed in quotation marks and shown as:

--"job"--

In Column 15, Line 26, the term "need" should be deleted and replaced with:

--needed--

In Column 433, Line 25, the punctuation mark after the term "includes" should be a colon and not a comma as shown.

In Column 434, Line 30, the term "precessing" should be deleted and replaced with:

--processing--

Signed and Sealed this

Nineteenth Day of December, 2006

JON W. DUDAS
*Director of the United States Patent and Trademark Office*